United States Patent
Ellis et al.

(10) Patent No.: US 7,919,733 B2
(45) Date of Patent: Apr. 5, 2011

(54) MODULAR HEATER SYSTEMS

(75) Inventors: Eric E. Ellis, Columbia, MO (US);
Shawn L. Leininger, Columbia, MO (US); Peggy Gruenloh, Florissant, MO (US); Steve Brncic, Eureka, MO (US); Louis P. Steinhauser, St. Louis, MO (US); Allen Boldt, Kirkwood, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 1239 days.

(21) Appl. No.: 11/520,130

(22) Filed: Sep. 13, 2006

(65) Prior Publication Data

US 2007/0108176 A1  May 17, 2007

Related U.S. Application Data

(63) Continuation-in-part of application No. 11/435,073, filed on May 16, 2006, which is a continuation-in-part of application No. 11/199,832, filed on Aug. 9, 2005, now Pat. No. 7,626,146.

(51) Int. Cl.
*H05B 3/44* (2006.01)
*G08B 21/00* (2006.01)

(52) U.S. Cl. ........ 219/544; 219/545; 219/228; 219/482; 219/483; 219/528; 219/529; 219/494; 219/510; 219/548; 340/584; 340/586; 138/33; 138/112; 392/478; 392/472; 392/479; 392/465; 392/468; 264/171.24; 264/146; 264/297.2; 264/297.5; 264/299

(58) Field of Classification Search .............. 219/544–5, 219/540–2, 228, 482–3, 528–9, 494, 510, 219/531, 535, 538, 548–9; 340/501, 584, 340/586; 138/33, 112; 392/478, 472, 479, 392/465–8; 264/171.24, 146, 297.2, 297.5, 264/299, 328.1; 29/611
See application file for complete search history.

(56) References Cited

U.S. PATENT DOCUMENTS

| 3,885,125 | A | * | 5/1975 | Palm et al. ............... 392/466 |
| 4,281,238 | A | | 7/1981 | Noma et al. |
| 5,632,919 | A | | 5/1997 | MacCracken et al. |

FOREIGN PATENT DOCUMENTS

| DE | 35 44 589 | 6/1987 |
| DE | 20 2005 004602 | 7/2005 |
| EP | 0 937 565 | 8/1999 |
| FR | 2 576 662 | 8/1986 |
| FR | 2 599 115 | 11/1987 |
| JP | 08 326983 | 12/1996 |
| WO | WO 90/10817 | 9/1990 |
| WO | WO 97/03540 | 1/1997 |
| WO | WO 01/56731 | 8/2001 |

* cited by examiner

*Primary Examiner* — Shawntina Fuqua
(74) *Attorney, Agent, or Firm* — Brinks Hofer Gilson & Lione

(57) ABSTRACT

A heat trace assembly is provided that includes a heat trace section, an insulation jacket surrounding the heat trace section, and a plurality of standoffs disposed between the heat trace section and the insulation jacket. A corresponding plurality of passageways are formed between the heat trace section and the insulation jacket and between the plurality of standoffs. The standoffs can be a part of the insulation jacket and/or the heat trace section, and the standoffs can furthermore be integrally formed with or separately attached to the insulation jacket and/or the heat trace section.

18 Claims, 79 Drawing Sheets ic heaters
MODULAR HEATER SYSTEMS

CROSS-REFERENCE TO RELATED APPLICATIONS

This application is a continuation-in-part of U.S. patent application Ser. No. 11/435,073, titled "Modular Heater Systems," filed on May 16, 2006, which is a continuation-in-part of U.S. patent application Ser. No. 11/199,832, titled "Modular Heater Systems," filed on Aug. 9, 2005 now U.S. Pat. No. 7,626,146. The disclosures of the above applications are incorporated herein by reference.

FIELD

The present disclosure relates generally to electric heaters for use in pipelines, and more particularly to electric heaters for use in gaslines and pumplines such as, by way of example, semiconductor processing systems.

BACKGROUND

The statements in this section merely provide background information related to the present disclosure and may not constitute prior art.

The supply of fluids such as oil, gas, and water, among others, from a supply, e.g., an oil well or a water reservoir, requires transfer of such fluids by conduits or the like. Maintaining a free or unrestricted flow of the fluids within the conduits is often necessary, in addition to maintaining the fluid at or above a certain temperature. Presently, an electric heater in the form of a cable or a tape, known in the art as a "heat trace," is commonly used around the conduits to provide heat to the conduits and thus to the fluids. Additionally, the conduits and the heat traces are sometimes surrounded by a thermal insulation jacket to reduce heat loss to the surrounding environment.

Heat trace cables are a popular means for heating such fluid conduits due to their relative simplicity and low cost. Generally, heat trace cables are disposed along the length of the conduits or wrapped around the conduits and are fastened at regular intervals with bands, retaining straps or any other suitable fasteners, as shown in U.S. Pat. No. 5,294,780 to Montierth et al., U.S. Pat. No. 5,086,836 to Barth et al., U.S. Pat. No. 4,791,277 to Montierth et al., U.S. Pat. No. 4,152,577 to Leavines, U.S. Pat. No. 4,123,837 to Horner, U.S. Pat. No. 3,971,416 to Johnson, and U.S. Pat. Reissue No. 29,332 to Bilbro. Fastening heat trace cables to the pipe or conduit has proven to be time consuming and burdensome, particularly for replacement of utility lines and continuous manufacturing processes, among others, where time is of the essence.

To expedite the replacement of utility lines, U.S. Pat. No. 6,792,200 proposes a pre-fabricated heat-traced pipe, wherein a pipe to be heated, a heat trace, and a connector for electrically connecting the heat trace to a power source are cured and integrally formed beforehand and inventoried before a need for replacing an old pipe arises. While this prefabricated pipe saves some time with respect to replacement of utility lines, it requires a custom-made heat-traced pipe, thereby increasing undesirable inventory space and manufacturing and maintenance costs.

SUMMARY

In one preferred form, a heat trace assembly is provided that comprises a heat trace section, an insulation jacket surrounding the heat trace section, and a plurality of standoffs disposed between the heat trace section and the insulation jacket. A corresponding plurality of passageways are formed between the heat trace section and the insulation jacket and between the plurality of standoffs. The standoffs as disclosed herein may be integrally formed, separately attached, and may take on a variety of geometrical configurations.

In another form, an insulation jacket for use in a heating system is provided that comprises a plurality of standoffs extending from an inner surface of the insulation jacket and inwardly towards a heater, wherein a plurality of passageways are formed between the heater and the insulation jacket and between the plurality of standoffs.

In yet another form, a heat trace section for use in a heating system is provided that comprises a plurality of standoffs extending from an outer surface of the heat trace section and outwardly towards an insulation jacket, wherein a plurality of passageways are formed between the heat trace section and the insulation jacket and between the plurality of standoffs.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

Corresponding reference numerals indicate corresponding parts throughout the several views of the drawings.

DETAILED DESCRIPTION

The following description is merely exemplary in nature and is not intended to limit the present disclosure, application, or uses.

The structure of a heater in accordance with the present disclosure is now described in greater detail. At the outset, it should be understood that the word "conduit" as used throughout this specification includes, without limitation, tubes, pipes, and other enclosed or partially enclosed members for the transfer of fluids or other materials such as powders or slurries. The materials carried by the conduits described herein includes solids, liquids, and gases and may include, by way of example, fluids that are transferred within a semiconductor processing apparatus. The following description of the preferred embodiments with reference to such a semiconductor processing apparatus is merely exemplary in nature and is in no way intended to limit the disclosure, its application, or uses. Accordingly, the teachings of the present disclosure are not limited to a semiconductor processing apparatus and can be applied to any system of conduits while remaining within the scope of the present disclosure.

Figure 1:
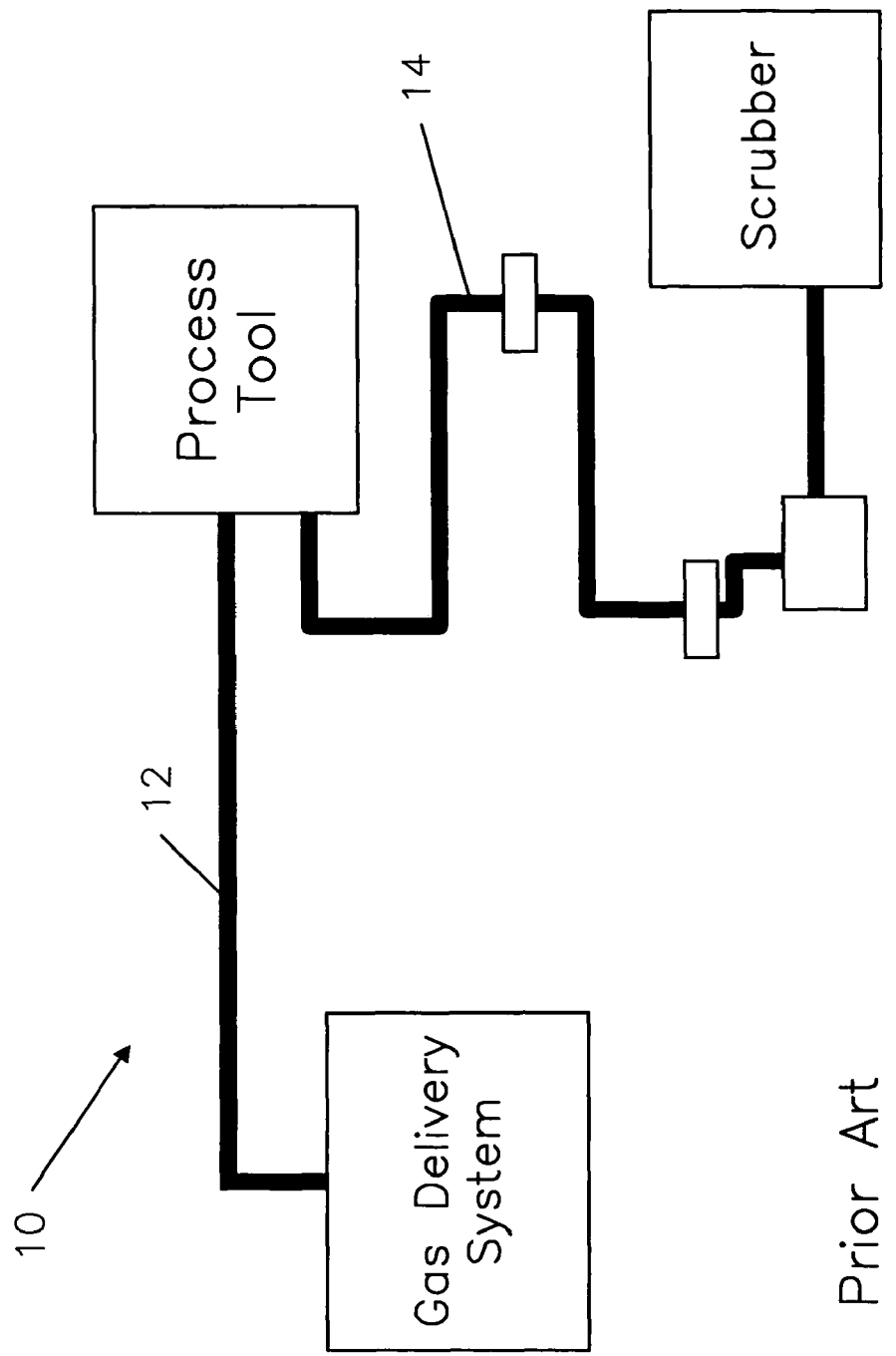
FIG. 1 is a schematic view showing one of the applications of a modular heat trace assembly to heated semiconductor gaslines and pumplines.
Figure 2:
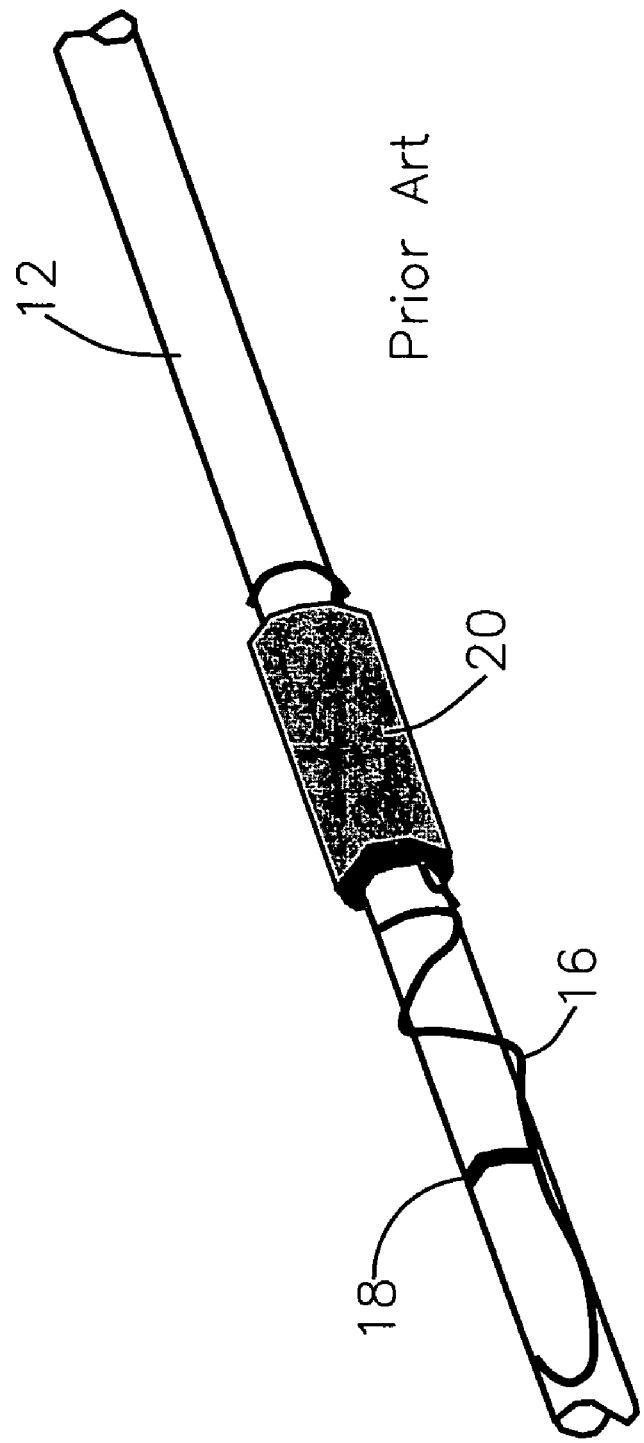
FIG. 2 is a perspective view of a prior art heat trace cable disposed around a gasline or pumpline.

Referring to FIG. 1, a semiconductor processing system 10 is illustrated, which generally includes a heated gasline 12 that extends from a remote gas delivery system to a process tool, and a heated pumpline 14 that extends from the process tool, through a plurality of components as shown, and to a scrubber. During operation, both the gasline 12 and the pumpline 14 must be heated according to specific processing requirements, which has typically been accomplished with heat trace cables 16 as shown in FIG. 2. The heat trace cables 16 are placed or wrapped along the length of the gasline 12 or pumpline 14 as shown, and are secured to the gasline 12 or pumpline 14 using a glass tape 18 or other securing means. Additionally, insulation 20 is often placed around the heat trace cables 16 to reduce heat loss to the outside environment. The insulation 20 is typically wrapped around the heat trace cables 16 and secured in place by separate pieces of tape or ties around the gasline 12 or pumpline 14.

Figure 3:
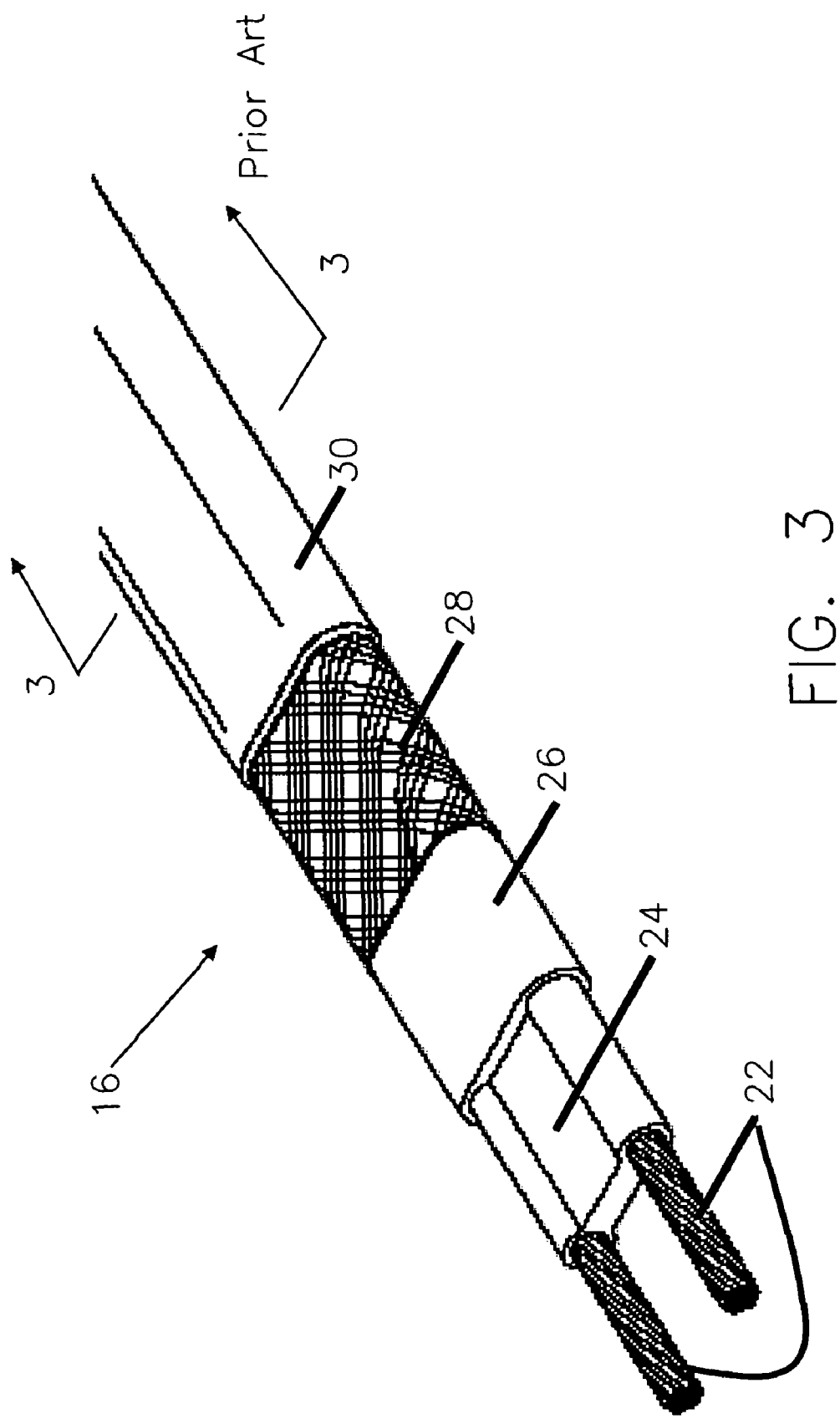
FIG. 3 is a perspective cutaway view of a prior art heat trace cable.
Figure 4:
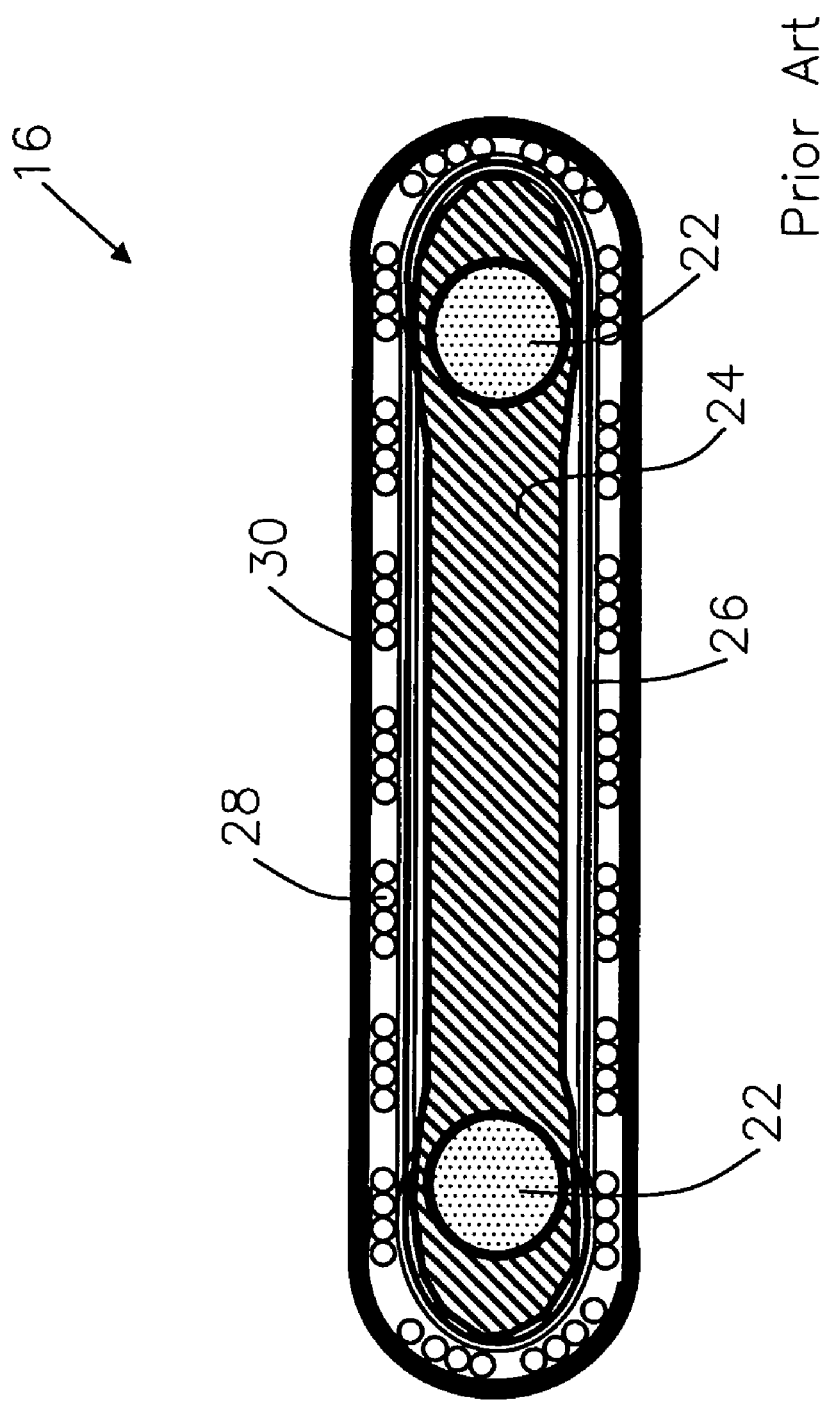
FIG. 4 is a cross-sectional view, taken along line 3-3, of the prior art heat trace cable of FIG. 3.

Referring to FIGS. 3 and 4, the construction and materials of the heat trace cables 16 are illustrated and described in greater detail. The heat trace cable 16 typically includes a pair of bus-conductors 22, which are surrounded by a semiconductive polymer material 24 that functions as a heating element. A dielectric or insulator material 26 surrounds the semiconductive polymer material 24, which may optionally be surrounded by a metal braid material 28 as shown for additional functionality such as a ground plane. Further, an outer jacket 30 surrounds the metal braid material 28 to protect the overall assembly, and the outer jacket 30 is typically an insulating material such as a thermoplastic.

Although relatively lower cost than other heater systems, heat trace cables 16 must be cut to length in the field and spliced into an appropriate connector or terminal, which is often time consuming and cumbersome. Additionally, heat trace cables 16 are not as capable as other heating systems in providing a relatively uniform heating profile along the length of a conduit due to the limited area of coverage and the relatively crude means by which they are secured to the conduit. Heat trace cables 16 provide only casual contact with the conduit due to their stiffness and difficulty in forming to the shape of the conduit.

With reference now to FIGS. 5 through 8, a modular heat trace assembly adapted for use in a semiconductor processing system 10 in accordance with a first embodiment of the present disclosure is illustrated and generally indicated by reference numeral 50. The modular heat trace assembly 50 comprises heat trace sections 52 for contacting and heating a conduit 13 of the semiconductor processing system 10. The modular heat trace assembly 50 also comprises connectors 54 for securing adjacent heat trace sections 52 and for securing the modular heat trace assembly 50 to components of the semiconductor processing system 10 as described in greater detail below.

The heat trace sections 52 are preferably formed as an elongated shape as shown and include a curved portion 56 and a pair of opposing locking edges 58 extending in a longitudinal direction of the curved portion 56. The curved portion 56 has an inner surface 60 defining an open channel 62 for placement around the conduit 13. The inner surface 60 is preferably complementary to an outer surface of the conduit 13 to allow for securing the heat trace section 52 to the conduit 13. The curved portion 56 preferably surrounds at least a half of the entire outer surface of the conduit 13 to provide more uniform heat transfer from the heat trace section 52 to the conduit 13 and to allow for self-locking of the heat trace section 52 around the conduit 13 by the locking edges 58.

As shown, the locking edges 58 are spaced apart in a direction transverse to the longitudinal axis of the curved portion 56 and are so configured as to facilitate the mounting of the heat trace sections 52 to the conduit 13. Since the heat trace material is flexible, when the channel 62 of the heat trace section 52 is placed around the conduit 13, the locking edges 58 can be deflected outwardly and are then biased against the conduit 13 when released to secure the heat trace section 52 to the conduit 13.

As further shown, a pair of conductors 64 are provided within the heat trace section 52, preferably along the locking edges 58 as shown, wherein the conductors 64 extend outwardly from opposite ends 66 and 68. The conductors 64 are configured for connection to a power source (not shown) for providing heat along the heat trace section 52. The conductors 64 are also adapted, as described in greater detail below, for connection to an adjacent heat trace section 52 or to an adjacent connector 54. Although not illustrated in FIGS. 5 through 8, it should be understood that the heat trace section 52 comprises the semiconductive polymer material, a dielectric or insulator material surrounding the semiconductive polymer material, and may also comprise optional materials for a ground plane and an outer jacket as previously described. These separate materials are not illustrated with the heat trace section 52 for purposes of clarity.

The heat trace sections 52 are preferably preformed in sizes corresponding to different sizes, or outside diameters for example, of the conduit 13. The heat trace sections 52 are also capable of being cut to length, according to a desired length for a particular section of conduit 13. Preferably, the heat trace sections 52 are provided in standard sizes and lengths for ease of repair and replacement within a conduit system such as the semiconductor processing system 10 as shown. Accordingly, the modular construction of the heater system according to the teachings of the present disclosure facilitates a relatively low cost heater system that is easily adapted to a conduit system.

Figure 5:
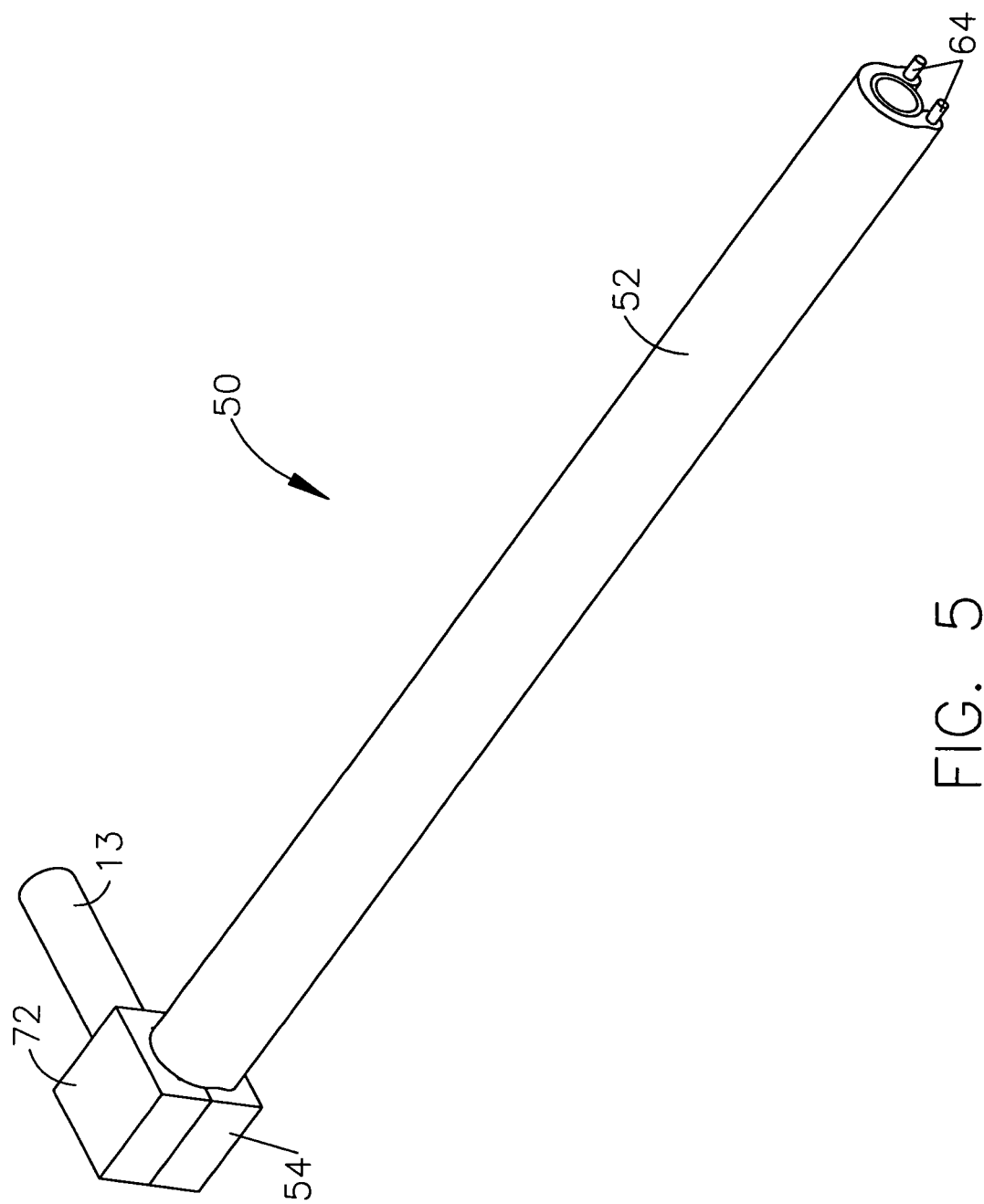
FIG. 5 is a perspective view of a modular heat trace assembly secured to a conduit system in accordance with a first embodiment of the present disclosure.
Figure 6:
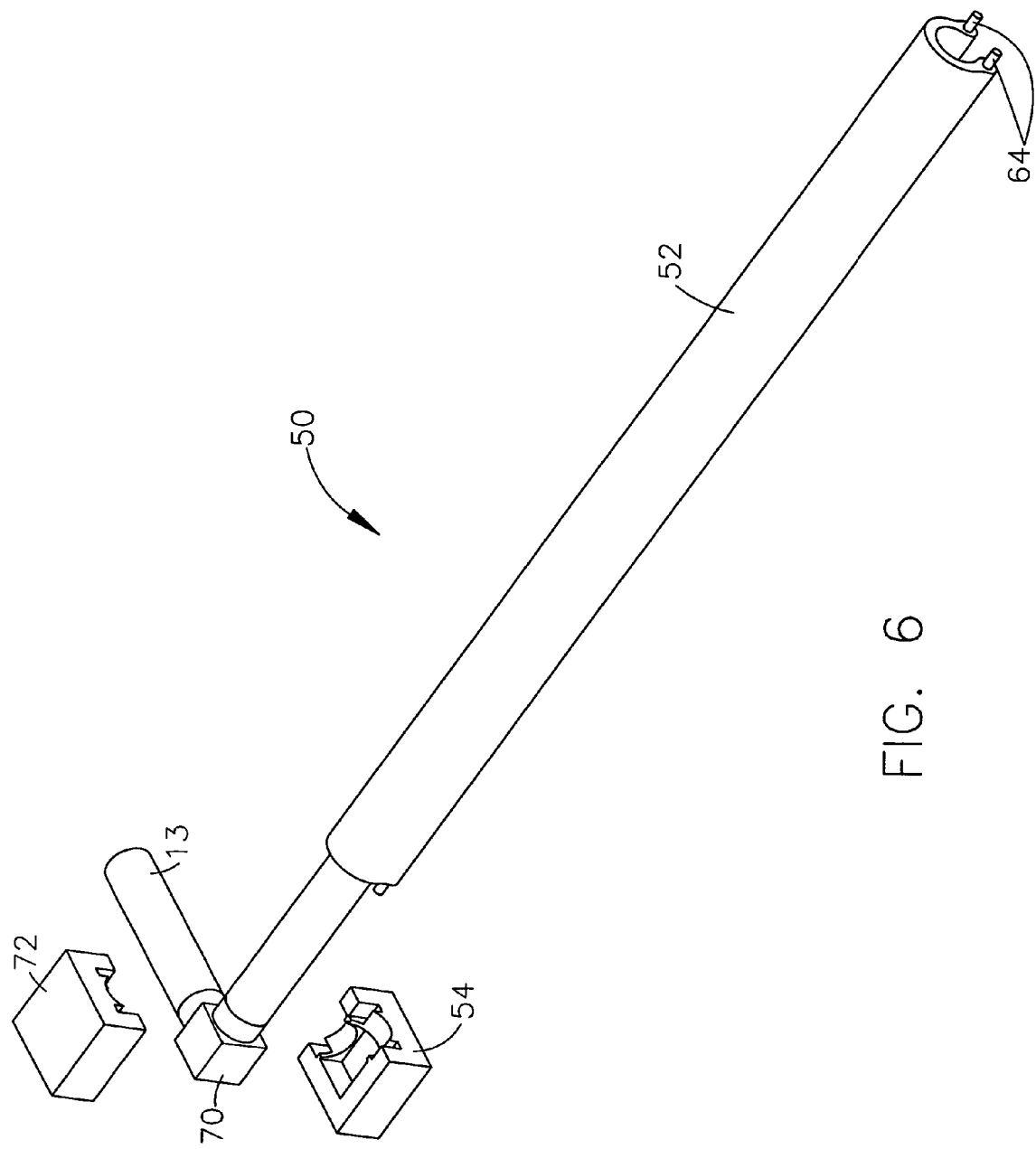
FIG. 6 is an exploded perspective view of the modular heat trace assembly of FIG. 5 in accordance with the teachings of the present disclosure.
Figure 7:
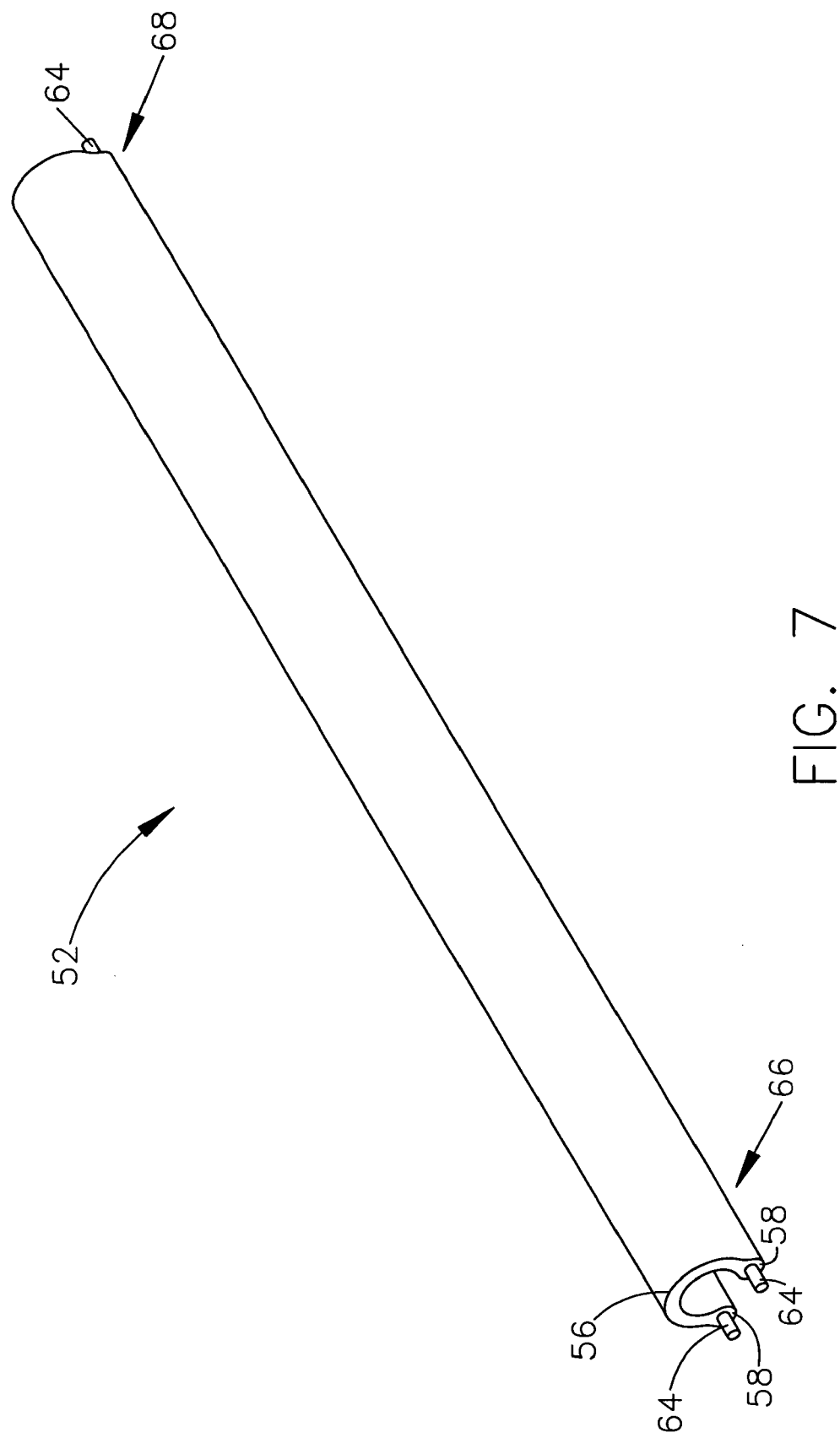
FIG. 7 is a perspective view of a heat trace section of FIGS. 5 and 6 constructed in accordance with the teachings of the present disclosure.
Figure 8:
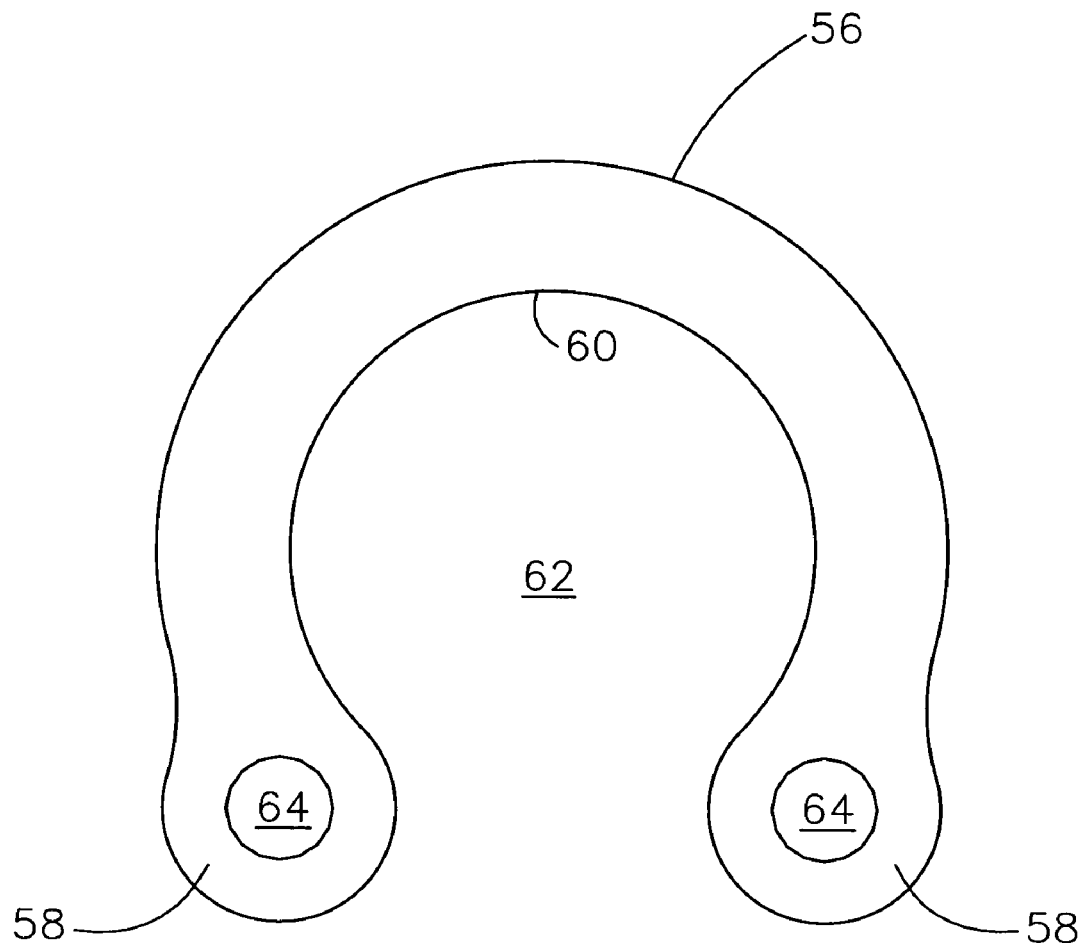
FIG. 8 is an end view of the heat trace section of FIG. 7 in accordance with the teachings of the present disclosure.
Figure 9:
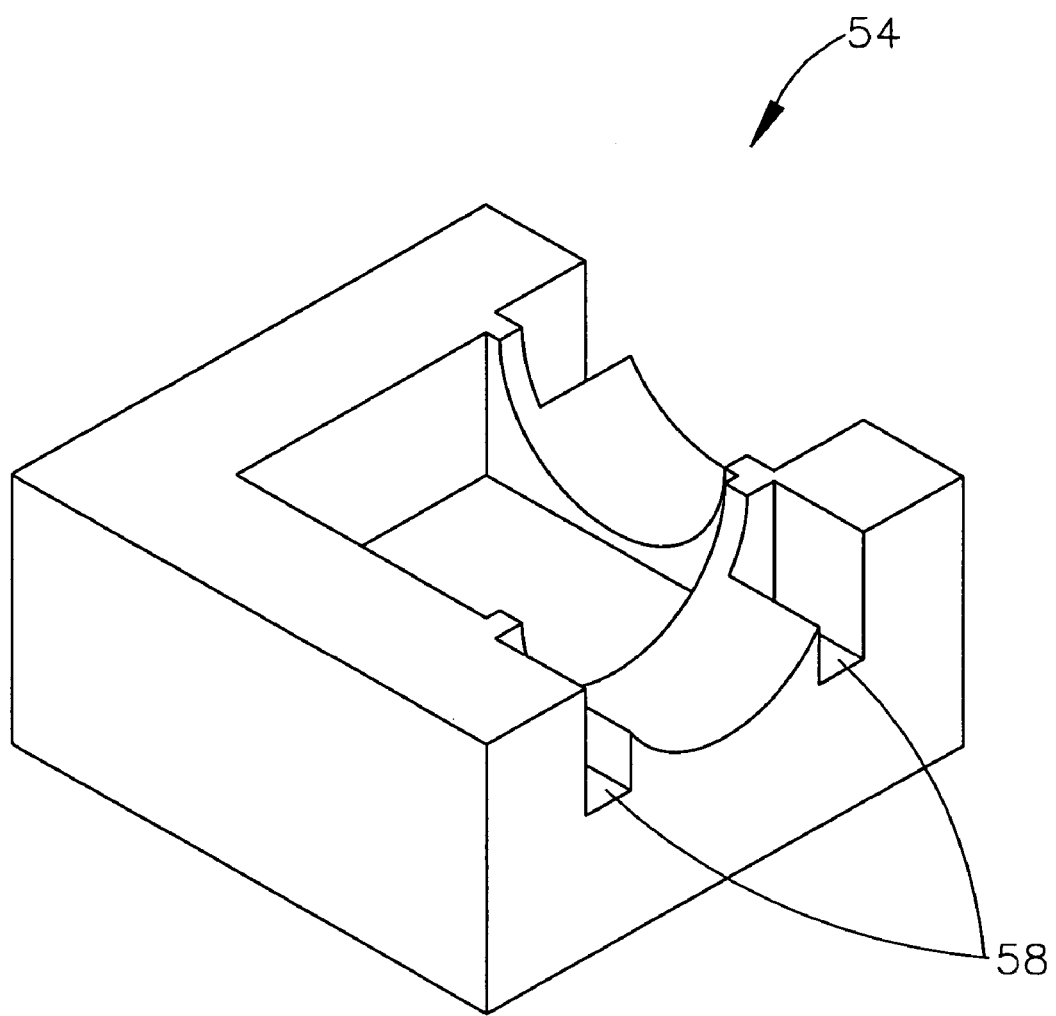
FIG. 9 is a perspective view of a connector of FIGS. 5 and 6 in accordance with the teachings of the present disclosure.
Figure 10:
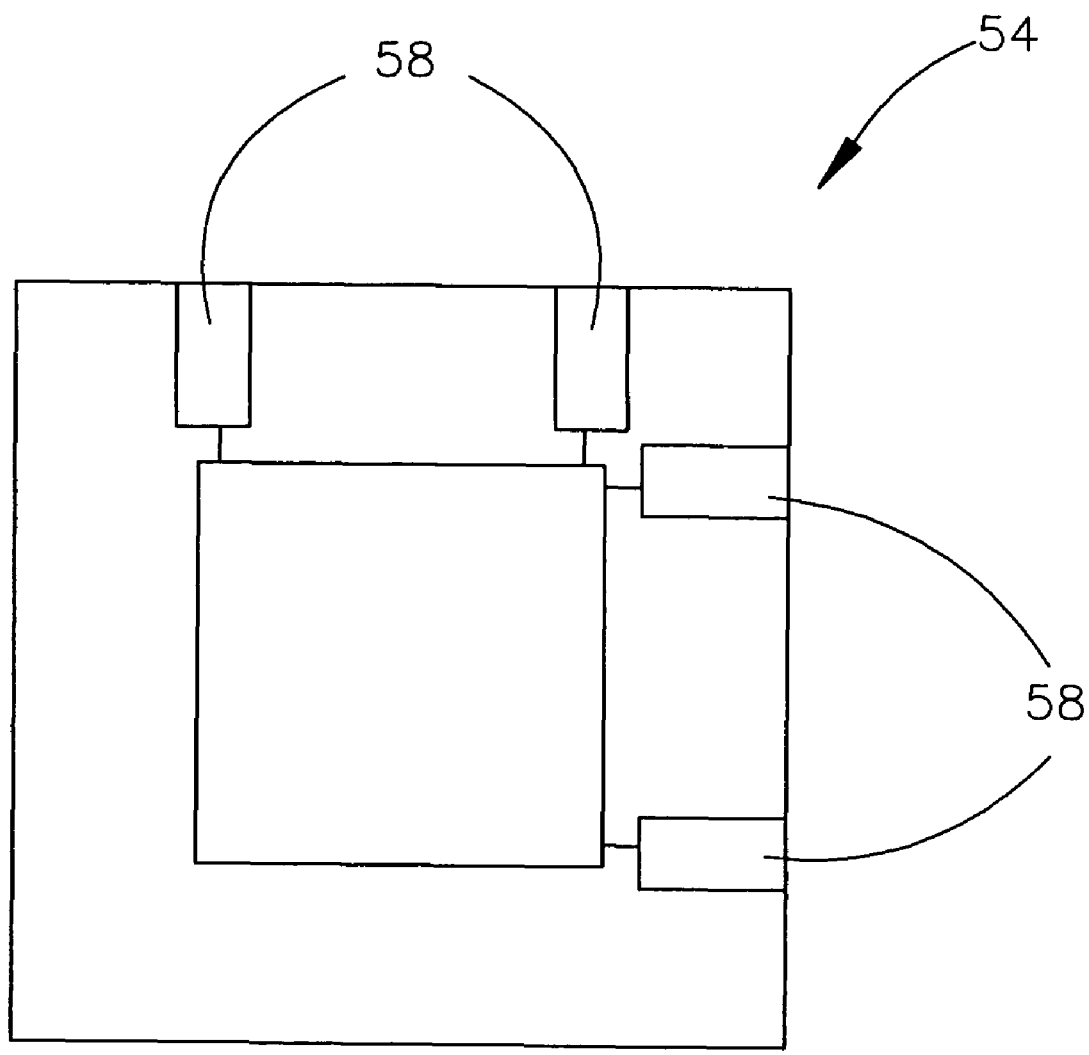
FIG. 10 is a top view of the connector of FIG. 9 in accordance with the teachings of the present disclosure.

Referring now to FIGS. 9 through 11c in conjunction with FIGS. 5 and 6, the connector 54 is provided proximate at least one of the opposite ends 66 or 68 of the heat trace section 52 to secure the heat trace section 52 to an adjacent heat trace section 52 between or across a fitting 70 of the conduit system 10. Preferably, the connector 54 is formed to the shape of the fitting for ease of installation and removal. Additionally, a mating cover 72 is provided to cover the connector 54 proximate the fitting, which is also formed to the shape of the fitting.

The heat trace section 52 and the connector 54 define mating features to allow for a quick engagement and disengagement between the heat trace section 52 and the connector 54. In this illustrative embodiment, the connector 54 is provided with a pair of corresponding grooves 58 for receiving the conductors 64, which are typically in the form of pins, or exposed wires a result of stripping, in a heat trace type heater, as described in greater detail below.

The connector 54 may comprise one of a plurality of forms for electrical connection and heat transfer in accordance with the teachings of the present disclosure. In a first form shown in FIG. 11a, the connector 54 comprises an insulative material and includes electrical connector elements 74 disposed within the grooves 58. The electrical connector elements 74 are generally in the form of a socket and are adapted to receive the conductors 64 as shown. The electrical connector elements 74 may be sized for an interference fit, or alternately, may be crimped onto the conductors 64 as necessary. Alternatively, the electrical connector elements 74 may comprise a squeeze connector, which is also known as an insulation displacement or piercing connector, that includes an electrical contact that is moved by a flexible cover or housing to contact the conductors 64 through their surrounding materials, e.g., insulating material, semiconductive polymer material metal braid material. An exemplary squeeze connector is illustrated in U.S. Pat. No. 4,861,278, and a wide variety of such connectors are commercially available from numerous sources and are not illustrated herein for purposes of brevity. Accordingly, it should be understood that a variety of electrical connectors may be employed while remaining within the scope of the present disclosure. It should also be understood that electrical connection between the electrical connector elements 74 across the connector 54, as indicated by the dashed line 75, may also be employed in order to provide electrical continuity across the connector 54, using a variety of electrical connection approaches while remaining within the scope of the present disclosure.

Figure 11A:
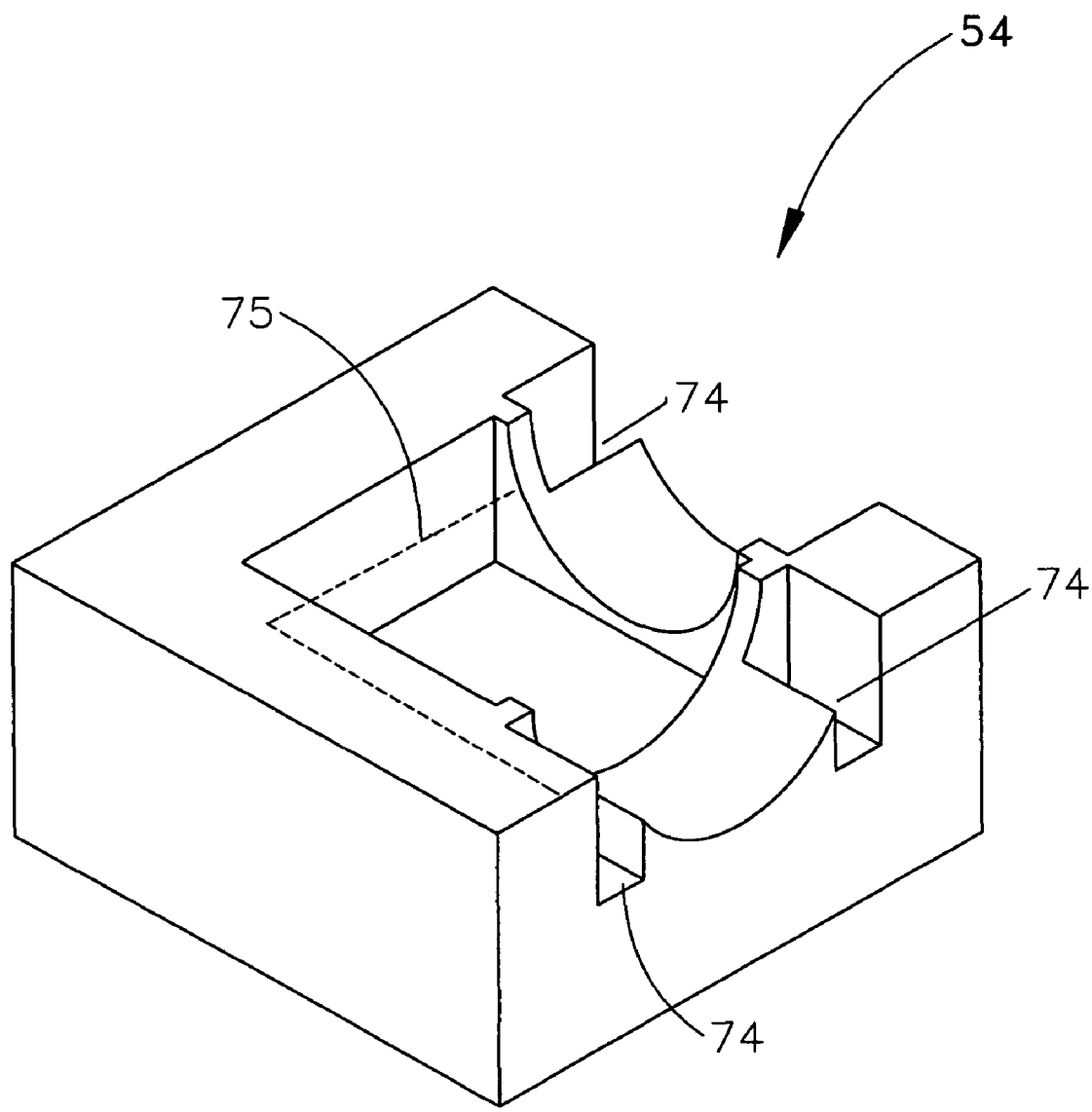
FIG. 11a is a perspective view of a connector in accordance with one embodiment constructed in accordance with the principles of the present disclosure.
Figure 11B:
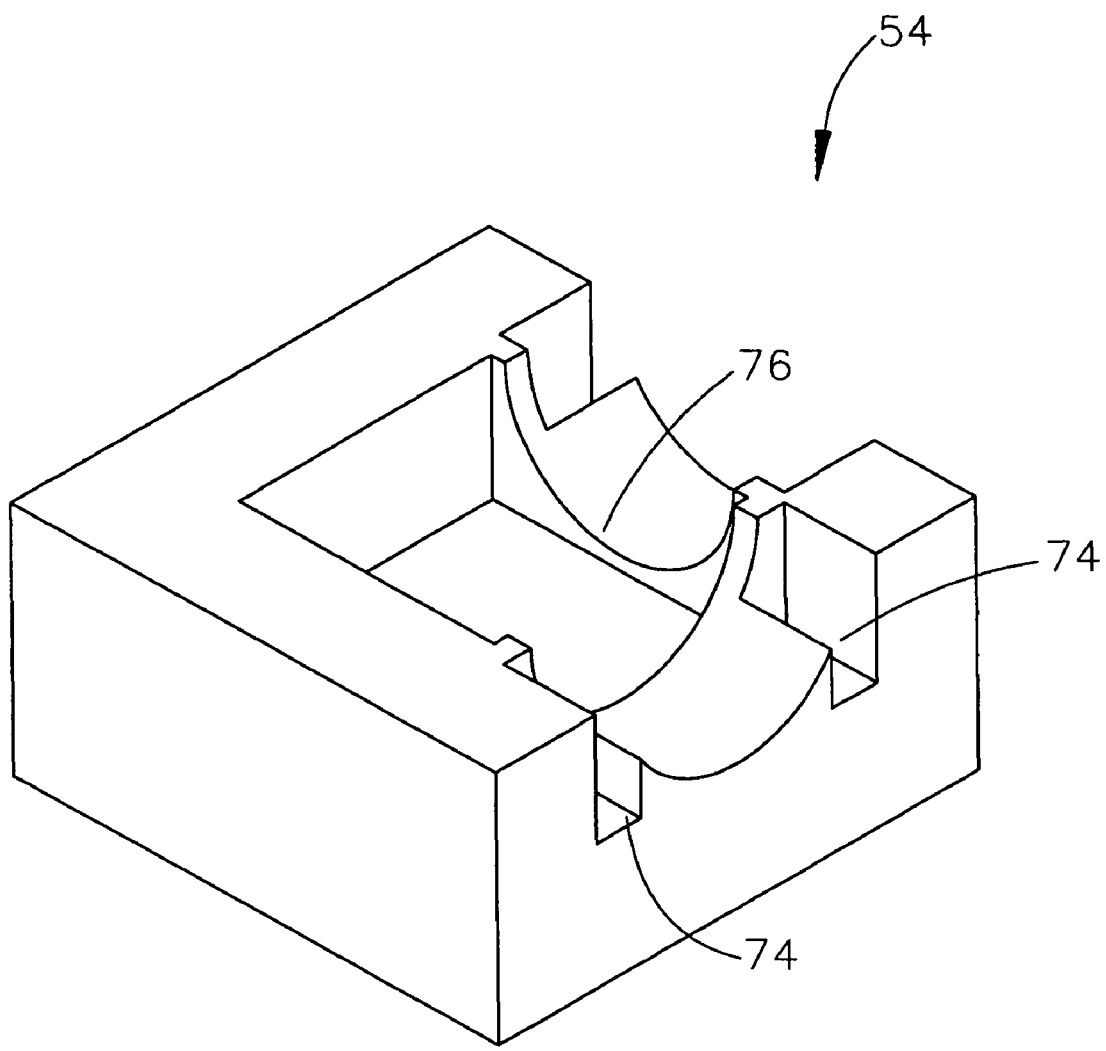
FIG. 11b is a perspective view of a connector in accordance with another embodiment constructed in accordance with the principles of the present disclosure.

In a second form as shown in FIG. 11b, the connector 54 comprises an insulative material with the electrical connector elements 74 as shown above and also comprises a pre-formed heat trace section 76 disposed within the body of the connector 54. The heat trace section 76 thus provides the requisite heat to the fitting 70 of the conduit system 10 and is constructed in accordance with the teachings of the present disclosure as described above.

Figure 11C:
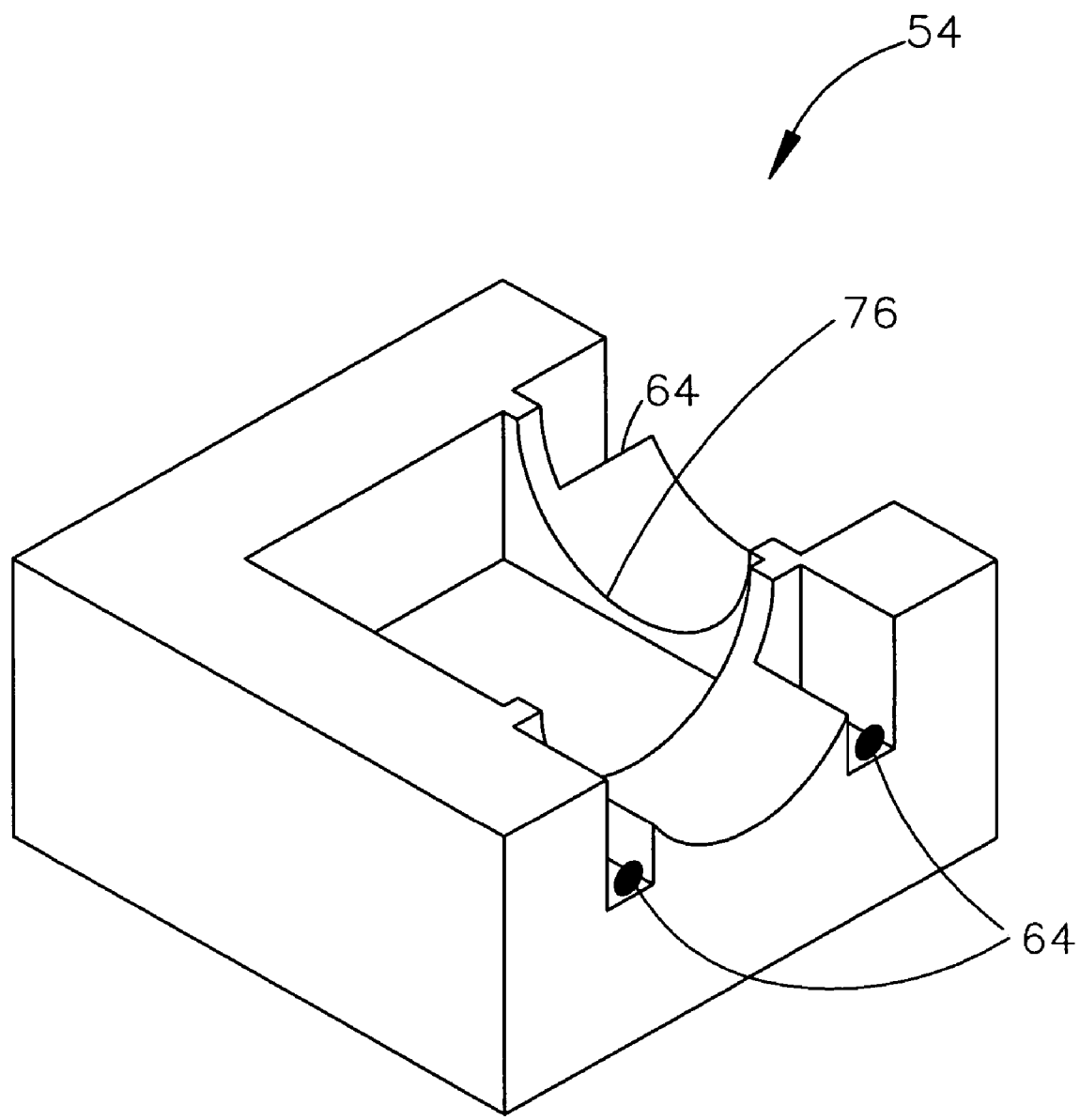
FIG. 11c is a perspective view of a connector in accordance with yet another embodiment constructed in accordance with the principles of the present disclosure.

In a third form as shown in FIG. 11c, the connector 54 comprises an insulative material with the pre-formed heat trace section 76 and not the electrical connector elements 74. In this form, the conductors 64 extend from the connector 54 as shown and are subsequently attached to another connector or terminal for electrical connection to a power source (not shown). Alternately, the connector 54, in each of the forms illustrated herein, may also include a discrete temperature sensor (not shown), or inherent temperature sensing capability using TCR (temperature coefficient of resistance) materials, for improved temperature control of the heater system.

In yet another form, a heat transfer compound such as a silicone or non-silicone based paste, or a sheet-type thermal gel, among others, is disposed on one side of the connector 54, on one or more of the exposed surfaces adjacent the conduit 13 for improved heat transfer. Accordingly, it should be understood that a variety of thermal interface materials may be employed both on the connector 54 and the heat trace section 52 to improve or control heat transfer while remaining within the scope of the present disclosure.

It should be noted that while a pin and groove configuration is used for connecting the heat trace section 52 to the connector 54, other features for connecting the same can be used as long as the connector 54 functions to secure the heat trace section 52 to an adjacent heat trace section 52 and to provide electrical continuity across the connection. For example, such features may include, by way of example, screws, pegs, snaps, clips, and the like to align and/or secure the mating structure. Additionally, features other than mechanical elements may be employed, such as electromagnetic features, while remaining within the scope of the present disclosure.

It should also be noted that while the heat trace section 52 is described in the first embodiment to have a curved portion 56, the heat trace section 52 is not limited to the shape and configuration as illustrated herein. The heat trace section 52 can be of any shape as long as it can be properly secured to the conduit 13 and thus provide heat to the conduit 13. For example, the heat trace section 52 may have a rectangular shape for receiving a rectangular conduit. Though it is preferred, it is not necessary to require that the heat trace section 52 be in direct contact with the conduit 13 as shown and described herein to achieve the purpose of heating the conduit 13. Moreover, multiple pieces of the heat trace section 52 may be employed around the circumference of the conduit 13 rather than a single piece as illustrated herein. Such variations should be understood to be within the teachings and scope of the present disclosure.

Figure 12:
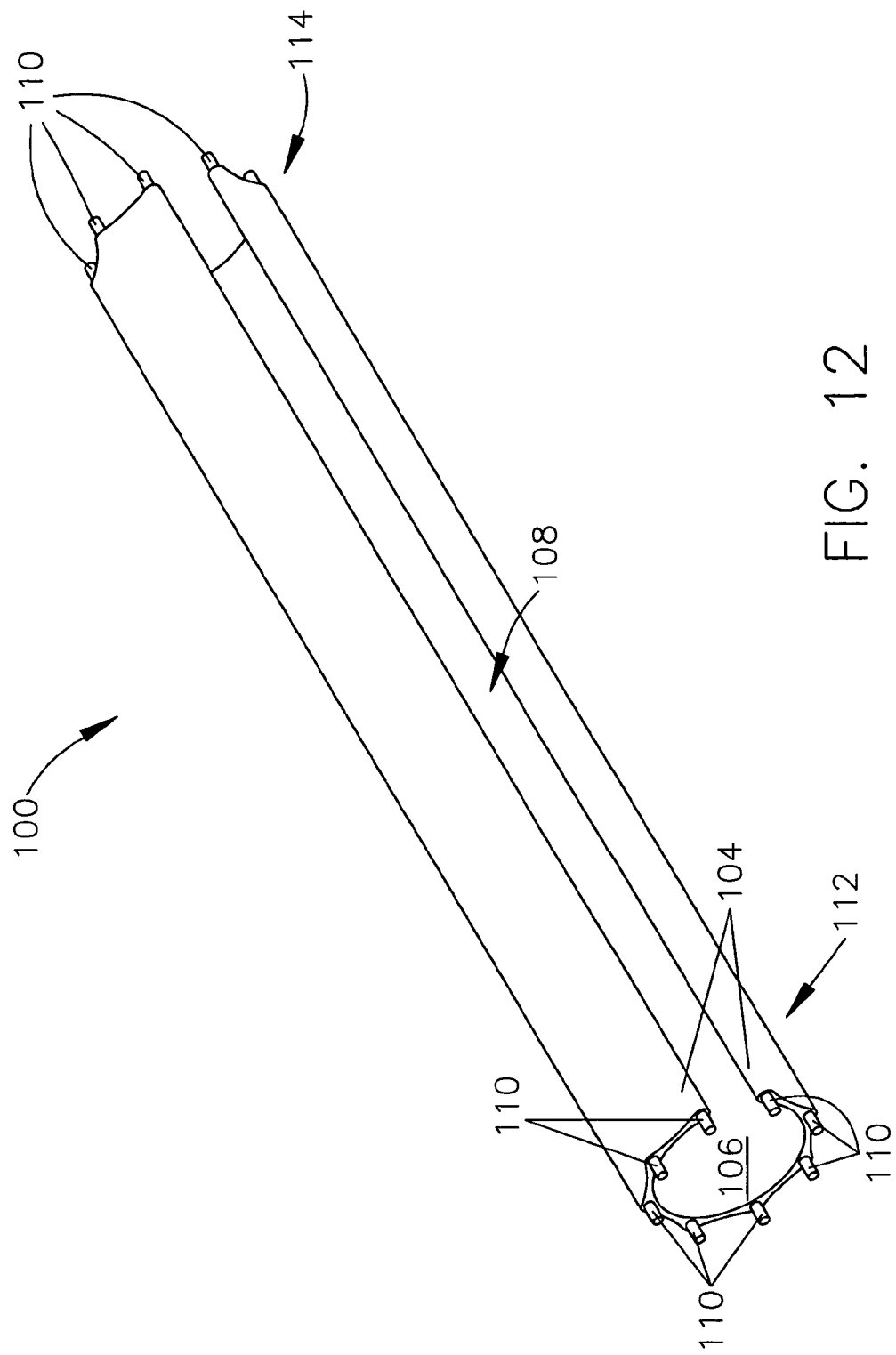
FIG. 12 is a perspective view of a heat trace section constructed in accordance with a second embodiment of the present disclosure.
Figure 13:
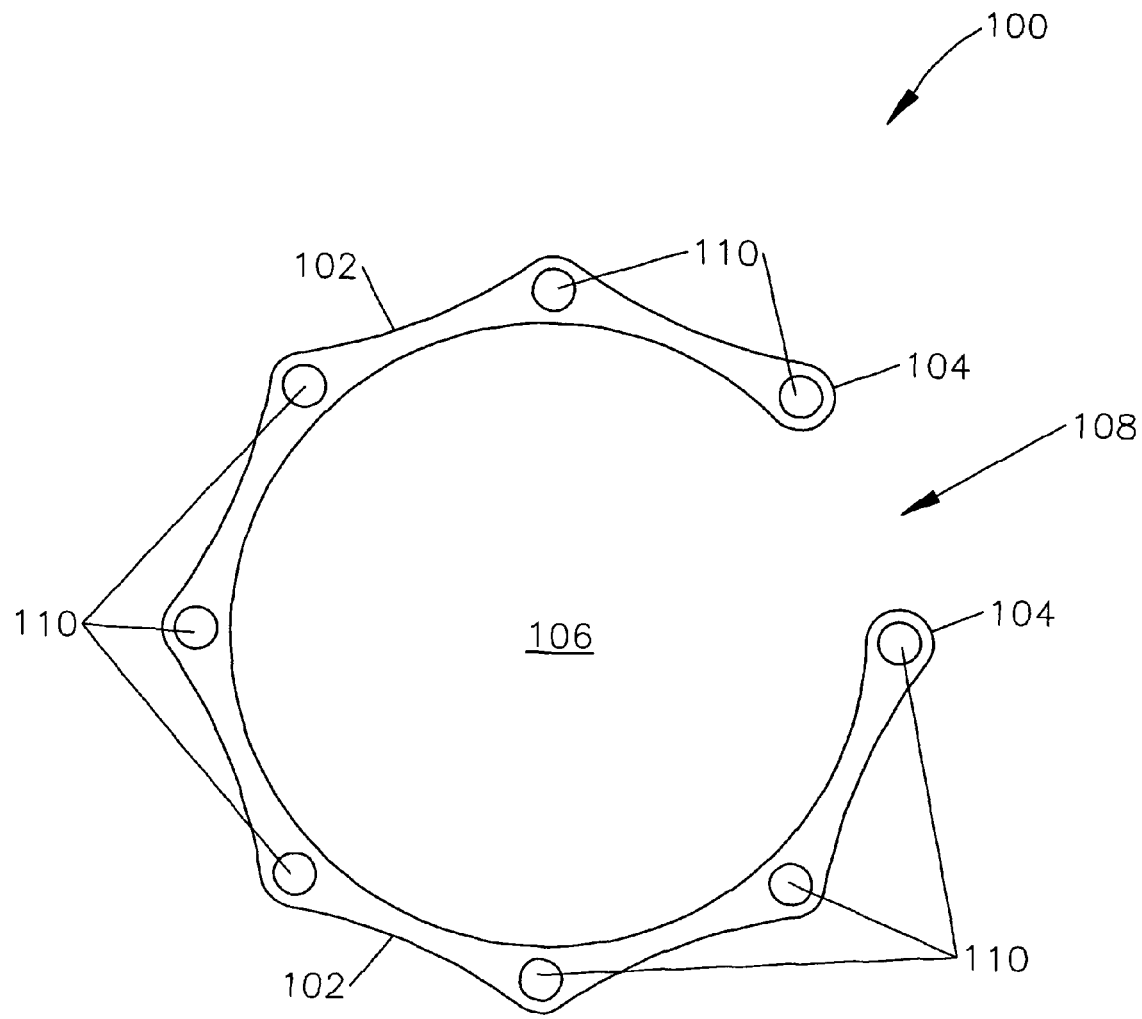
FIG. 13 is an end view of the heat trace section of FIG. 12 in accordance with the teachings of the present disclosure.

Referring to FIGS. 12 and 13, a heat trace section in accordance with a second embodiment of the present disclosure is generally indicated by reference numeral 100. The heat trace section 100 includes a plurality of conductors 110 in order to facilitate a larger size conduit 13 and to provide the requisite power to heat the conduit 13 and the fluids therein. The conductors 110 extend outwardly from the opposing ends 112 and 114 along the longitudinal axis of the heat trace section 100 for electrical connection to a power source (not shown) and/or to an adjacent heat trace section 100 or to a connector 54.

In the illustrative embodiment, seven panels 102 are shown to define a tubular channel 106 for receiving a conduit 13 therein. Two panels 102 are not joined along one of their longitudinal sides 104 to form a longitudinal slit 108 as shown. The longitudinal slit 108 facilitates the mounting of the heat trace section 100 onto the conduit 13. Since the heat trace section 100 is made of a flexible material, by deflecting the two panels 102 outwardly that define the longitudinal slit 108, the heat trace section 100 can be secured over the conduit 13, similar to the heat trace section 52 as previously described.

As previously stated, the heat trace section 100 of this embodiment is particularly suitable for a conduit having a larger size. The number of panels 102 thus depends on the size of the conduit 13 to be heated and is not limited to seven as shown in the illustrative embodiment of FIGS. 12 and 13. It should be understood that any number of conductors 110 and corresponding panels 102 may be employed according to the size and heating requirements of the conduit 13 while remaining within the scope of the present disclosure.

Figure 14:
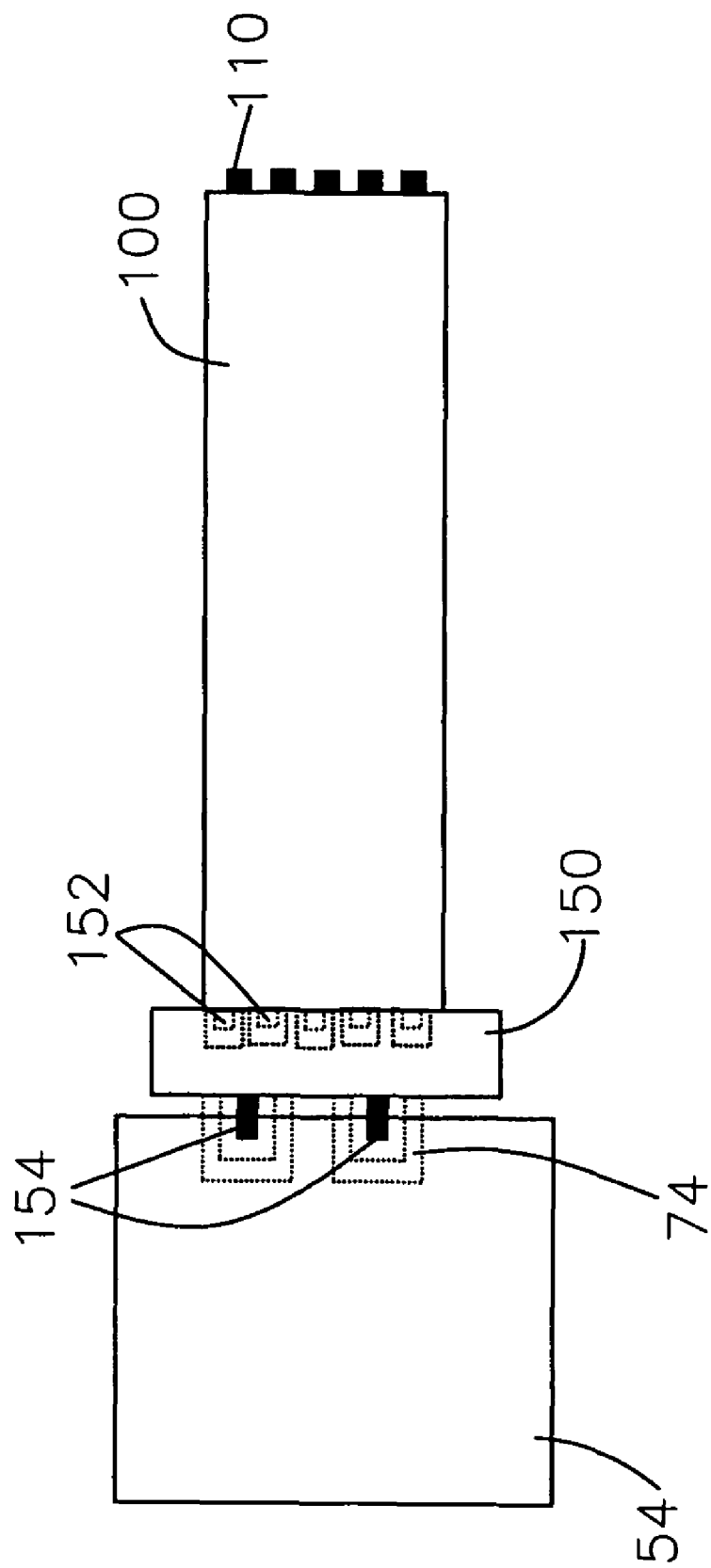
FIG. 14 is a top view of a bussing adapter constructed in accordance with the teachings of the present disclosure

Referring to FIG. 14, a bussing adapter that functions to adapt the multi-conductor embodiment of FIGS. 12 and 13 to a two-conductor connector 54 as previously shown is illustrated and generally indicated by reference numeral 150. As shown, the bussing adapter 150 is preferably in the form of a ring that is disposed between the heat trace section 100 and the connector 54. The bussing adapter 150 is preferably an insulative material and includes a plurality of electrical connector elements 152 (shown dashed) on one side, preferably in the form of sockets, to receive the plurality of conductors 110 of the heat trace section 100. On the opposite side, the bussing adapter 150 includes a pair of conductors 154 that extend from the body of the bussing adapter 150 to engage with the electrical connector elements 74 (shown dashed) of the connector 54. Inside the bussing adapter 150, the electrical connector elements 74 are bussed (not shown) to each of the conductors 154 to provide for electrical continuity.

Figure 15:
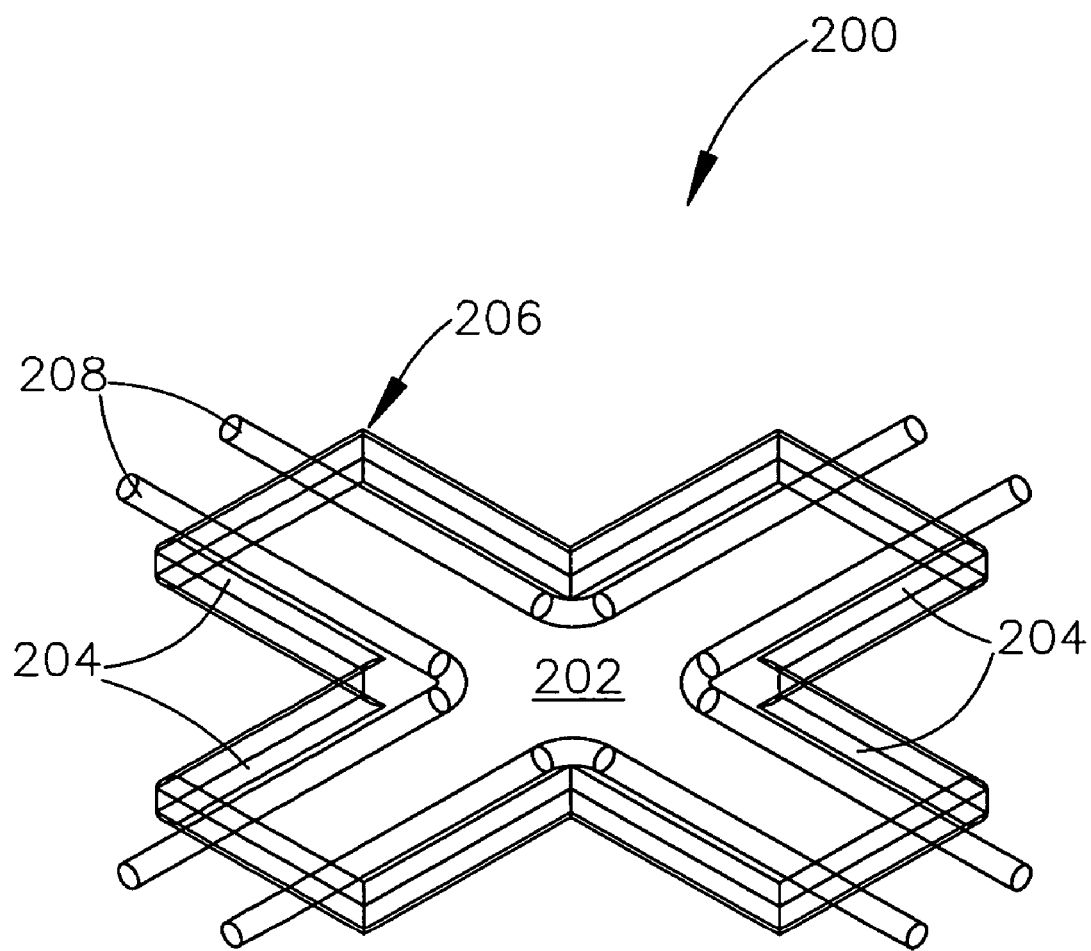
FIG. 15 is a perspective view of a heat trace junction constructed in accordance with a third embodiment of the present disclosure.
Figure 16:
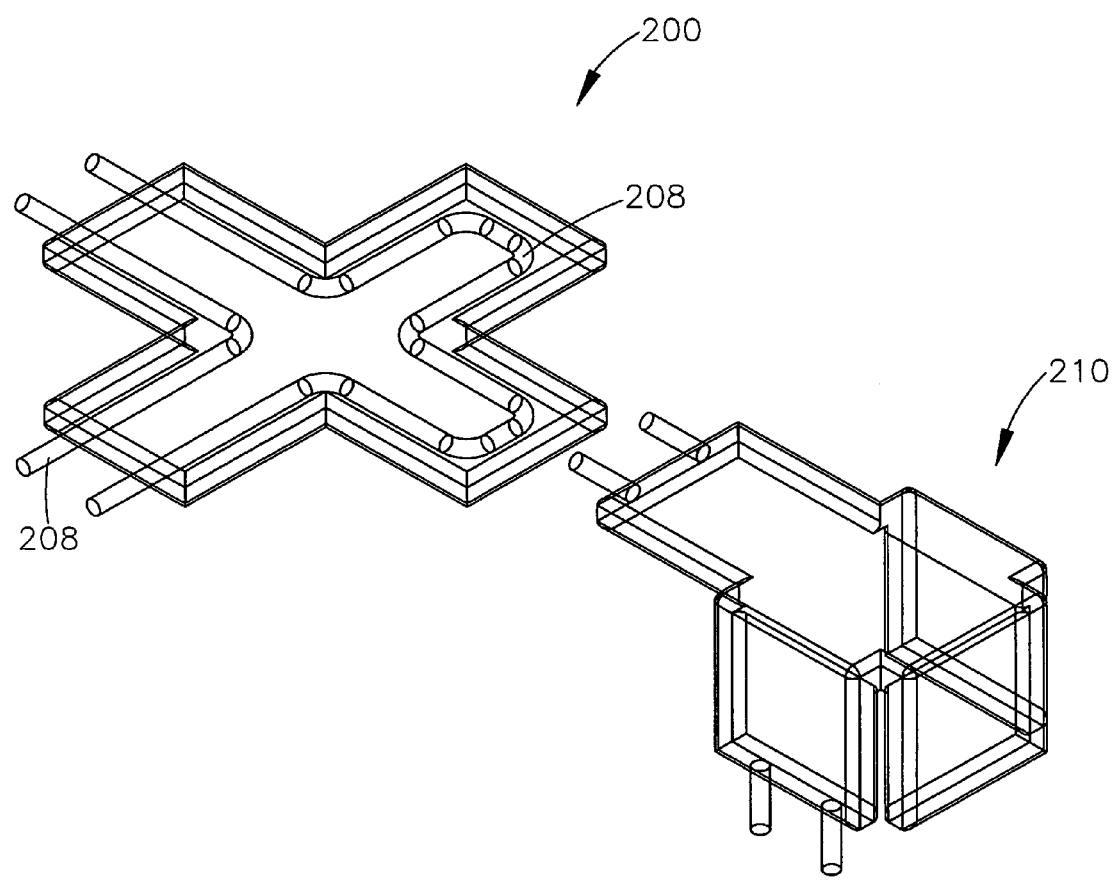
FIG. 16 is a perspective view of an alternate form of the heat trace junction of FIG. 15 configured for an elbow junction of a conduit system and constructed in accordance with the teachings of the present disclosure.
Figure 17:
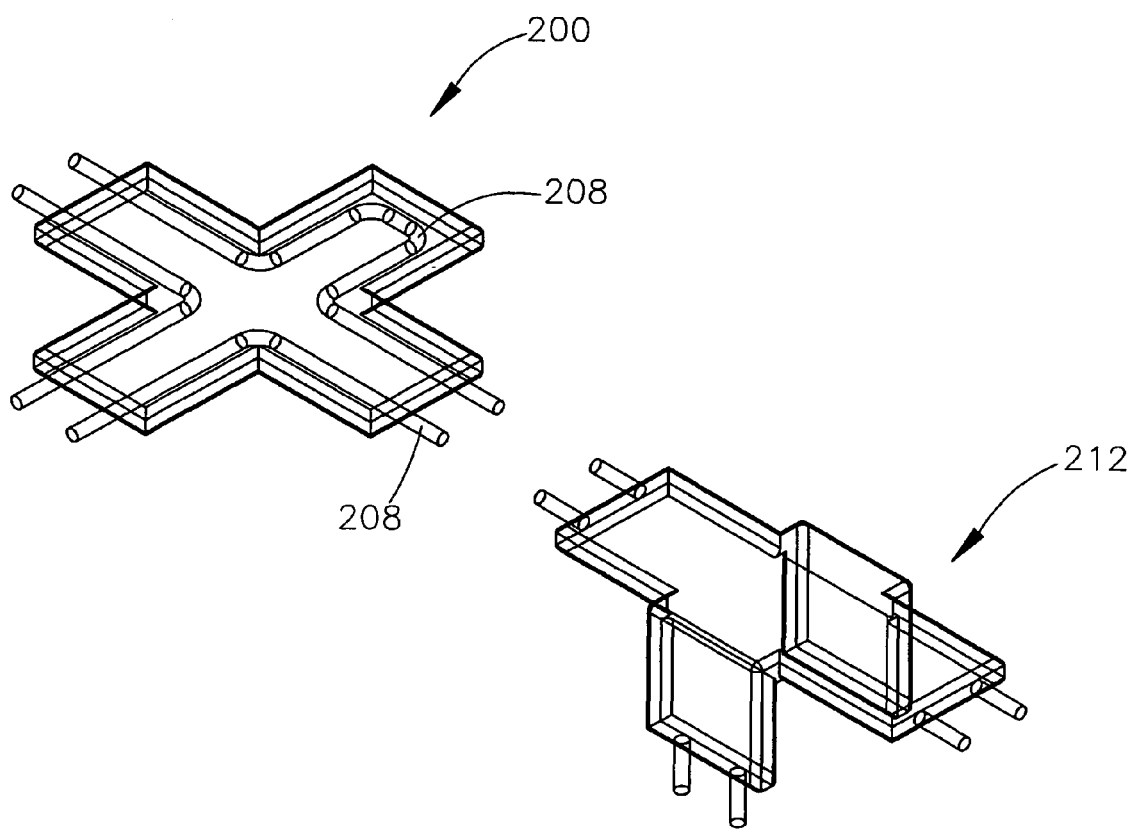
FIG. 17 is a perspective view of an alternate form of the heat trace junction of FIG. 15 configured for a T-junction of a conduit system and constructed in accordance with the teachings of the present disclosure.
Figure 18:
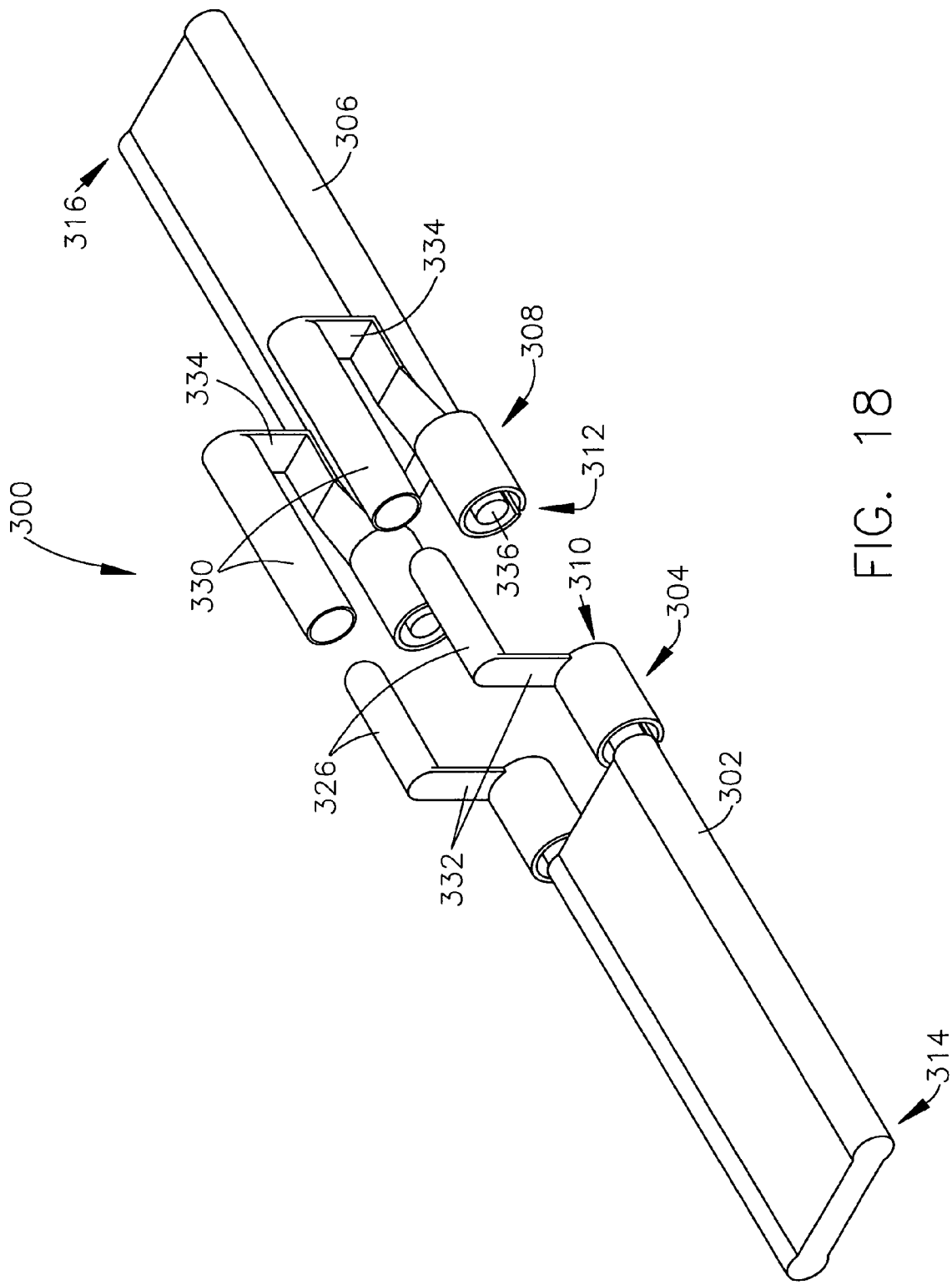
FIG. 18 is a perspective view of heat trace sections with termination structures in accordance with a fourth embodiment of the present disclosure, the heat trace sections being in a disengaged state.
Figure 19:
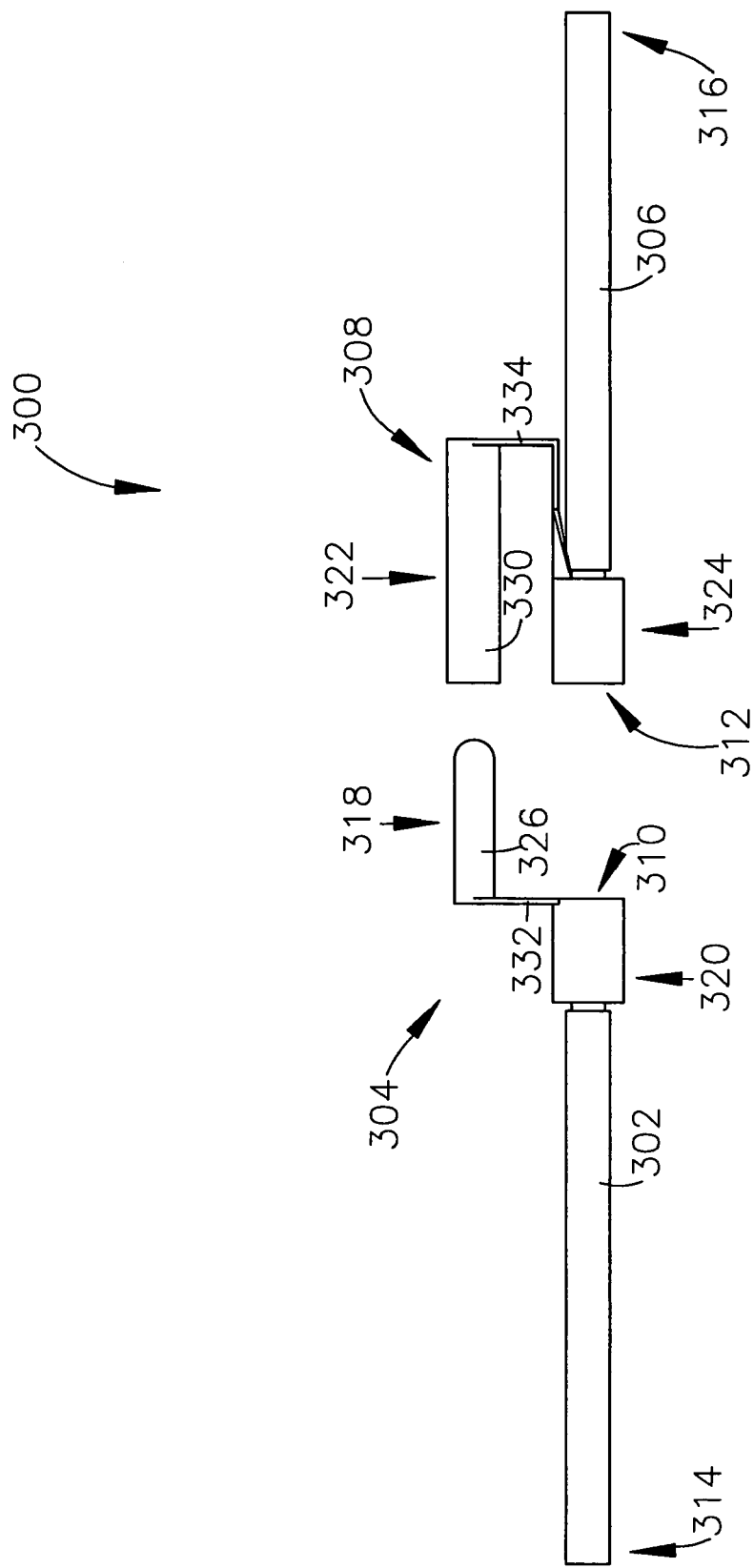
FIG. 19 is a side view of the heat trace sections of FIG. 18 in accordance with the teachings of the present disclosure.
Figure 20:
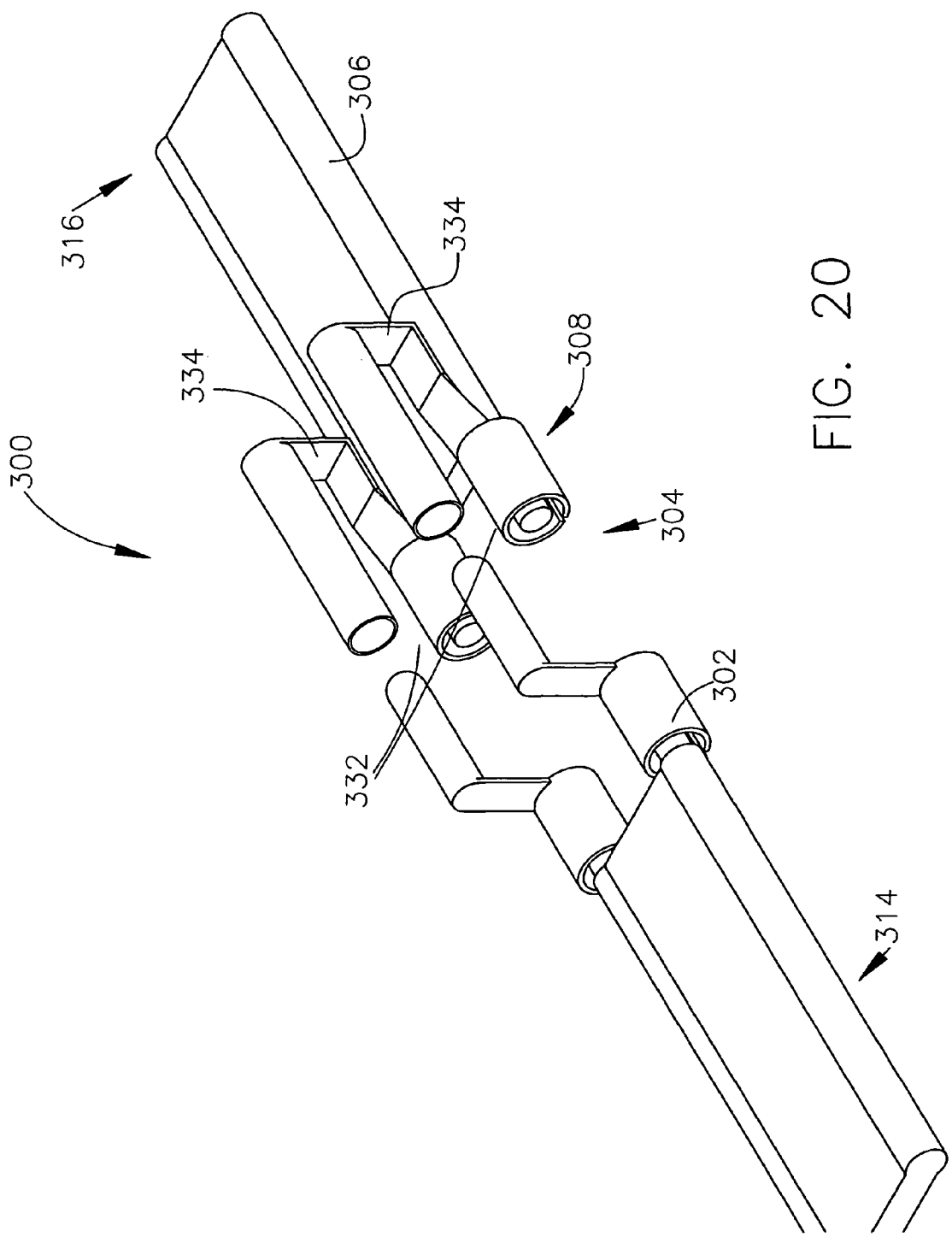
FIG. 20 is a perspective view of the heat trace sections of FIG. 18 in an engaged state in accordance with the teachings of the present disclosure.
Figure 21:
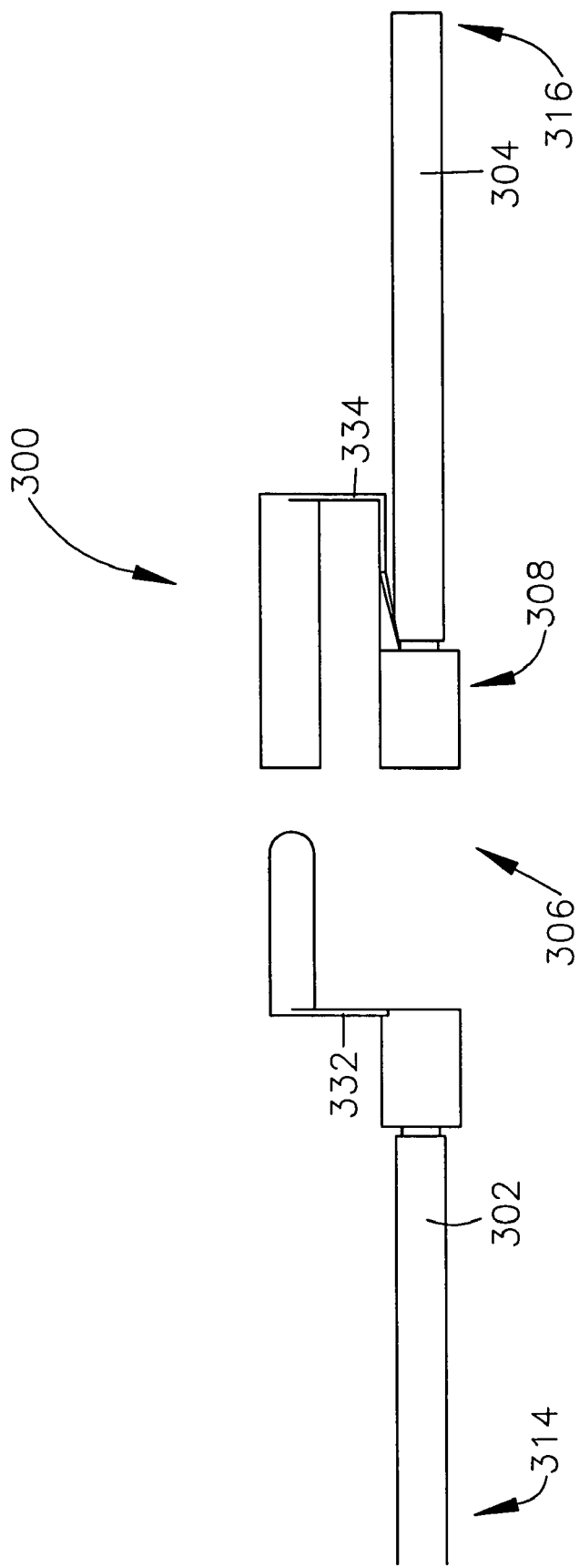
FIGS. 21 is a side view of the heat trace sections of FIG. 20 in accordance with the teachings of the present disclosure.

Referring now to FIGS. 15 through 17, in accordance with a third embodiment of the present disclosure, a heat trace junction for use with intersections or joints of a conduit system 10 is provided and is generally indicated by reference numeral 200. As shown, the heat trace junction 200 preferably defines a cross configuration having a plurality of arms 204 extending from a base portion 202. Each of the arms 204 have an engaging end 206 provided with a pair of conductors 208 for connecting to an adjacent power source (not shown) or an adjacent heat trace section or junction. Although only two conductors 208 are shown at the engaging ends 206, it should be understood that a plurality of conductors, i.e. more than two, may be employed according to specific power requirements while remaining within the scope of the present disclosure. Additionally, the path of the conductors 208 may vary according to specific heating requirements, and it should be understood that paths other than those illustrated herein, e.g. traveling down one or two arms 204 rather than all four as shown, should be construed as falling within the teachings and the scope of the present disclosure.

The heat trace junction 200 can be formed into an appropriate shape to be properly mounted to a junction of the conduit system 10. For example, the heat trace junction 200 can be formed into an elbow shape 210 as shown in FIG. 16 for use with an elbow junction of the conduit system 10 (shown in FIG. 1). Alternately, the heat trace junction 200 can be formed into a T-shape 212 as shown in FIG. 17 for use with a T-junction (not shown) of the conduit system 10. As further shown, the conductors 208 may comprise a variety of configurations as shown in FIGS. 16 and 17, depending on the need for connecting the junctions to an adjacent heat trace section or to a connector.

Referring to FIGS. 18 through 21, a modular heat trace connector assembly in accordance with a fourth embodiment of the present disclosure is generally indicated by numeral 300. The modular heat trace connector assembly 300 comprises a first heat trace section 302, a first termination structure 304, a second heat trace section 306, and a second termination structure 308. Although the first heat trace section 302 and the second heat trace section 306 are shown in FIGS. 18 through 21 to define a relatively flat shape, it should be understood that the respective heat trace sections 302 and 306 can be of any geometrical shape such as the circular or cylindrical shape previously illustrated. Accordingly, the flat shape should not be construed as limiting the scope of the present disclosure.

The first heat trace section 302 and the second heat trace section 306 each have an abutting end 310 and 312 and a distal end 314 and 316. The termination structures 304 and 308 are provided at the abutting ends 310 and 312 and have mating features for being mechanically and electrically coupled together. More specifically, the first termination structure 304 has an upper engaging portion 318 and a lower engaging portion 320. The second termination structure 308 also has a corresponding upper engaging portion 322 and a corresponding lower engaging portion 324. The upper engaging portion 318 of the first termination structure 304 defines a pin configuration while the upper engaging portion 322 of the second termination structure 308 defines a socket configuration to facilitate the engagement between the upper engaging portions 318 and 322. In one preferred form, the upper engaging portion 318 of the first termination structure 304 includes a pair of pins 326. The upper engaging portion 322 of the second termination structure 308 includes a corresponding pair of sockets 330 for receiving the pins 326 therein, thus providing a mechanical and electrical connection. Preferably, the termination structures 304 and 308 are made of a nickel material, although other materials such as copper that provide sufficient electrical continuity may also be employed while remaining within the scope of the present disclosure.

As further shown, the lower engaging portion 320 of the first termination structure 304 includes a pair of extensions 332 from which the pins 326 of the upper engaging portion 318 extend upwardly. The lower engaging portion 324 of the second termination structure 308 also includes a pair of extensions 334 from which the engaging arms 328 of the upper engaging portion 322 extend. The extensions 322 and 334 each receive therein a conductor 336 of the heat traces 302 and 306 for electrical continuity.

Though not shown in the drawings, the distal ends 314 and 316 of the first heat trace section 302 and the second heat trace section 306 may optionally be provided with termination structures 304 or 308 to be connected to additional sections of heat traces or to a connector. Alternatively, the distal ends 314 and 316 may be provided with suitable engaging means (not shown in the drawings) for being connected to a power source (not shown).

Figure 22:
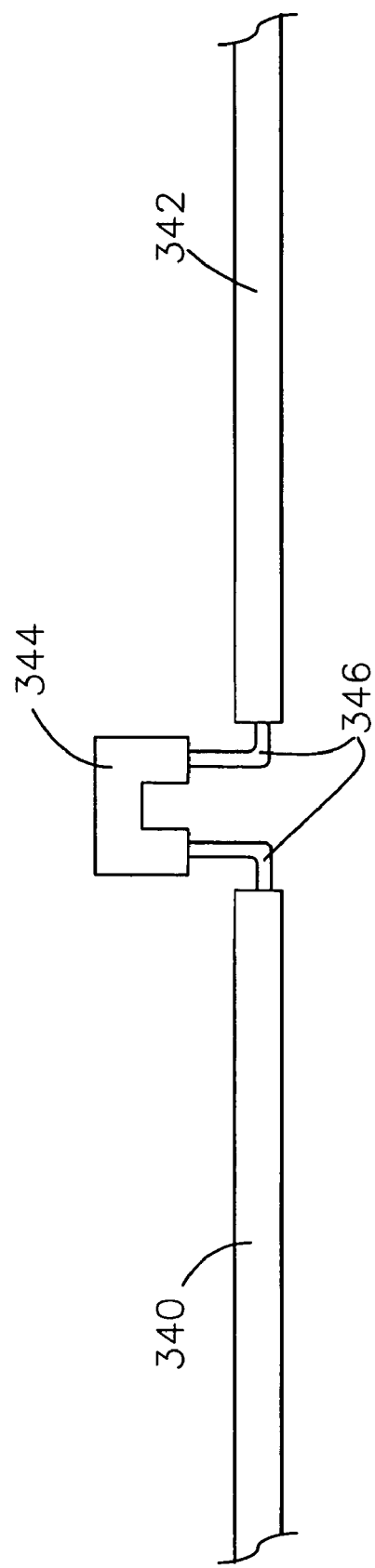
FIG. 22 is a side view of an alternate form of connecting the heat trace sections of FIGS. 18-21 and constructed in accordance with the teachings of the present disclosure.

Referring to FIG. 22, an alternate connector for connecting heat trace sections 340 and 342 is illustrated and generally indicated by reference numeral 344. The connector 344 generally defines a "U" configuration to connect the conductors 346 as shown. The flexible conductors 346 are turned upwards as shown in order to engage the connector 344, which defines receiving holes (not shown) in one form of the present disclosure. The connector 344 may be press-fit, bonded, or welded onto the conductors 346 in accordance with techniques as known in the art. Accordingly, the ends of heat trace section 340 and 342 having exposed conductors 346 are closer together than the previously illustrated embodiment, thus improving the uniformity of heat transfer along the heat trace sections.

The modular heat trace connector assembly 300 is thus configured to position the pin and socket connection area away from the hot surface of the heat trace sections 302 and 306 in order to reduce thermal fatigue of the pins and sockets in high temperature applications.

Although the above-described modular heater assembly 50 has been illustrated and detailed as having a construction similar to a conventional heat trace cable, it should be understood that other types of heater construction besides a heat trace cable construction may also be employed while remaining within the scope of the present disclosure. A heater type such as a polymer heater or a layered film heater, among others, that is modular and can easily be replaced and repaired in a conduit system using the modular connectors and other embodiments as described herein should be construed as being within the scope of the present disclosure.

Figure 23:
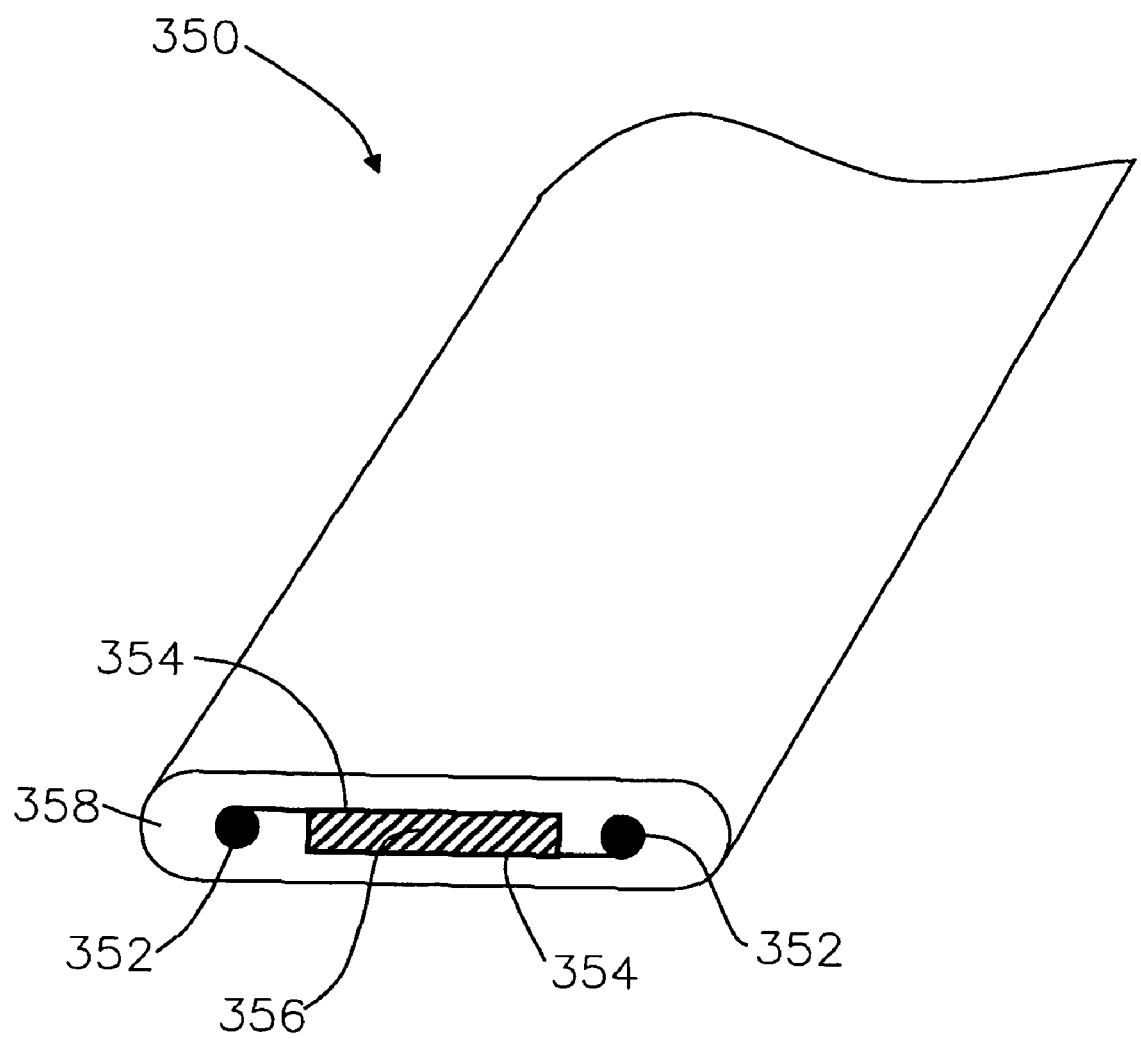
FIG. 23 is a perspective cutaway view of another embodiment of a heater construction, a z-directional heater, in accordance with the teachings of the present disclosure.

With reference to FIG. 23, an embodiment of a z-directional heater in accordance in the teachings of the present disclosure is illustrated and generally indicated by reference numeral 350. The z-directional heater 350 comprises a pair of conductors 352, each of which are electrically connected to foil elements 354. A conductive polymer material 356 is disposed between the foil elements 354 as shown, and an insulating material 358 surrounds the entire assembly. The z-directional heater 350 is adapted for a modular construction as previously described, and with the addition of the foil elements 354, the quality of the heat provided by the heater can be tailored to specific application requirements. It should be understood that the shape and configuration of the z-directional heater 350 is exemplary only and other shapes and additional elements, such as those described herein, e.g., tubular shape, a ground plane element, may also be employed while remaining within the scope of the present disclosure. Moreover, elements 354 are not limited to a foil material, and in alternate forms comprise a grid or screen material.

The z-directional heater 350 is preferably formed as a sheet of material with multiple conductors 352 and corresponding foil elements 354. As such, any size of z-directional heater 350 can be easily cut or removed from the sheet according to specific application requirements. For example, multiple sections of conductors 352 and foil elements 354, e.g. more than one set of each, can be removed across a width of the sheet, along with cutting the length of the conductors 352 and foil elements 354 to the desired dimension(s).

Figure 24:
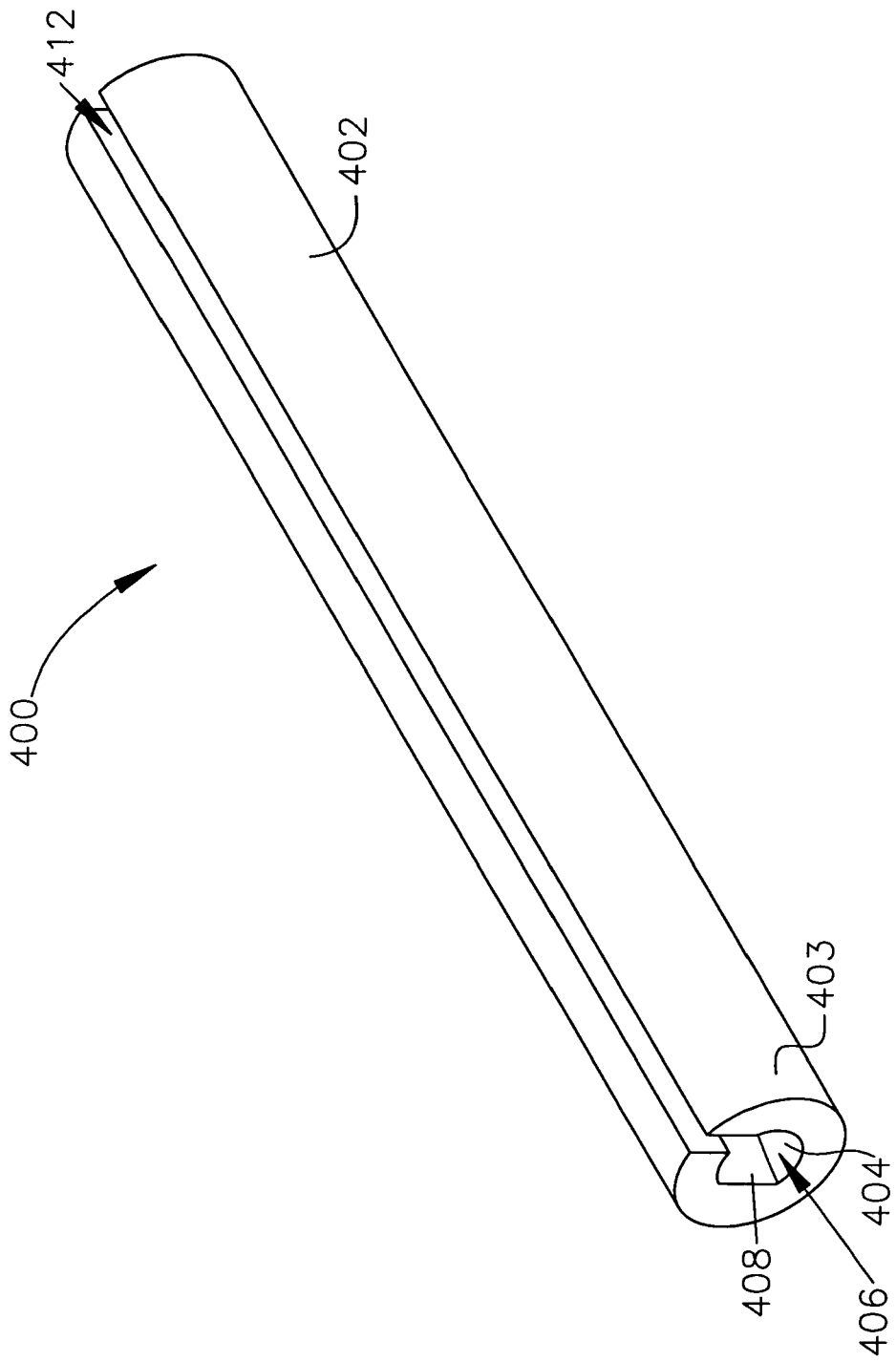
FIG. 24 is a perspective view of a thermal insulation jacket for a heated conduit constructed in accordance with the teachings of the present disclosure.
Figure 25:
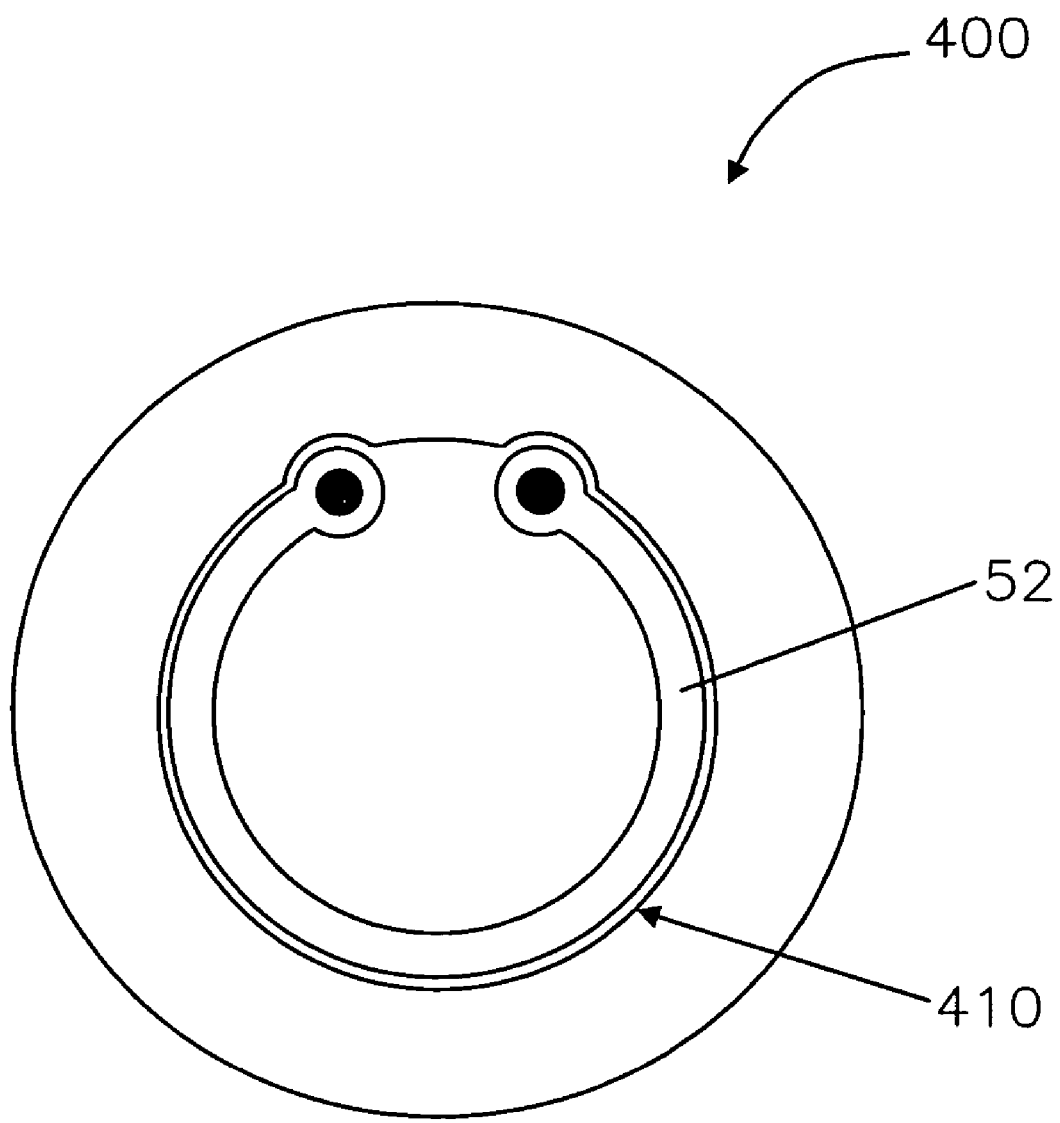
FIG. 25 is an end view of a thermal insulation jacket with an alternate pocket configuration and constructed in accordance with the teachings of the present disclosure.

Referring now to FIG. 24, a thermal insulation jacket for a heat-traced conduit, or a heated conduit (not shown), is generally indicated by reference numeral 400. The thermal insulation jacket 400 preferably defines a tubular insulation body 402, which has an outer wall 403 and an inner wall 404 defining a channel 406 for receiving a heated conduit, which may be a heat-traced conduit as previously described. The inner wall 404 defines a pocket 408 to house a conventional heat trace cable, as previously described, that is placed along the length of a conduit. Alternately, the pocket 408 may take any number of shapes, such as an arcuate pocket 410 as shown in FIG. 25, to accommodate the heat trace section 52 as shown and described herein. Accordingly, the shape of the pocket 408 is designed to mirror or conform to the shape of the heat trace section, whatever that shape might be. Additionally, the thermal insulation jacket 400 having pocket 408 can alternately be provided with a slit 412 so that the jacket 400 can be deformed and placed over a conduit rather than being slid along the length of the conduit. Moreover, the thermal insulation jacket 400 in the configurations as shown can serve to accurately position one or more heat trace sections against the conduit for the purpose of controlling the heat losses to atmosphere.

Figure 26:
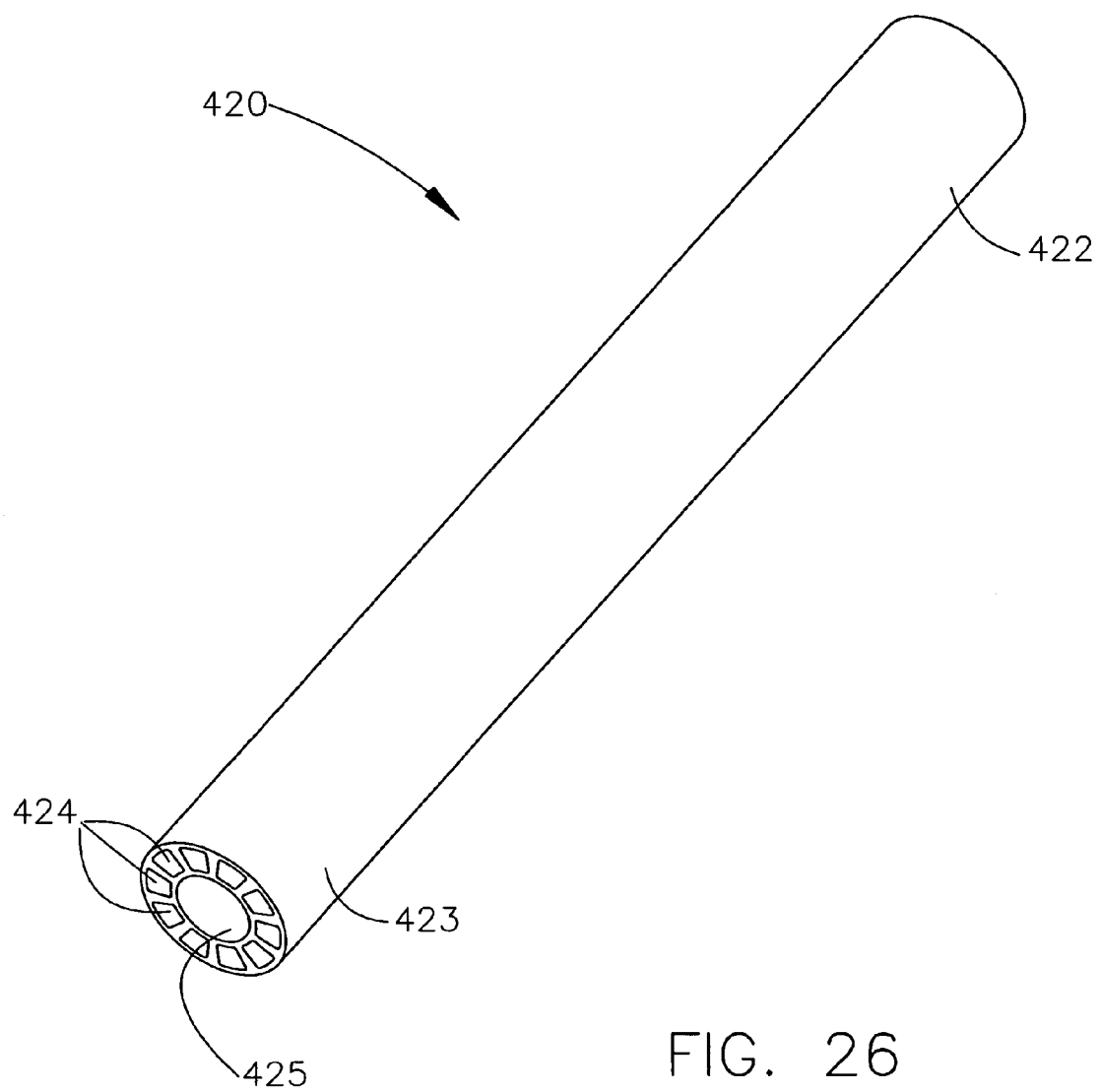
FIG. 26 is a perspective view of another form of a thermal insulation jacket for a heated conduit constructed in accordance with the teachings of the present disclosure.

Referring to FIG. 26, another form of a thermal insulation jacket for a heated conduit is generally indicated by reference numeral 420. The thermal insulation jacket 420 preferably defines a tubular insulation body 422 defining an outer wall 423 and an inner wall 425. The tubular insulation body 422 is formed with a plurality of air chambers 424 extending longitudinally between the outer wall 423 and the inner wall 425 as shown. The air chambers 424 thus provide an area to improve the uniformity of heat dissipation along the heat trace sections and to reduce heat losses through the thermal insulation jacket 420.

Figure 27:
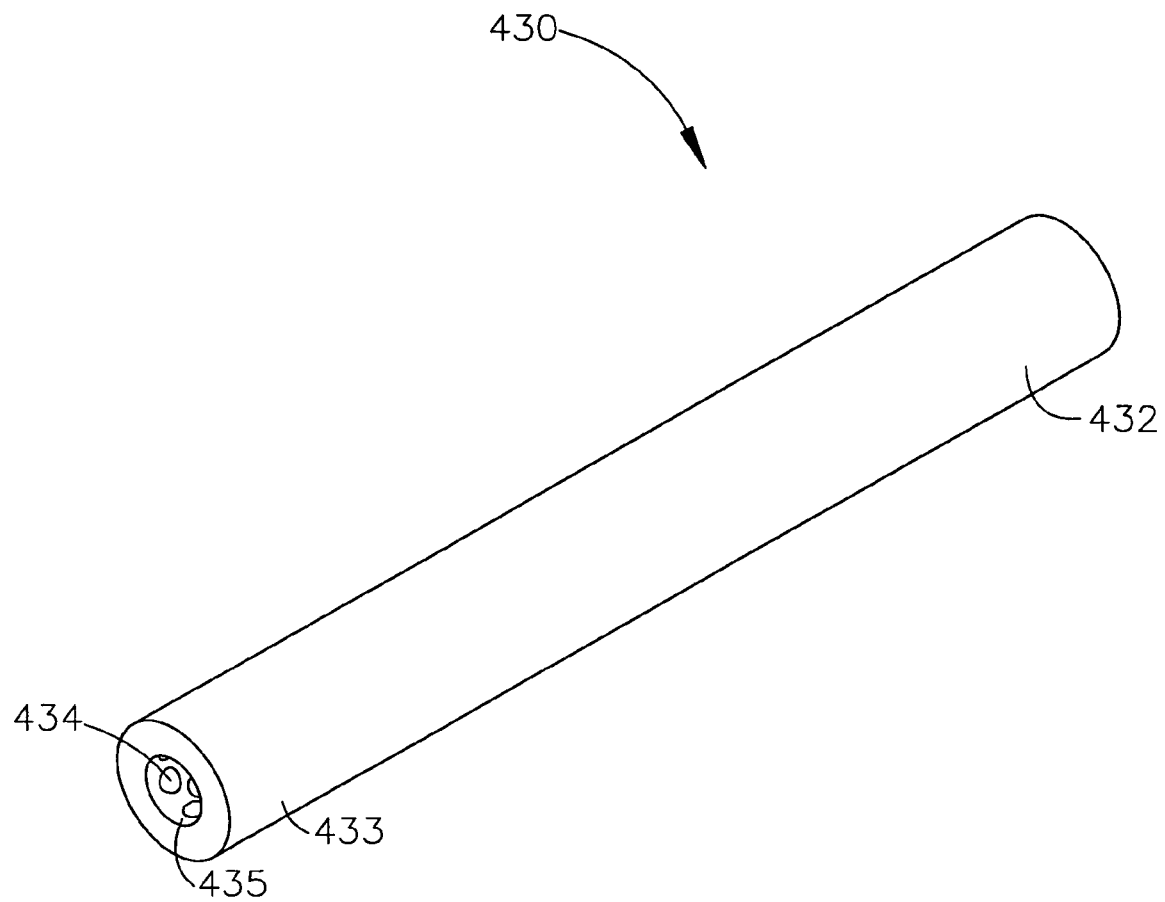
FIG. 27 is a perspective view of a still another form of a thermal insulation jacket for a heated conduit constructed in accordance with the teachings of the present disclosure.

Referring to FIG. 27, another form of a thermal insulation jacket for heated conduit and having air chambers is generally indicated by reference numeral 430. The thermal insulation jacket 430 preferably defines a tubular insulation body 432 having an outer wall 433 and an inner wall 435. As shown, the tubular insulation body 432 has a plurality of air pockets 434 formed into the inner wall 435 and arranged in a somewhat random configuration along the longitudinal direction of the tubular insulation body 432. Accordingly, the air pockets 434 reduce heat losses through the thermal insulation jacket 430.

Figure 28:
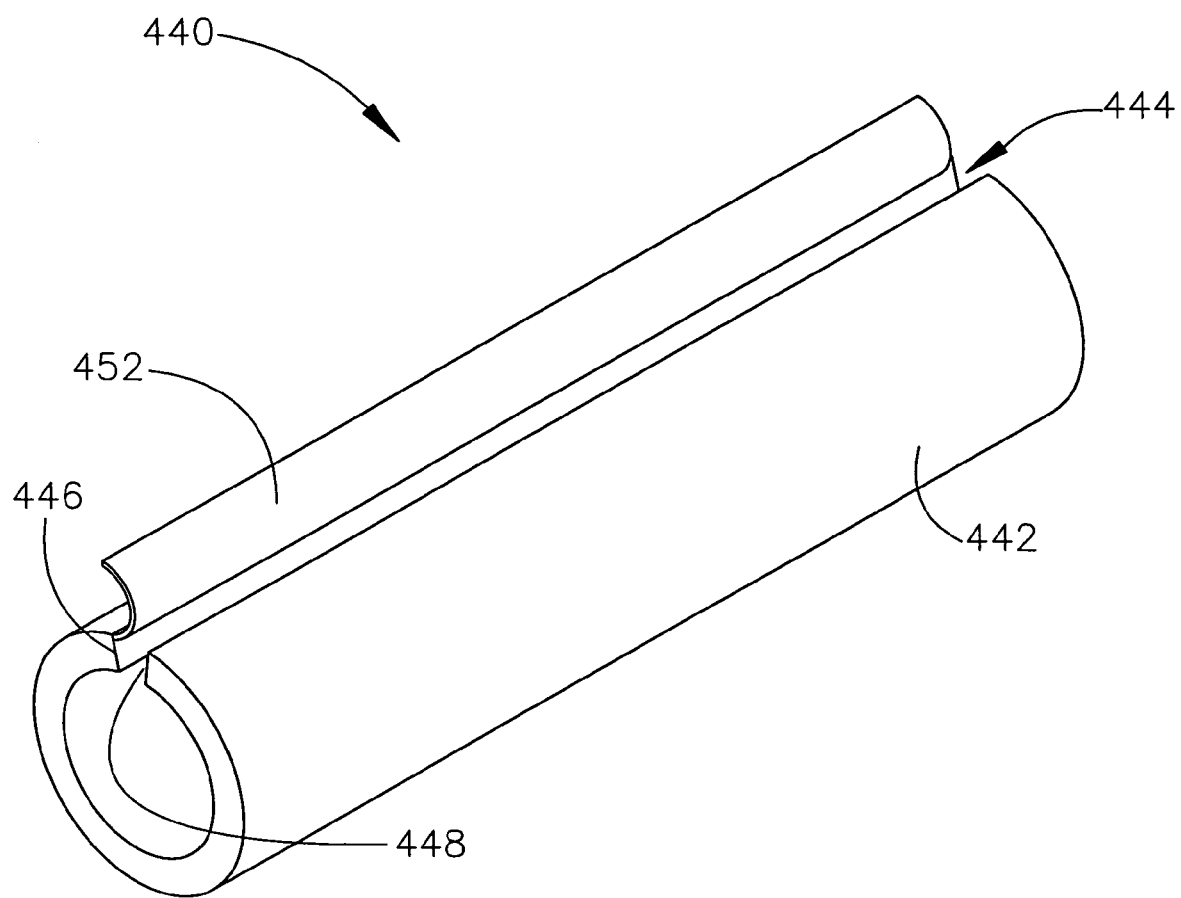
FIG. 28 is a perspective view of yet another form of a thermal insulation jacket for a heated conduit constructed in accordance with the teachings of the present disclosure.

Referring to FIG. 28, still another form of a thermal insulation jacket for a heated conduit is generally indicated by reference numeral 440. The thermal insulation jacket 440 defines a tubular insulation body 442, which has a longitudinal slit 444 defined by opposing longitudinal edges 446 and 448. The opposing longitudinal edges 446 and 448 are spaced apart in a circumferential direction and are properly spaced to allow for placement around a heated conduit. More specifically, the tubular insulation body 442 is made of a flexible material, e.g., silicone rubber sheet or foam, neoprene, polyimide foam or tape, among many others, such that the longitudinal edges 446 and 448 are deflected outwardly and are then biased against the heated conduit.

As further shown, one of the longitudinal edges 446 is provided with a flap 452 for properly engaging the other one of the longitudinal edges 446 after the thermal insulation jacket 440 is placed around the heated conduit. Using the flap 452 to close the longitudinal slit 444 helps to reduce heat loss to the outside environment. Preferably, the flap 452 is also made of a thermal insulation material to provide thermal insulation. The flap 452 may be made of an adhesive tape, or provided with an adhesive coating, or alternately may be Velcro® or a flap that includes mechanical snaps, among other securing techniques, such that the flap 452 is secured to the other one of the longitudinal edges 448 and along an outer surface of the tubular insulation body 442.

In each of the thermal insulation jacket embodiments as described herein, it is preferable that the jackets are extruded. Additionally, it should be understood that any of the features, e.g., air chambers, pockets sized to the heat trace section geometry, longitudinal slit, and flap, may be provided alone or in combination with each other while remaining within the scope of the present disclosure. Moreover, multiple pockets may be provided to facilitate multiple heat trace sections 52 while not departing from the spirit and scope of the present disclosure.

Figure 29:
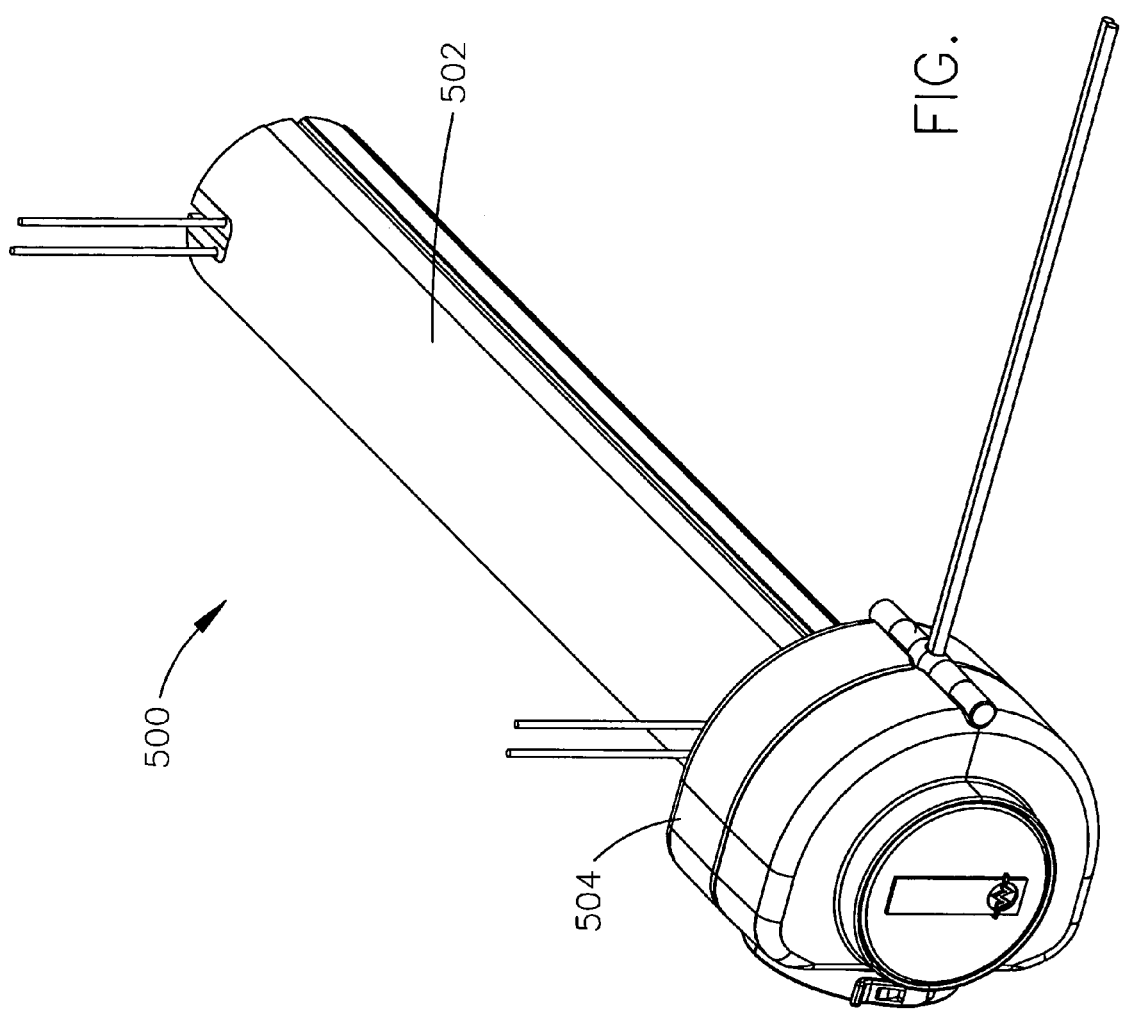
FIG. 29 is a perspective view of another embodiment of a modular heat trace assembly constructed in accordance with the teachings of the present disclosure.
Figure 30:
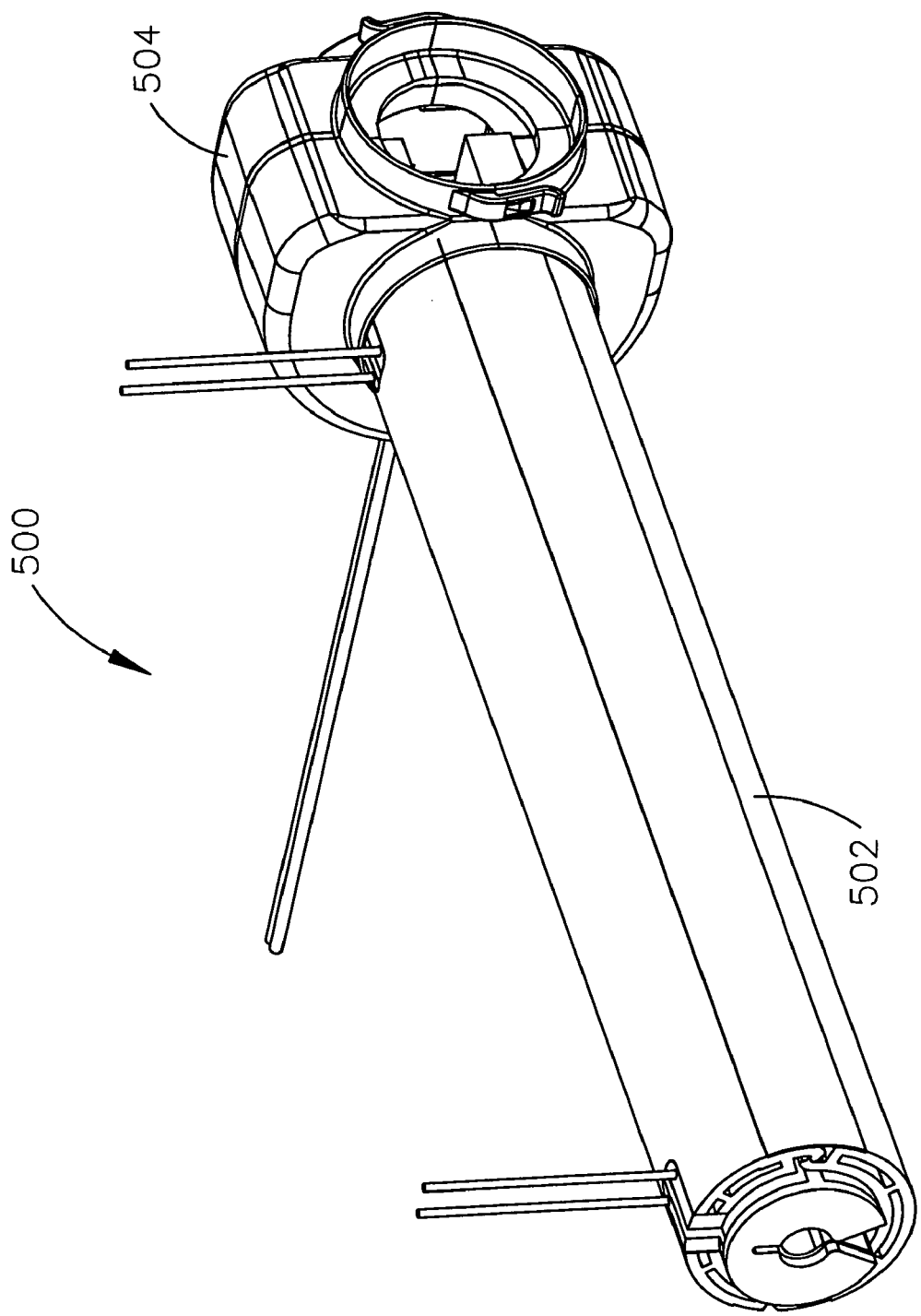
FIG. 30 is another perspective view of the modular heat trace assembly of FIG. 29 in accordance with the teachings of the present disclosure.
Figure 31:
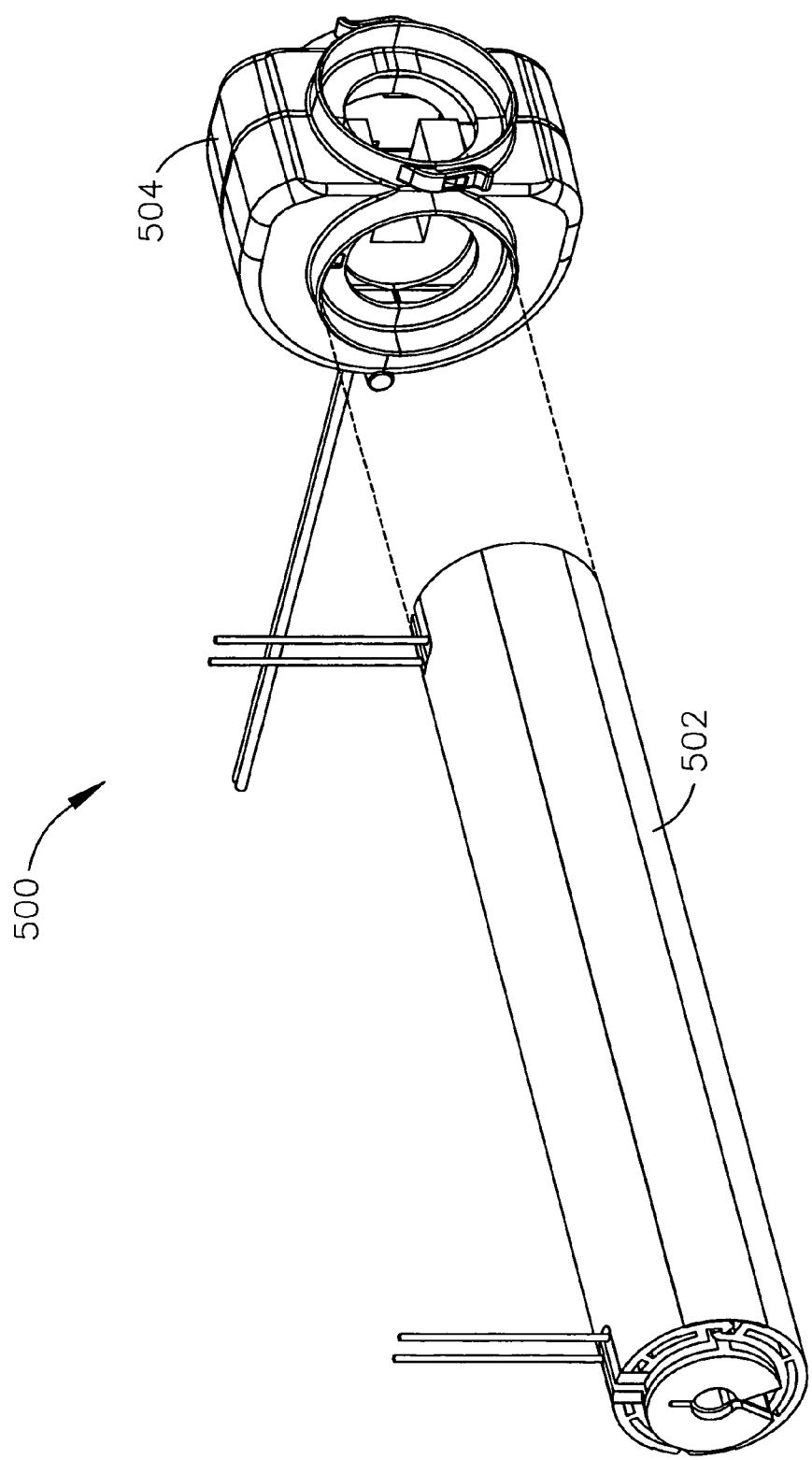
FIG. 31 is an exploded perspective view of the modular heat trace assembly of FIG. 30 in accordance with the teachings of the present disclosure.

Referring now to FIGS. 29-31, another form of a modular heater system is illustrated and generally indicated by reference numeral 500. Generally, the modular heater system 500 comprises a heat trace assembly 502 and a connector assembly 504. Only one (1) heat trace assembly 502 and one (1) connector assembly 504 are shown for purposes of clarity, and it should be understood that the modular heater system 500 can, and often does, include a plurality of either or both heat trace assemblies 502 and connector assemblies 504, depending on the end application.

The heat trace assembly 502 is adapted for contacting and heating, for example, a conduit 13 of the semiconductor processing system 10 as previously described and shown in FIGS. 1 and 2. It should be understood that the modular heater system 500 can be applied to numerous end applications, and thus the semiconductor processing system 10 as illustrated and described herein is merely exemplary. Accordingly, these end applications are hereinafter referred to as "target systems" for the modular heater system 500. The connector assembly 504 is also adapted for contacting and heating, for example, a joint, connector, or other component of the target system. Additionally, the connector assembly 504 secures adjacent heat trace assemblies 502 to each other and accommodates the joints, connectors, or other components of the target system. The connector assembly also provides both heat to the components of the target system and insulation from heat loss to the outside environment, among other functions, as described in greater detail below.

Heat Trace Assembly 502

Figure 32:
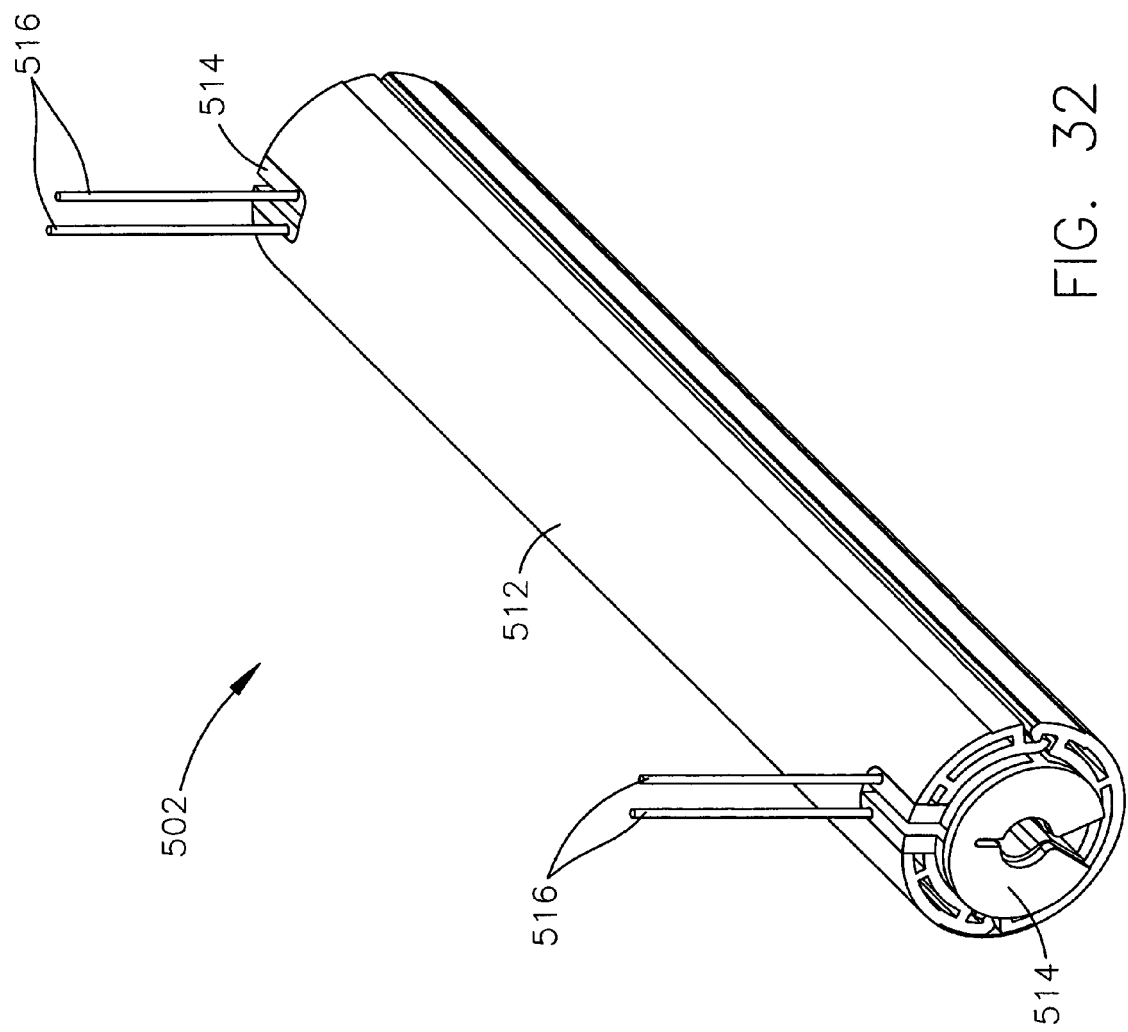
FIG. 32 is a perspective view of a heat trace section constructed in accordance with the teachings of the present disclosure.
Figure 33:
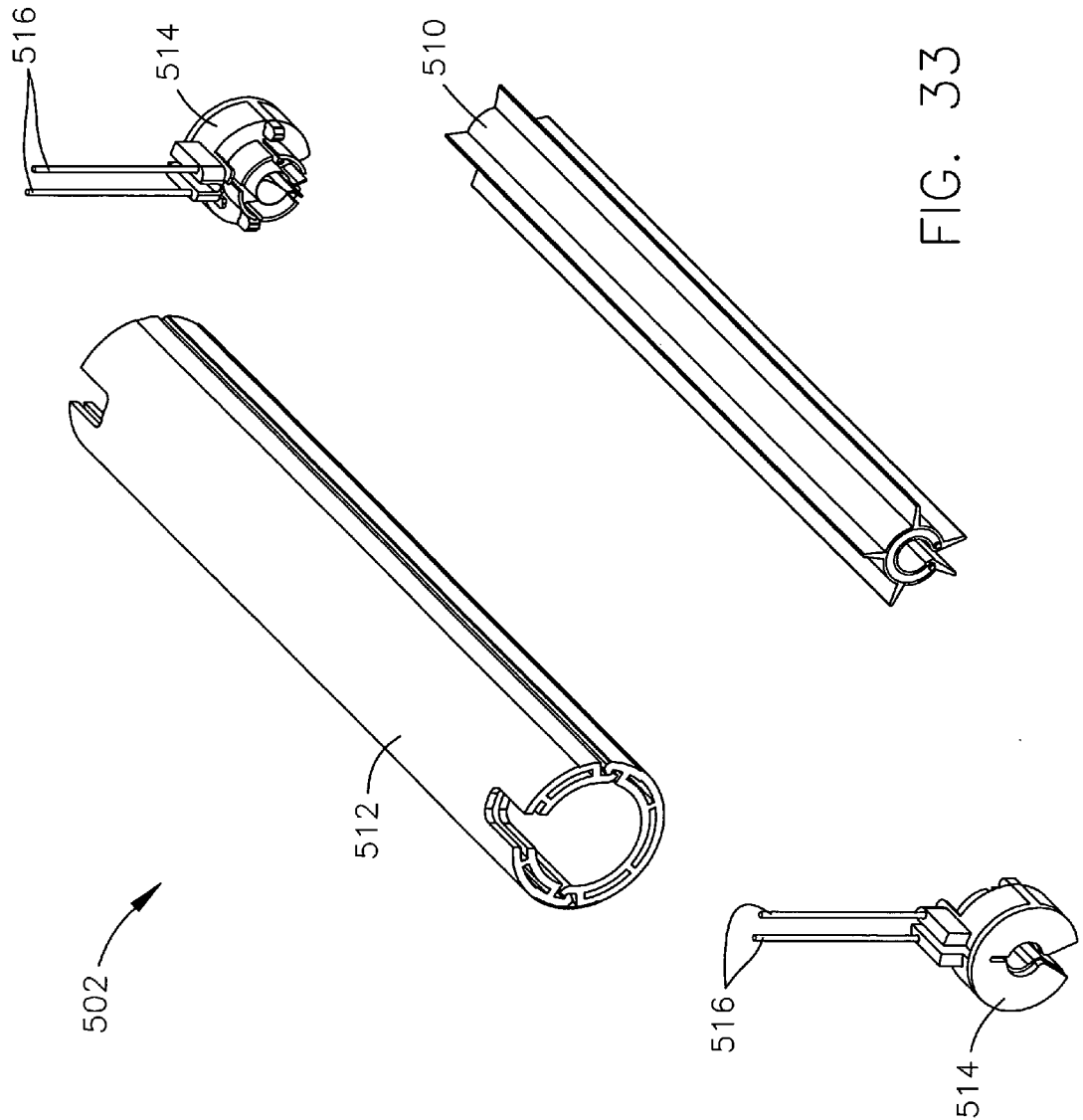
FIG. 33 is an exploded perspective view of the heat trace section in accordance with the teachings of the present disclosure.

As shown in FIGS. 32 and 33, the heat trace assembly 502 comprises a heat trace section 510, an insulation jacket 512, and terminating members 514. Generally, the insulation jacket 512 is adapted for placement around the heat trace section 510, and the terminating members 514 are adapted for engagement with both the heat trace section 510 and the insulation jacket 512. The terminating members 514 also provide for the electrical connections between the heat trace section 510 and the adjacent connector assembly 504 as previously illustrated, or between an adjacent heat trace section 510 and a power source (not shown). Accordingly, lead wires 516 (which are illustrated only partially and as straight segments for purposes of clarity) exit the terminating members 514 to create these adjacent electrical connections.

Figure 34:
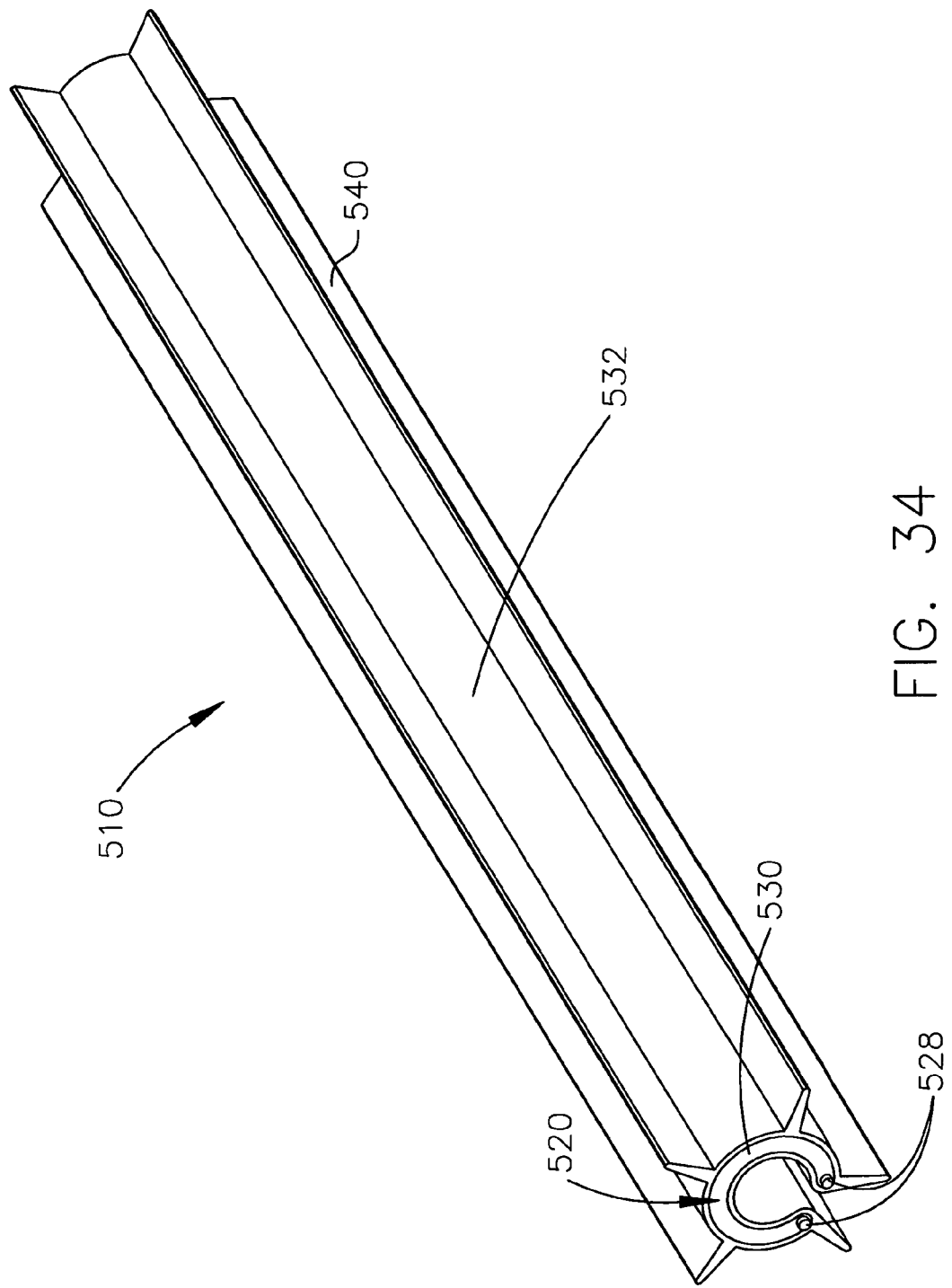
FIG. 34 is a perspective view of a heat trace section comprising fins and constructed in accordance with the teachings of the present disclosure.
Figure 35:
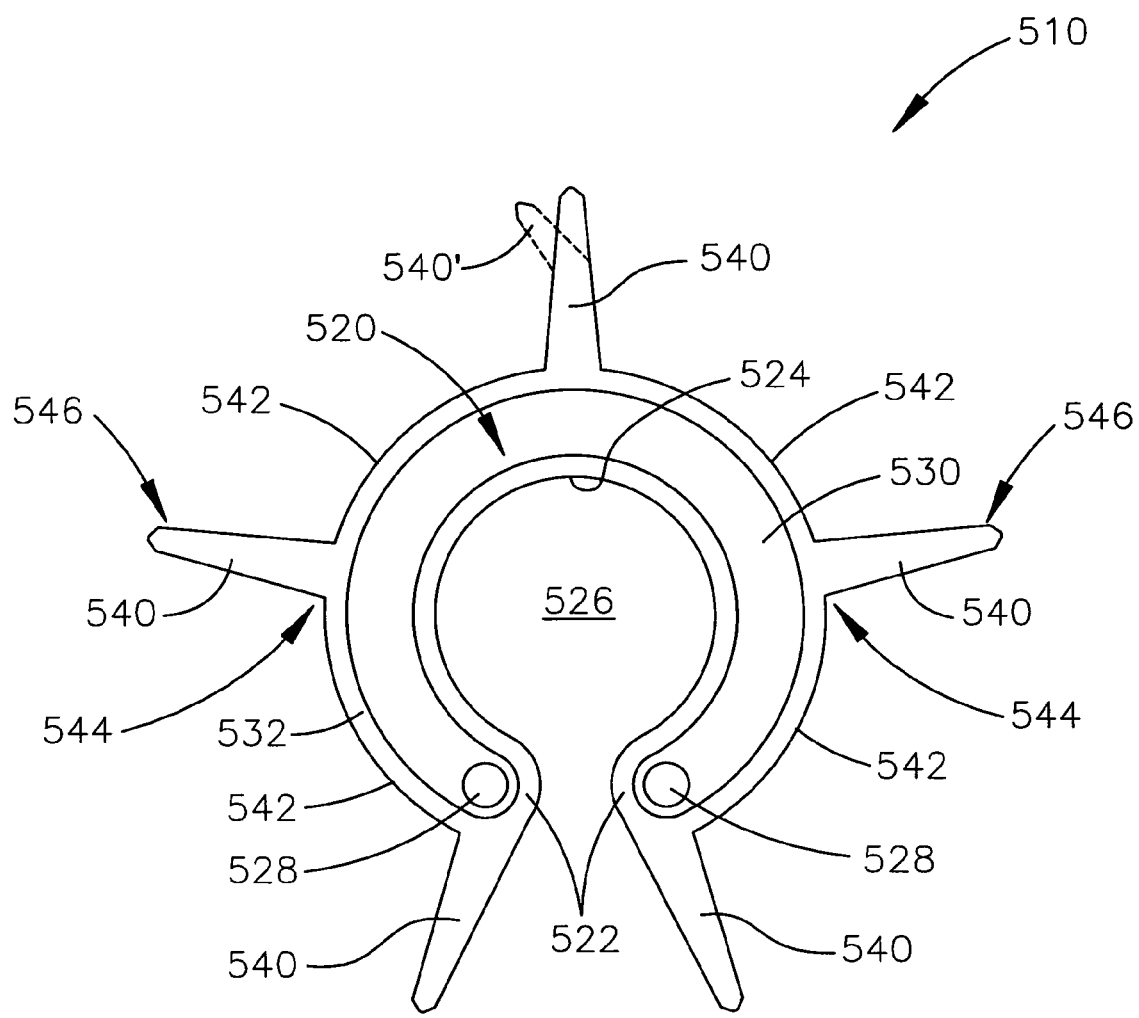
FIG. 35 is an end view of the heat trace section comprising fins in accordance with the teachings of the present disclosure.
Figure 36:
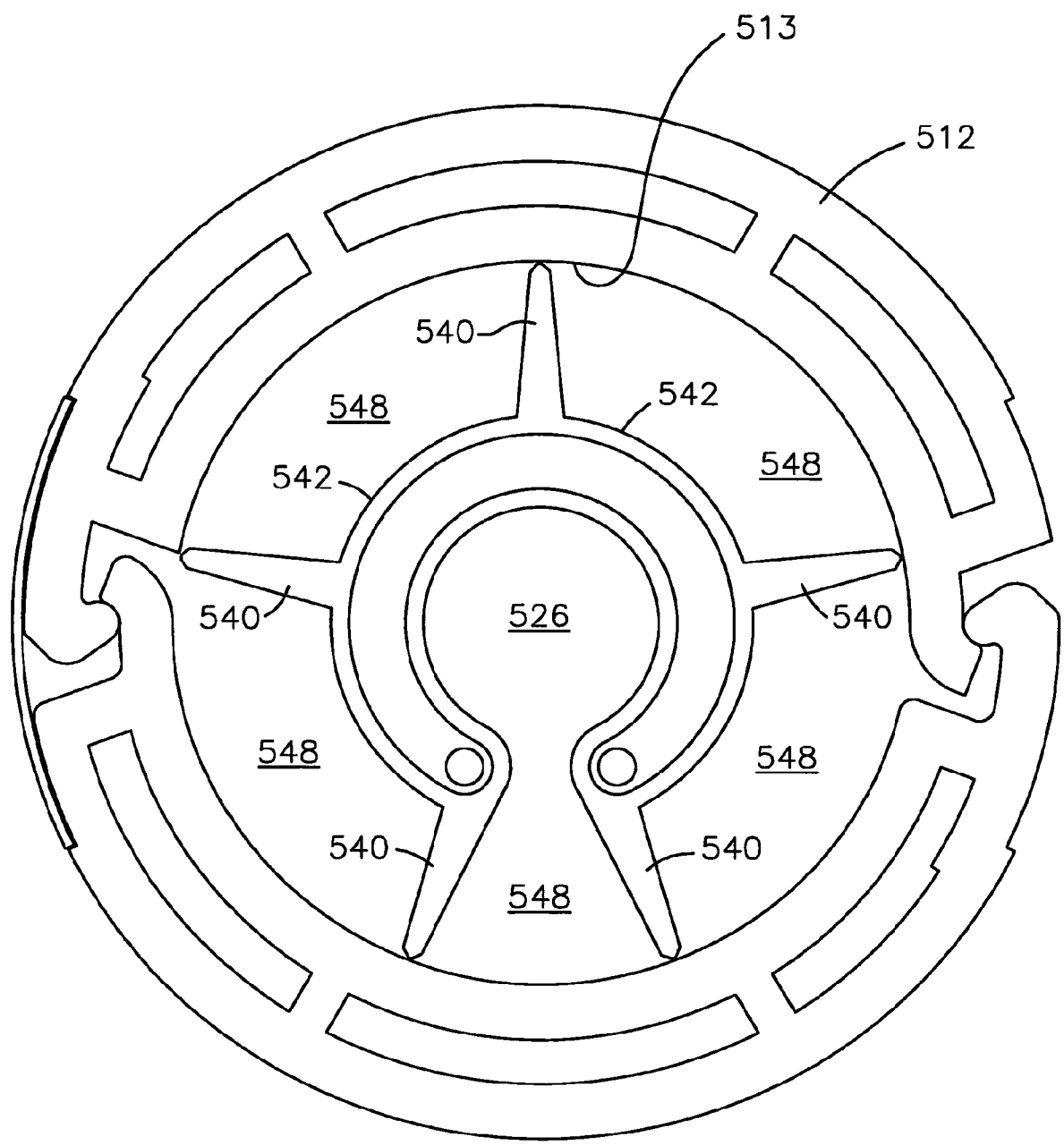
FIG. 36 is an end view of the heat trace section comprising fins and disposed within an insulation jacket in accordance with the teachings of the present disclosure.

Referring to FIGS. 34-36, the heat trace section 510 is illustrated and now described in greater detail. As shown, the heat trace section 510 defines an elongated shape and includes a curved portion 520 and a pair of opposed locking edges 522 extending longitudinally along the heat trace section 510. The curved portion 520 defines an inner surface 524 that encompasses an open channel 526 for placement around, for example, the conduit 13 as previously illustrated and described in FIGS. 5 and 6. The inner surface 524 is preferably complementary to an outer surface of the conduit 13 to improve the heat transfer and the connection between the heat trace section 510 and the conduit 13. The curved portion 520 preferably surrounds at least half of the entire outer surface of the conduit 13 to provide more uniform heat transfer and to allow for self-locking of the heat trace section 510 around the conduit 13 by the locking edges 522. The locking edges 522 function as the previously illustrated and described locking edges 58 (FIGS. 7 and 8) and are therefore not described in further detail hereinafter. Additionally, the heat trace section 510 also comprises conductors 528 as shown, which function as the previously illustrated and described conductors 64 (FIGS. 7 and 8) and are similarly not described in further detail hereinafter.

Similar to the previously described heat trace sections 52 (FIGS. 7 and 8), the heat trace sections 510 are preferably preformed in sizes corresponding to different sizes, or outside peripheries of, for example, the conduit 13. The heat trace sections 510 are preferably extruded and are also capable of being cut to length, according to a desired length for a particular section of conduit 13. Preferably, the heat trace sections 510 are provided in standard sizes and lengths for ease of repair and replacement within a conduit system such as the semiconductor processing system 10 as previously illustrated and described. Accordingly, the modular construction of the heater system according to the teachings of the present disclosure facilitates a relatively low cost heater system that is easily adapted to, for example, a conduit system.

As further shown, the heat trace section 510 preferably comprises a semiconductive polymer core 530 surrounded by a dielectric cover 532. Although not illustrated, the heat trace section 510 may also comprise optional materials for a ground plane and an outer cover, among other functional materials, as previously described. Additionally, the dielectric cover 532 is preferably co-extruded with the semiconductive polymer core 530, however, the dielectric cover 532 may alternately be separately formed and adapted for placement around the semiconductive polymer core 530 in a post-assembly process.

Advantageously, the heat trace section 510 defines a plurality of insulation stand-offs, preferably in the form of fins 540 as shown, that extend from an outer surface 542 of the dielectric cover 532 and the locking edges 522, preferably in a normal direction as shown, towards an interior surface 513 of the insulation jacket 512. The fins 540 preferably taper as shown from a root section 544 to a tip section 546 and define passageways 548 between the plurality of fins 540 and the insulation jacket 512. When the heat trace section 510 is assembled within the insulation jacket 512 as shown in FIG. 36, these passageways 548 provide insulation, in the form of air as shown, such that heat loss from the heat trace section 510 to the outside environment during operation is further reduced. Additionally, the improved insulation effect provides for a "touch-safe" temperature on the outside of the insulation jacket 512 such that the heat trace assembly 502 can be contacted by a user during operation of the modular heater system 500.

It should be understood that any number of fins 540, along with different geometrical configurations of the fins 540 other than the tapering geometry as shown, may be employed while remaining within the scope of the present disclosure. For example, as shown in FIG. 35, angled fins 540' (shown dashed) may be employed to provide a "wiping" action against the interior surface 513 of the insulation jacket 512, resulting in passageways 548 that have an improved seal from adjacent passageways 548. Moreover, other geometrical configurations such as an "S" or a "Z" for the cross-sectional shape, rather than or in addition to the fins 540, may also be employed while remaining within the scope of the present disclosure. The passageways 548 may alternately be filled with an insulating material such as a foam, or a polyimide foam, among other forms of materials rather than employing air as illustrated and described herein while remaining within the scope of the present disclosure.

Figure 37:
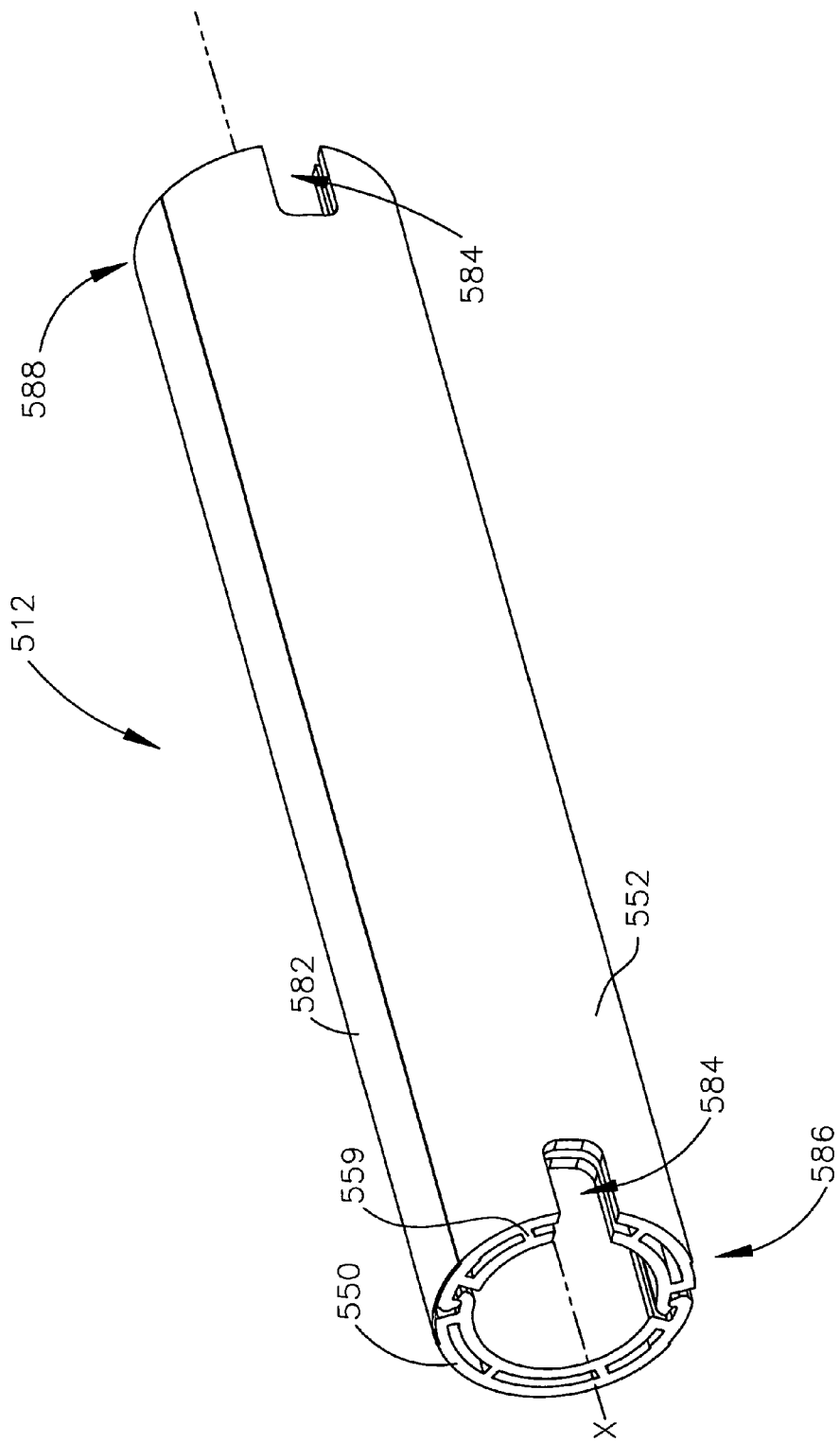
FIG. 37 is a perspective view of an insulation jacket constructed in accordance with the teachings of the present disclosure.
Figure 38:
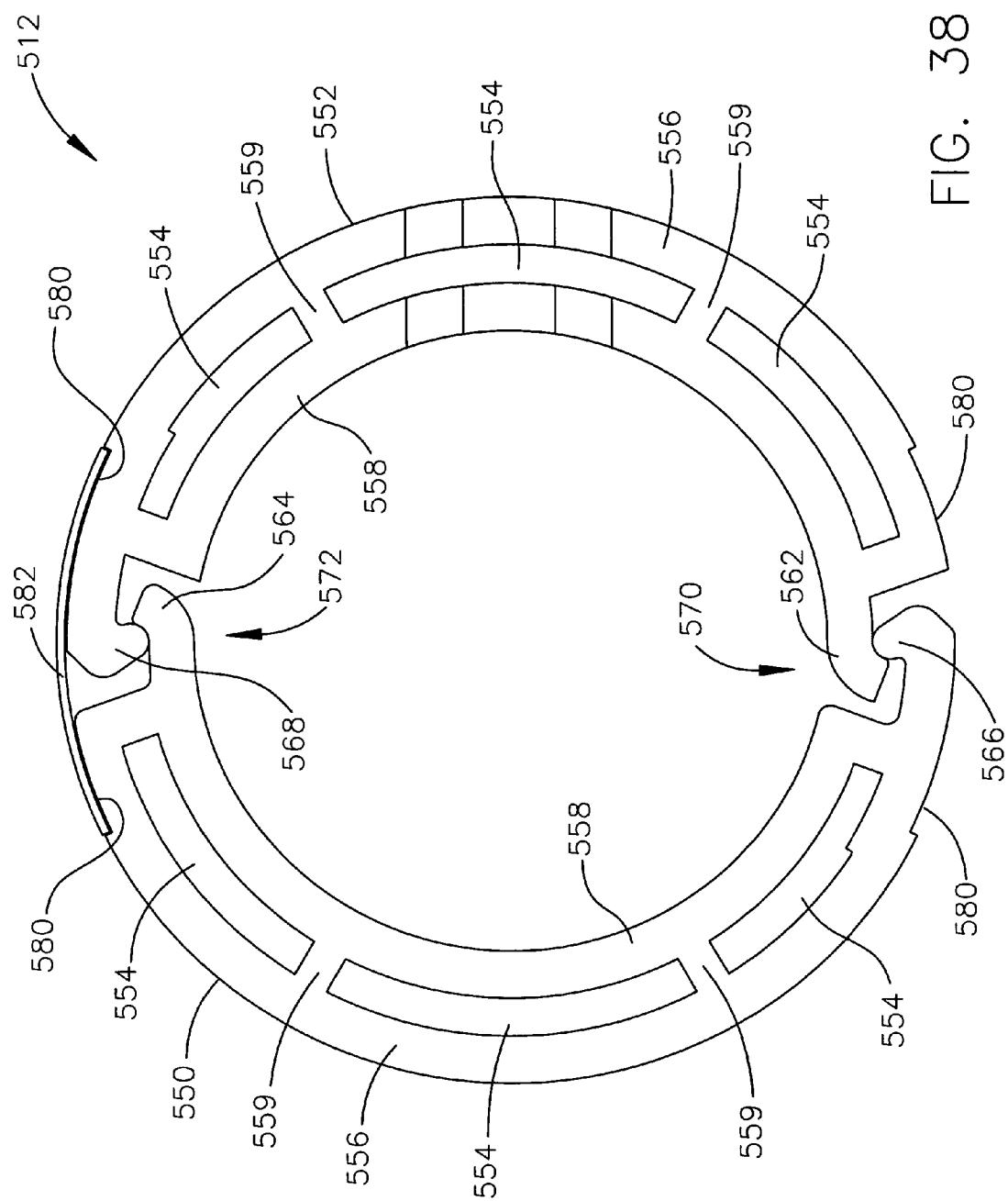
FIG. 38 is an end view of the insulation jacket in accordance with the teachings of the present disclosure.

Referring now to FIGS. 37 and 38, the insulation jacket 512 is illustrated and now described in greater detail. As shown, the insulation jacket 512 preferably comprises two (2) segments 550 and 552, which are preferably symmetrical such that the same segment can be used for the assembled insulation jacket 512, and as such, the segments 550 and 552 are interchangeable. Each segment 550 and 552 defines a shape that is compatible with the heat trace section 510 as previously described, i.e. circular in the embodiment illustrated herein. The segments 550 and 552 further comprise chambers 554 extending longitudinally between an outer wall 556 and an inner wall 558, which are separated by supports 559. The chambers 554 provide insulation, in the form of air as shown, such that heat loss from the heat trace section 510 to the outside environment during operation is further reduced. Preferably, the insulation jacket 512 is also extruded and comprises a semi-rigid polymeric material such as polycarbonate in one form of the present disclosure. Alternately, the insulation jacket 512 may comprise other materials such as those set forth above in connection with the alternate thermal insulation jackets shown in FIGS. 24-28.

As further shown, the insulation jacket 512 includes a hinge and snap feature such that the insulation jacket 512 can be easily installed onto and removed from the heat trace section 510. More specifically, each segment 550 and 552 comprises opposed curved lips 562 and 564 and adjacent opposed locking tabs 566 and 568, respectively, that extend longitudinally along opposed hinges 570 and 572 of the insulation jacket 512. One of the locking tabs 566 is first engaged within an adjacent curved lip 562, and then the two segments 550 and 552 are rotated about a longitudinal axis X of the insulation jacket 512 until the opposed locking tab 568 engages and snaps over the adjacent curved lip 564. As such, the insulation jacket 512 is easily installed onto the heat trace section 510 without the need for additional parts or hardware. To remove the insulation jacket 512, the two segments 550 and 552 are simply rotated about the longitudinal axis X towards one another such that the locking tab 568 disengages from the curved lip 564. Accordingly, the insulation jacket 512 is preferably a resilient and relatively flexible material, such as the semi-rigid polycarbonate as described above, to enable this hinge and snap feature.

In an alternate form, each of the two segments 550 and 552 preferably comprise recessed outer surfaces 580 proximate the hinges 570 and 572 as shown. The recessed outer surfaces 580 accommodate strips of tape 582, (only one strip of tape 582 is illustrated for purposes of clarity), which provide additional insulation and further secure the two segments 550 and 552 together. Preferably, the tape 582 is non-conductive and is a material such polyester or polyimide, by way of example. It should be understood that the illustration and description of tape is exemplary only and other securing members such as Velcro®, among others, may also be employed while remaining within the scope of the present disclosure.

Referring to FIG. 37, at least one of the segments, segment 552 as shown, further comprises slots 584 formed proximate the end portions 586 and 588. These slots 584 accommodate features of the terminating members 514 shown in FIGS. 32 and 33, which are now described in greater detail.

Figure 39:
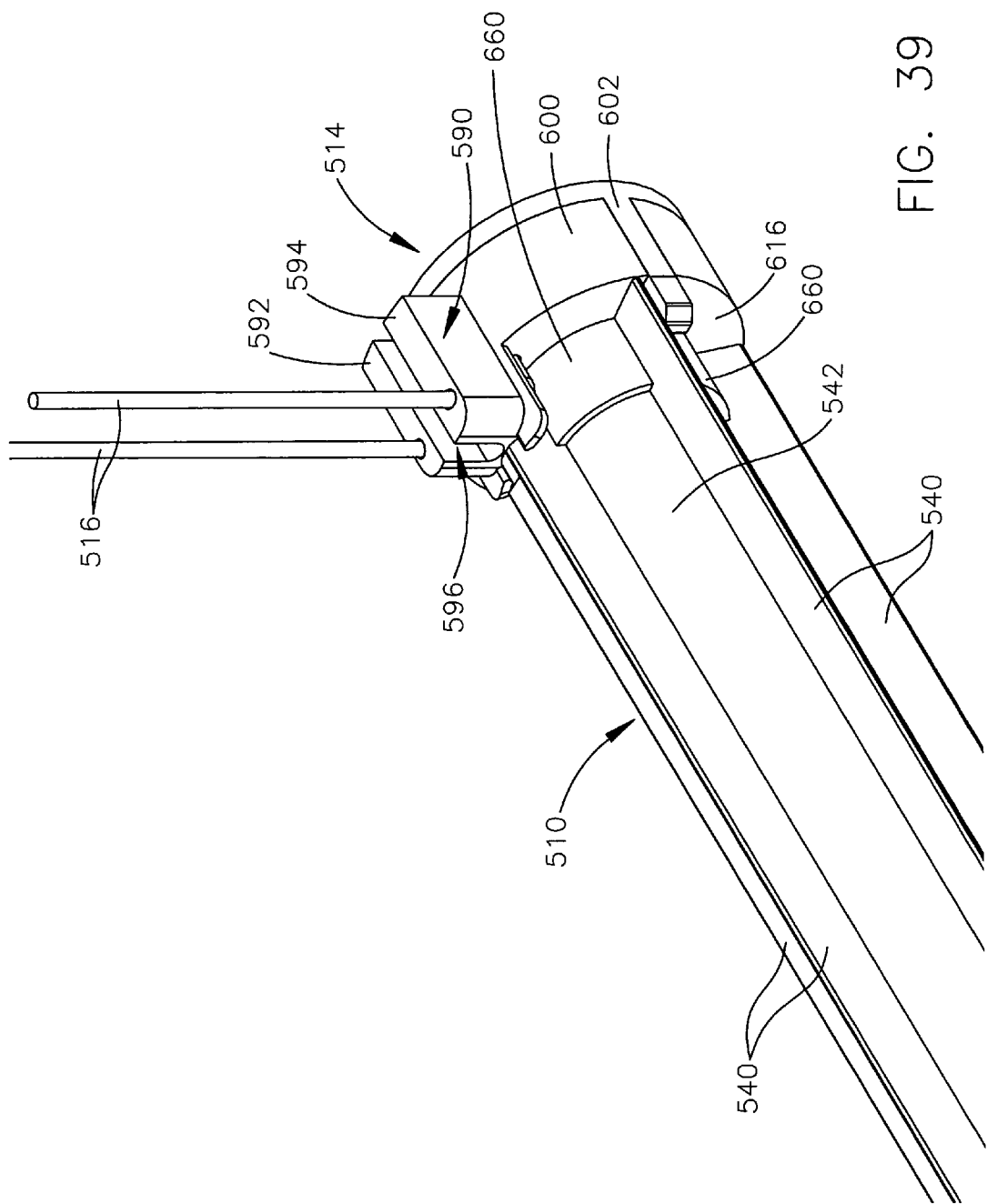
FIG. 39 is a perspective view of a heat trace section engaging a terminating member and constructed in accordance with the teachings of the present disclosure.
Figure 40:
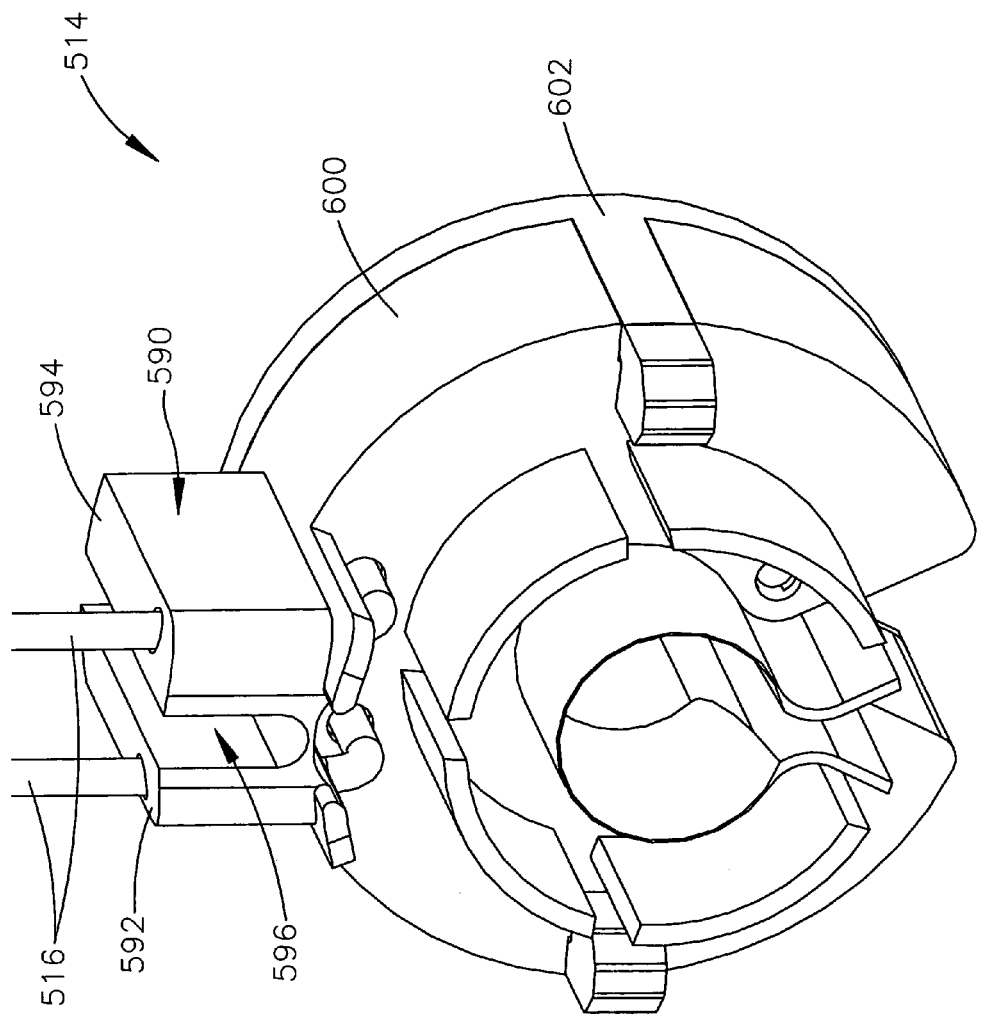
FIG. 40 is a perspective view of the terminating member in accordance with the teachings of the present disclosure.

Referring to FIGS. 39 and 40, the terminating member 514 is adapted for connection to the heat trace section 510 (and also the insulation jacket 52 not shown) and comprises an embossment 590 that provides egress for the lead wires 516 and also acts as a strain relief for the lead wires 516. The embossment 590 is thus configured for placement within the slot 584 of the insulation jacket 512 as previously illustrated and described. As further shown, the embossment 590 comprises adjacent lands 592 and 594, which are separated by a groove 596, wherein the groove 596 provides a dielectric standoff between the two lead wires 516 that egress through passageways (not shown) in the adjacent lands 592 and 594. Preferably, the embossment 590 is integrally formed with the terminating member 514, and the terminating member 514 is preferably an insulating material such as polymer or a fluoropolymer, by way of example.

Figure 41:
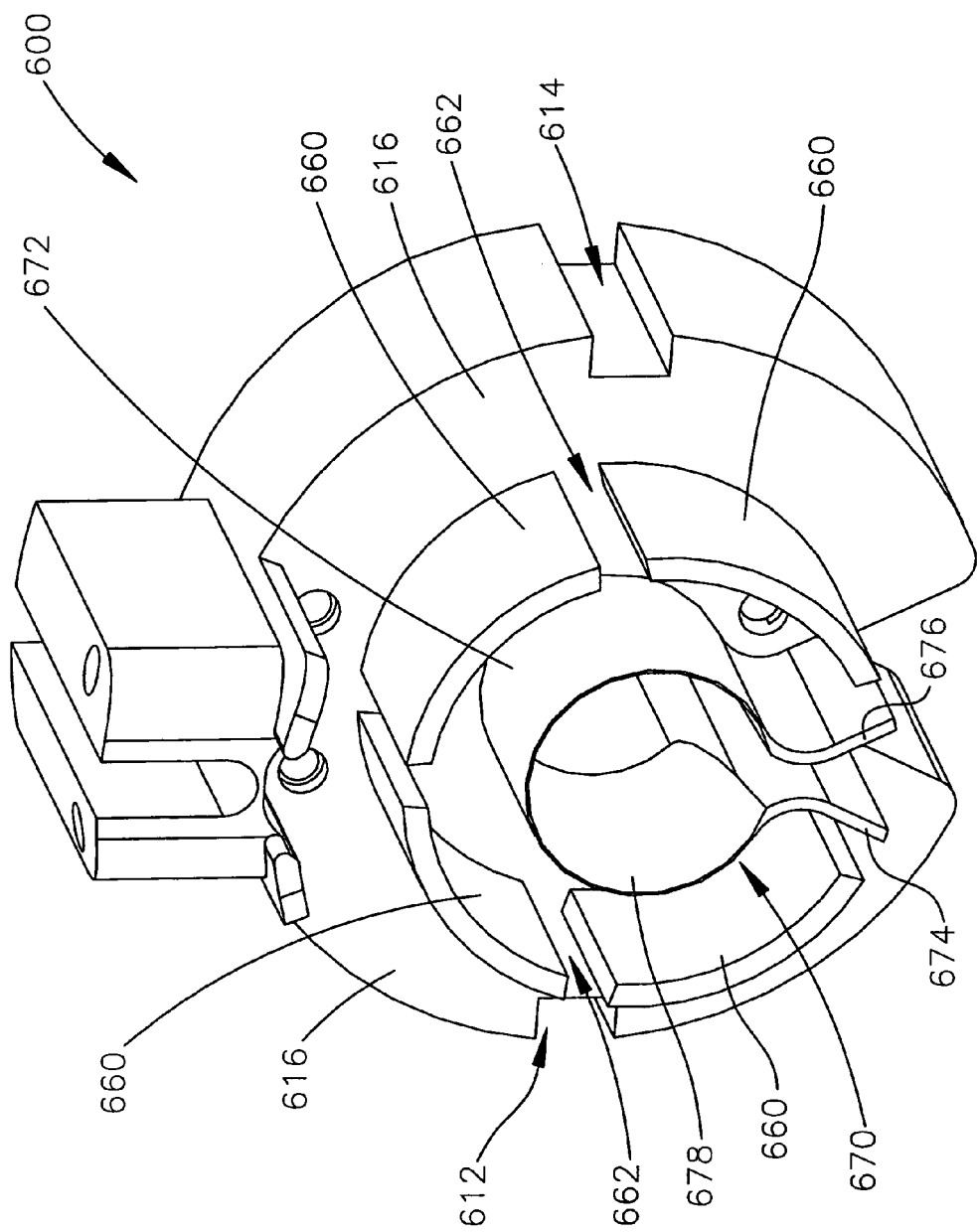
FIG. 41 is a front perspective view of a housing body of the terminating member constructed in accordance with the teachings of the present disclosure.

In one form of the present disclosure, the terminating member 514 comprises a housing body 600 and an end cap 602 that is secured to the housing body 600. Generally, the end cap 602 is provided to cover and insulate an interior portion of the housing body 600 that houses electrical connections as described in greater detail below. More specifically, and with reference to FIGS. 41-43, the end cap 602 comprises resilient arms 604 and 606 that include locking extensions 608 and 610, respectively, at their end portions as shown. Correspondingly, the housing body 600 comprises grooves 612 and 614 that accommodate the resilient arms 604 and 606 and a face 616 that is engaged by the locking extensions 608 and 610. As the end cap 602 is slid onto the housing body 600, wherein the resilient arms 604 and 606 progressively slide along the grooves 612 and 614, the resilient arms 604 and 606 are deflected outwardly. As the locking extensions 608 and 610 then progress past the grooves 612 and 614, the resilient arms 604 and 606 deflect back inwardly and the locking extensions 608 and 610 engage the face 616 of the housing body 600 to secure the end cap 602 to the housing body 600. Although the resilient arms 604 and 606 are illustrated and described as engaging the exterior of the housing body 600, it should be understood that the resilient arms 604 may alternately be disposed against the interior of the housing body 600 while remaining within the scope of the present disclosure.

Additionally, the end cap 602 comprises flanges 620 and 622 that are sized to fit over corresponding inner profile surfaces 624 and 626 of the housing body 600. These flanges 620 and 622 primarily function as additional dielectric for the overall terminating member 514 while also providing an improved aesthetic appearance by eliminating any line-of-sight to the electrical connections inside the terminating member 514. In this regard, the housing body 600 further comprises walls 627 and 628 that extend rearwardly from the face 616, which also provide dielectric standoff for the electrical connections. It should be understood that the specific shape and position of the flanges 620 and 622 as dielectric extensions are exemplary only, and other shapes and positions of such dielectric extensions of the end cap 602, among dielectric extensions for other components (e.g., housing body 600), may be employed while remaining within the scope of the present disclosure.

Figure 42:
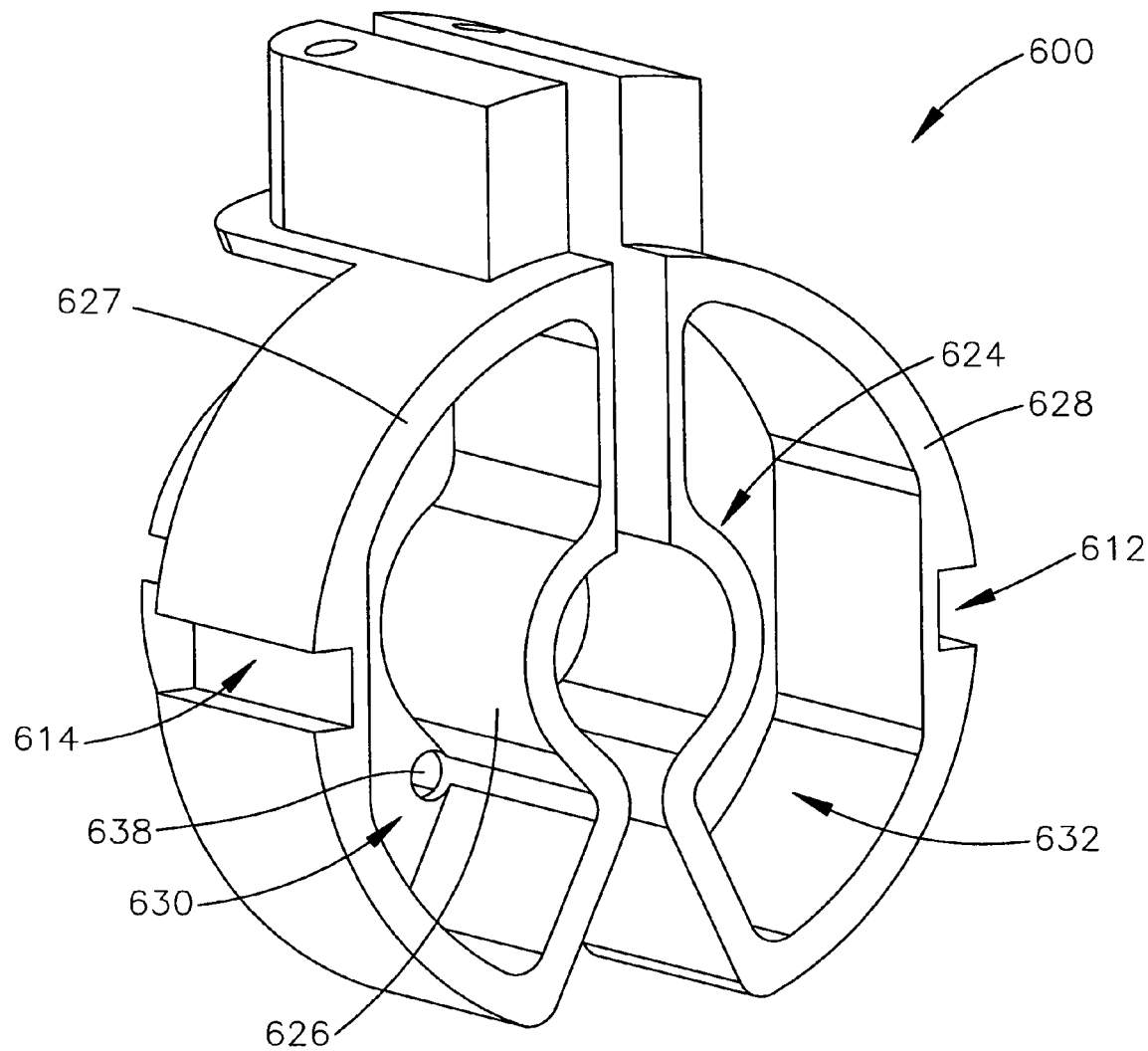
FIG. 42 is a rear perspective view of the housing body in accordance with the teachings of the present disclosure.
Figure 43:
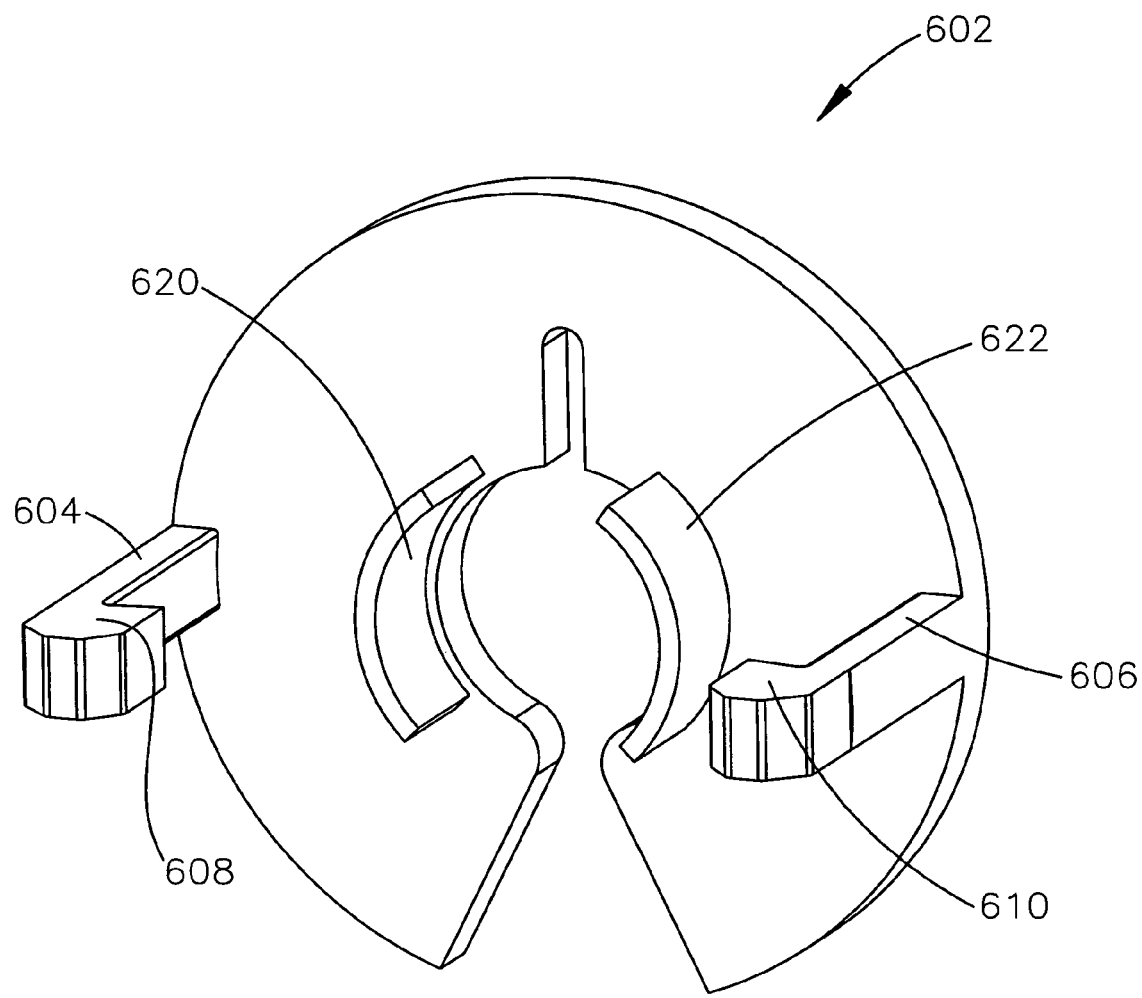
FIG. 43 is a front perspective view of an end cap of the terminating member constructed in accordance with the teachings of the present disclosure.
Figure 44:
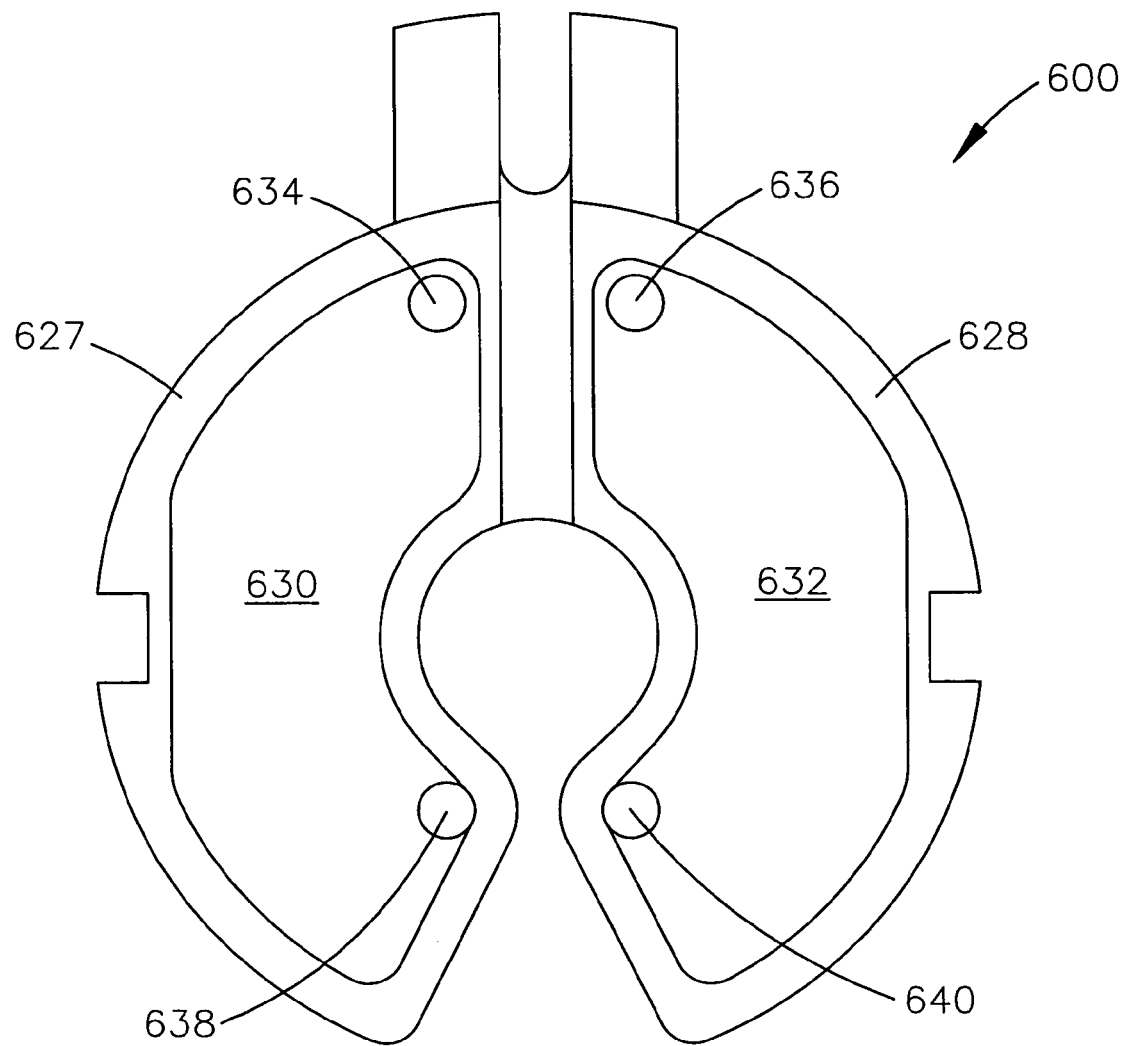
FIG. 44 is an back end view of the housing body in accordance with the teachings of the present disclosure.
Figure 45:
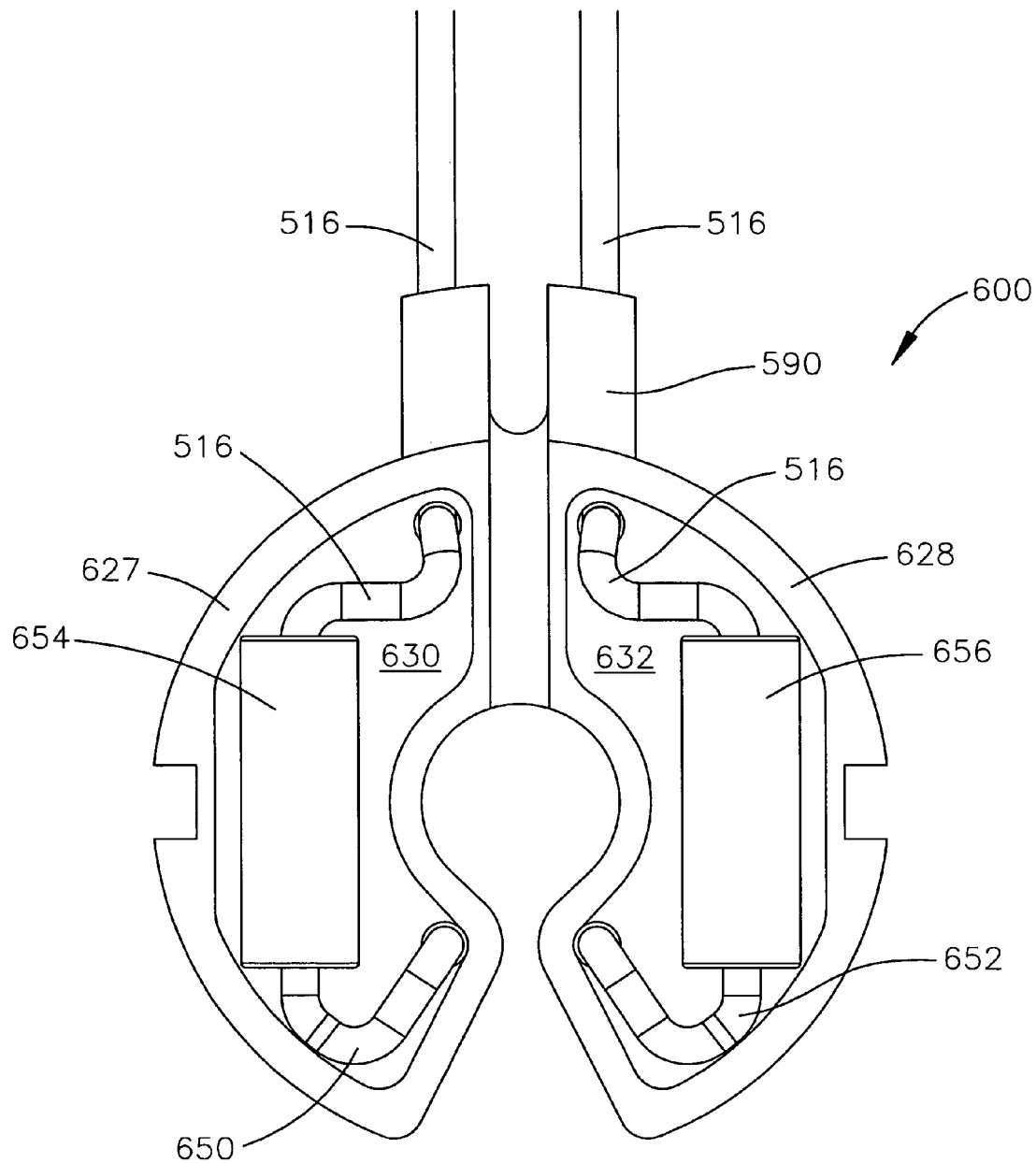
FIG. 45 is an back end view of the housing body with internal electrical connections and constructed in accordance with the teachings of the present disclosure.
Figure 46:
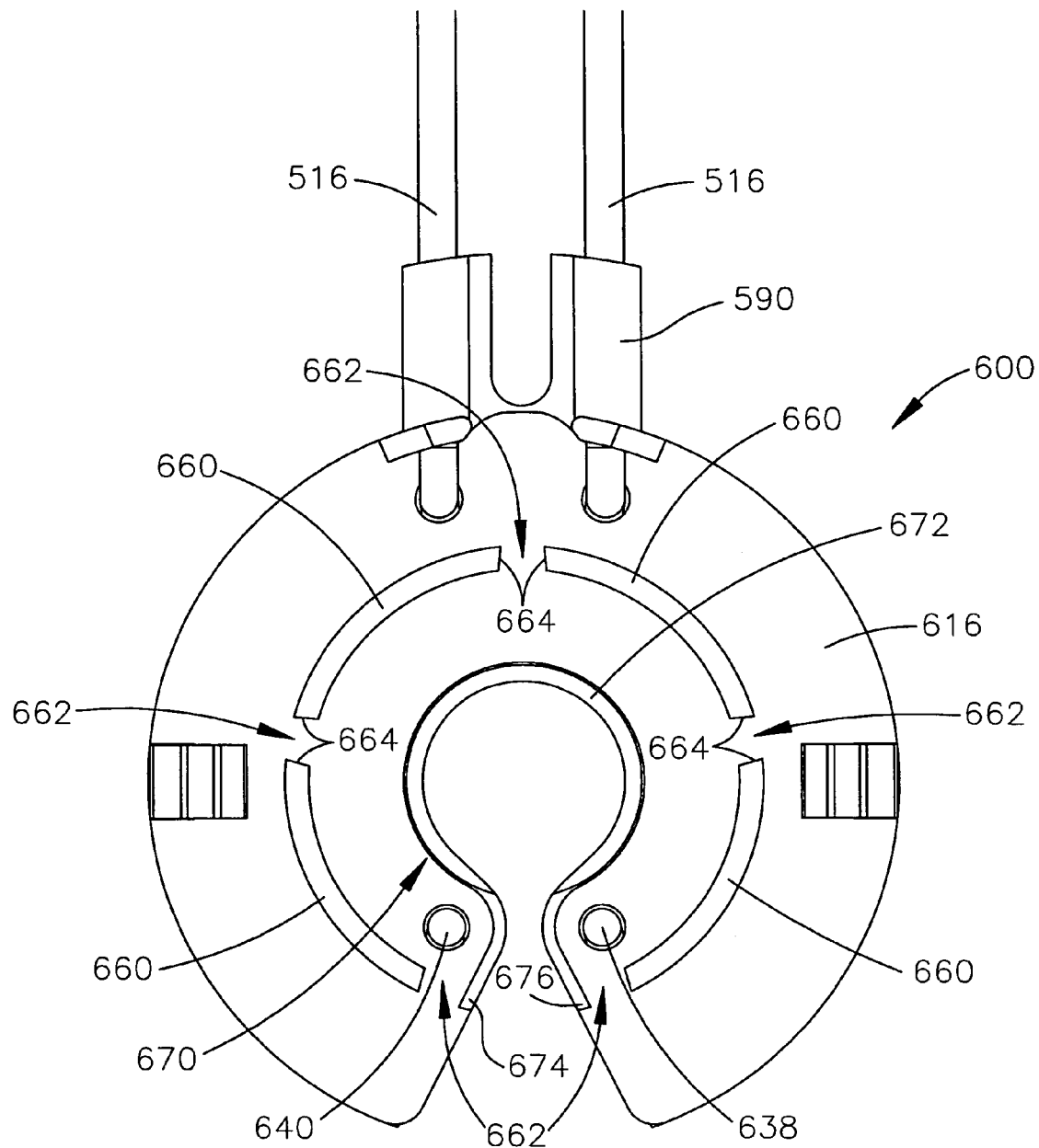
FIG. 46 is a front end view of the housing body illustrating portions of the electrical connections and constructed in accordance with the teachings of the present disclosure.

Referring now to FIGS. 44-46, and also to FIG. 42, the back side of the housing body 600 comprises interior cavities 630 and 632 and a set of upper apertures 634 and 636, along with a set of lower apertures 638 and 640, to accommodate the electrical connections. Generally, the lead wires 516 extend through the embossment 590, through the upper apertures 634 and 636, and into the interior cavities 630 and 632. Extension wires 650 and 652 are connected to the conductors 528 of the heat trace section 510 (not shown) and also extend into the interior cavities 630 and 632. The lead wires 516 are then preferably connected to the extension wires 650 and 652 with crimps 654 and 656 as shown. Accordingly, the electrical connections between the lead wires 516 and the heat trace section 510 are disposed within the cavities 630 and 632, and dielectric protection is provided by the walls 627 and 628 of the housing body 600.

Figure 47:
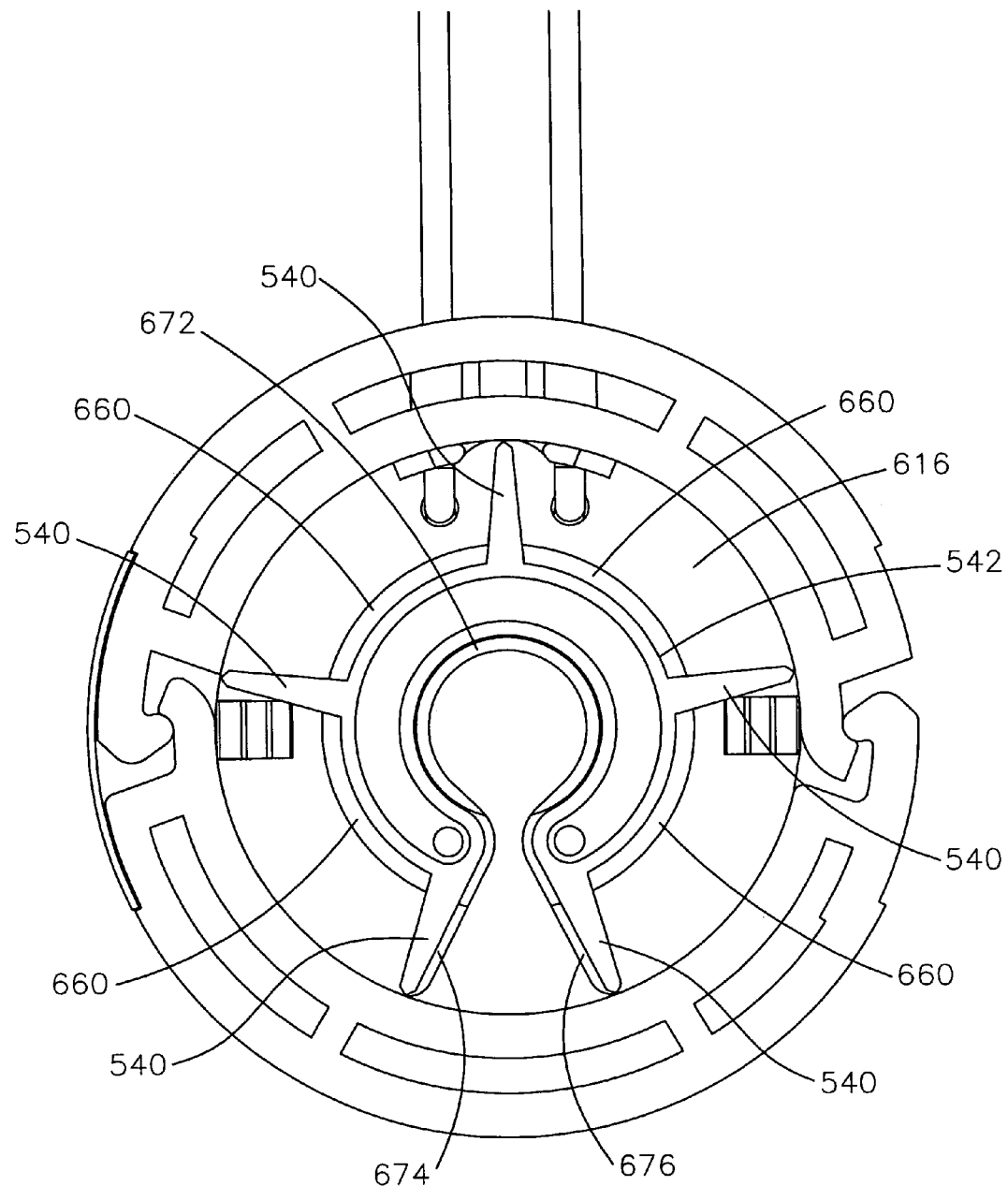
FIG. 47 is a front end view of the modular heat trace assembly constructed in accordance with the teachings of the present disclosure.

Referring back to FIGS. 39 and 41, and also to FIGS. 46-47, the front side of the housing body 600 comprises a plurality of outer extensions 660 separated by slots 662. The outer extensions 660 are adapted for placement around the heat trace section 510, and more specifically, engage the outer surfaces 542 of the heat trace section 510. Preferably, the outer extensions 660 are designed with a slight draft angle such that they provide a positive engaging force against the outer surfaces 542 of the heat trace section 510. The outer extensions 660 also function to provide additional dielectric separation between the heat trace section 510 and the outside environment. The fins 540 of the heat trace section 510 are then nested within the slots 662 as shown and abut the face 616 of the terminating member 514 in the fully assembled condition. To further facilitate such nesting, the outer extensions 660 preferably comprise angled faces 664 as shown to provide more intimate contact between the outer extensions 660 and the fins 540.

The housing body 600 further comprises a profiled inner extension 670 that defines an arcuate upper portion 672 and lower sections 674 and 676. The profiled inner extension 670 engages the inner surface 524 of the heat trace section 510 as shown, which further secures the heat trace section 510 to the terminating member 514. The profiled inner extension 670 also functions to provide additional dielectric separation similar to the outer extensions 660. Preferably, the arcuate upper portion 672 defines a tapering cross section from a thicker portion at the face 616 to a thinner end portion 678 as shown. The thinner end portion 678 thus facilitates easier assembly of the heat trace section 510 and the terminating member 514. Additionally, the lower sections 674 and 676 are configured to engage outer surfaces of the fins 540 as shown.

Connector Assembly 504

Figure 48:
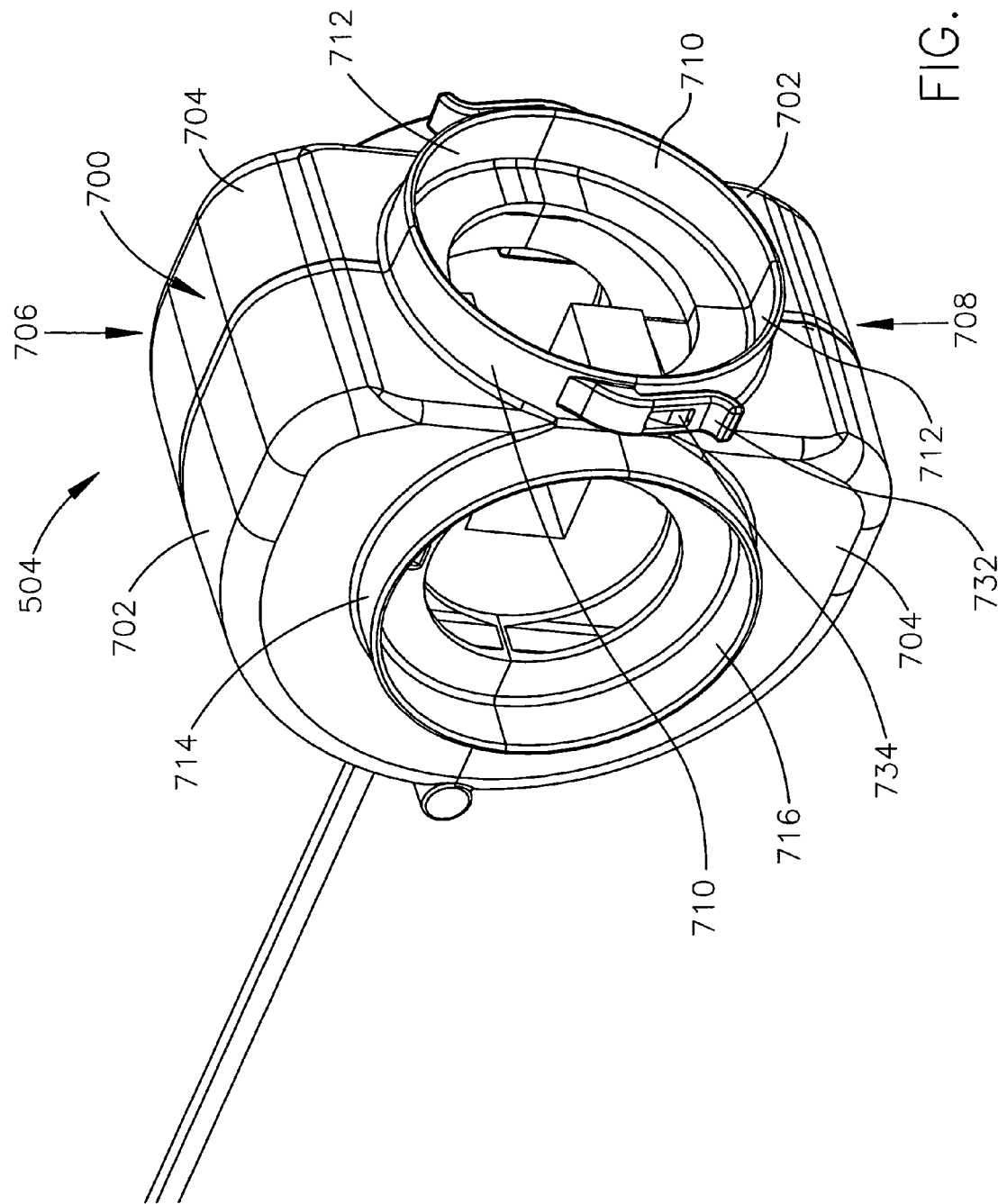
FIG. 48 is a front perspective view of the connector assembly constructed in accordance with the teachings of the present disclosure.
Figure 49:
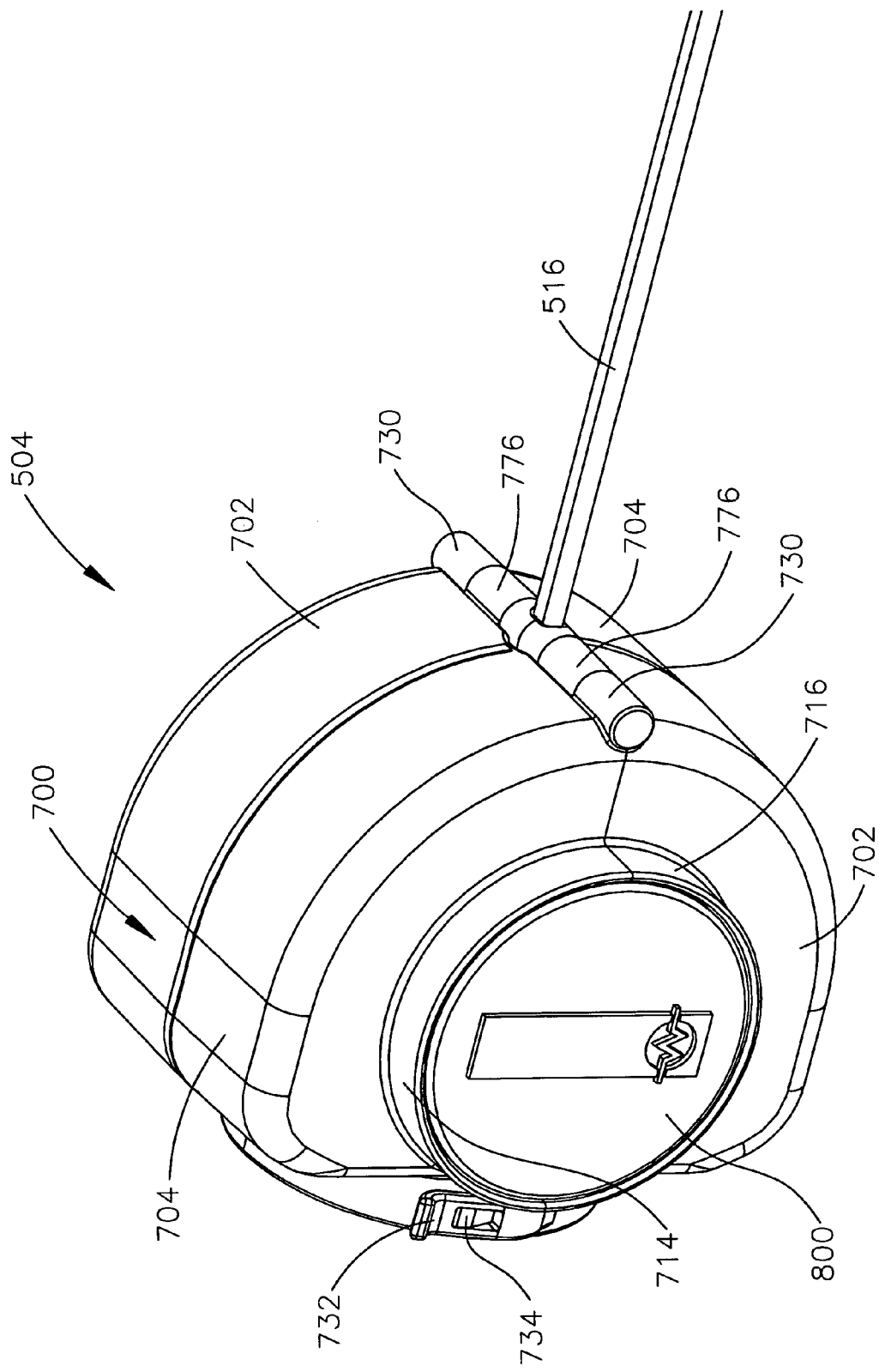
FIG. 49 is a rear perspective view of the connector assembly in accordance with the teachings of the present disclosure.
Figure 50:
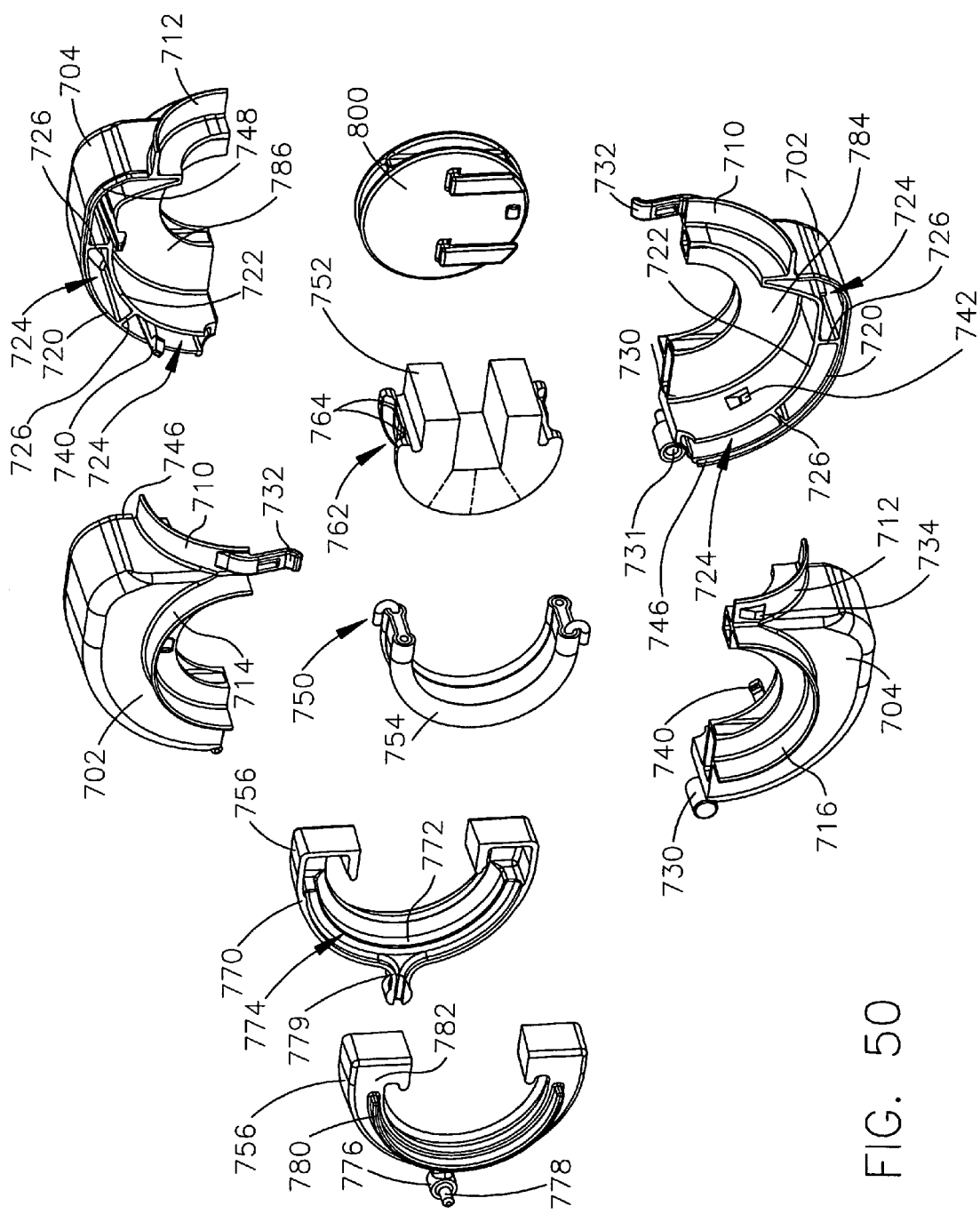
FIG. 50 is an exploded perspective view of the connector assembly in accordance with the teachings of the present disclosure.

Referring now to FIGS. 48-50, the connector assembly 504 comprises a shell 700, which preferably includes a plurality of shell members 702 and 704. The shell members 702 and 704 are preferably interchangeable such that they are used for both the upper portion 706 of the shell 700 and the lower portion 708 of the shell 700 as shown. Together, the shell members 702 and 704 define outer rims 710 and 712, respectively, wherein the rims 710 and 712 are adapted for placement over the heat trace assembly 502 as shown in FIG. 30. These rims 710 and 712 provide additional thermal isolation and reduce the line-of-sight into the connections within the modular heater system 500 for improved aesthetics. Additionally, upper rim 714 and lower rim 716 are formed around the shell members 702 and 704, respectively, which are also adapted for placement over another heat trace assembly 502. Similarly, the upper rim 714 and the lower rim 716 provide additional thermal isolation and reduce the line-of-sight into the connections within the connector assembly 504 for improved aesthetics.

The shell members 702 and 704 also comprise an outer wall 720 and an inner wall 722 that define cavities 724 separated by supports 726. The cavities 724 provide additional insulation to reduce heat losses to the outside environment and also provide for a touch-safe temperature on the exterior of the shell 700. The shell members 702 and 704 in general comprise a plurality of outer and inner walls as shown to define various cavities for the purposes of insulation, dielectric separation, and touch-safe temperatures. Accordingly, these additional walls and cavities as shown are not described in greater detail hereinafter for purposes of clarity.

Additionally, the shell members 702 and 704 comprise hinge elements 730 and flexible tabs 732 that engage detents 734 as shown. As such, the upper portion 706 and the lower portion 708 are rotatable about the hinge elements 730, and the flexible tabs 732 disposed at the end portions of the outer rims 710 engage the detents 734 disposed at the end portions of the other outer rims 712 to lock the shell portions 706 and 708 together. Preferably, the outer rims 710 and 712 are sized to provide a positive engaging force on the outside of the heat trace assembly 502.

As further shown, the shell members 704 include additional retaining features such as flexible tabs 740 that engage openings 742 formed through the inner walls 722 of the shell members 702. Accordingly, the flexible tabs 740 and the openings 742 provide a more secure connection between adjacent shell members 702 and 704. Additionally, the shell members 702 comprise outer wall extensions 746 that engage corresponding outer wall recesses 748 of the shell members 704 as shown. Accordingly, the outer wall extensions 746 and the corresponding outer wall recesses 748 provide both alignment of the shell members 702 and 704 for assembly, in addition to thermal separation and reduced line-of-sight for improved aesthetics. The shell members 702 and 704 are preferably an insulative material and are preferably molded from a higher temperature material such as a thermoplastic polymer. However, it should be understood that other materials and processing methods may be employed while remaining within the scope of the present disclosure.

Figure 51:
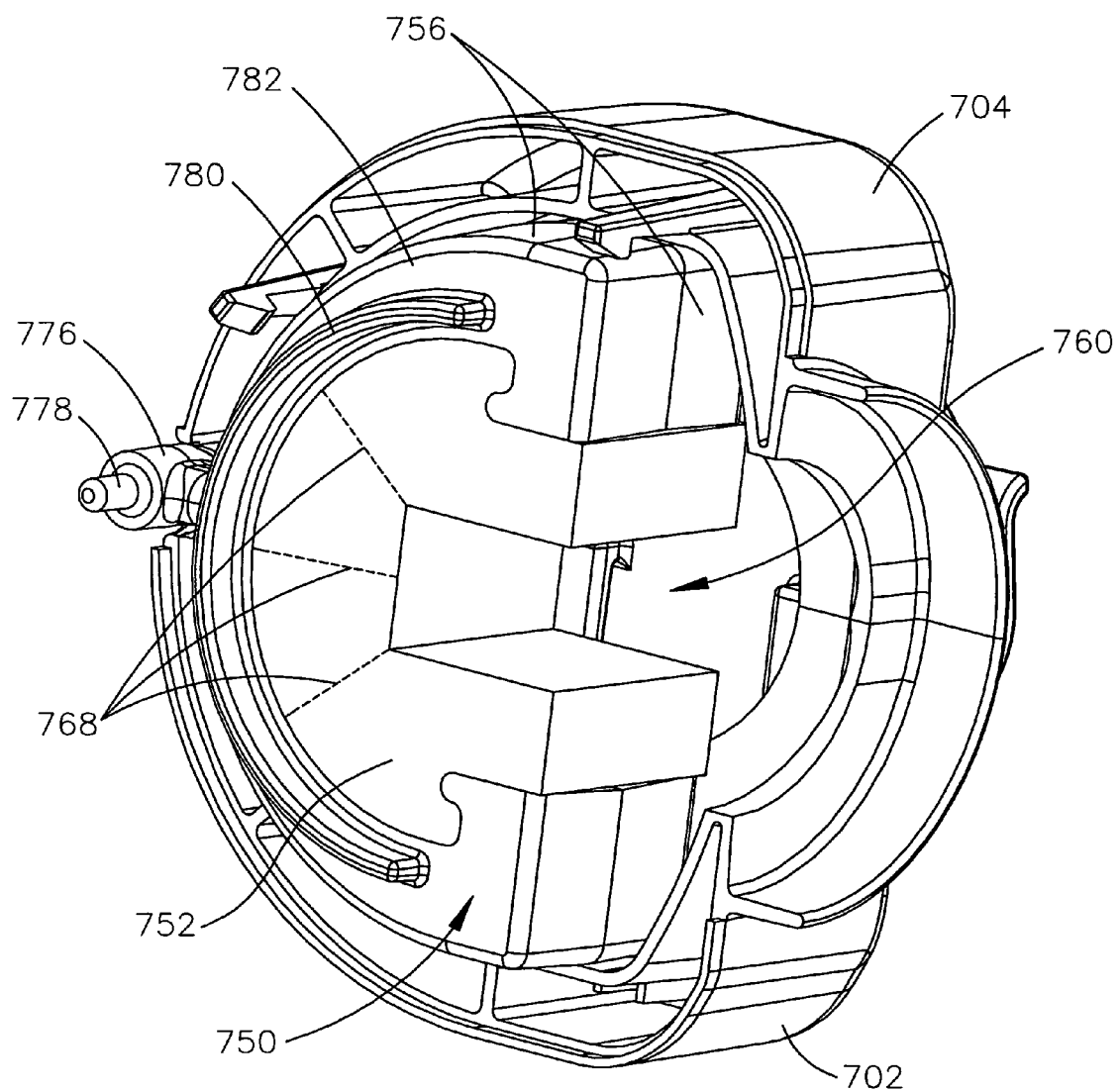
FIG. 51 is a partial perspective view of a fitting heater assembly constructed in accordance with the teachings of the present disclosure.
Figure 52:
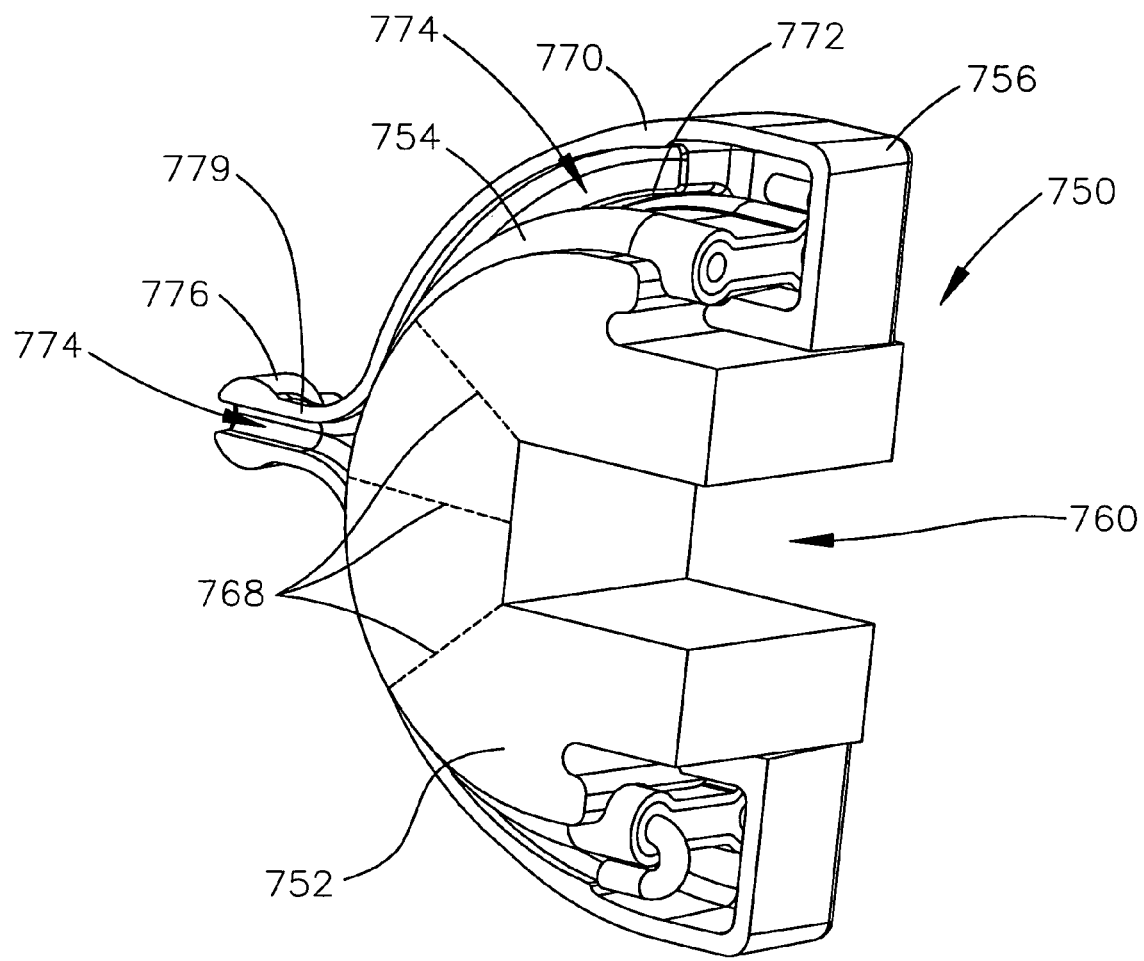
FIG. 52 is another partial perspective view of the fitting heater assembly constructed in accordance with the teachings of the present disclosure.

Disposed inside the shell 700 are additional components of the connector assembly 504, including a fitting heater assembly 750, which is best shown in FIGS. 50-52. The fitting heater assembly 750 comprises a fitting adapter 752, a heat trace section 754, and an outer casing 756 that is preferably in two (2) pieces as shown. The fitting adapter 752 defines an opening 760 that is sized to mate with an adjacent fitting or component of the target system (not shown). Accordingly, it should be understood that the size and shape of the opening 760 as illustrated and described herein is merely exemplary and should not be construed as limiting the scope of the present disclosure.

The fitting adapter 752 also defines a recessed outer periphery 762 having grooves 764, both of which are sized to accommodate the geometry of the heat trace section 754 as shown. Preferably, the fitting adapter 752 is a conductive material such as Aluminum, however, other materials may also be used while remaining within the scope of the present disclosure. Alternately, the fitting adapter 752 may include slits 768 (shown dashed) to provide for expansion of the opening 760 and thus more intimate contact with the adjacent fitting of the target system.

Preferably, the outer casing 756 is provided in symmetrical, interchangeable pieces as shown. The outer casings 756 include outer walls 770 and inner walls 772 that define conduits 774 therebetween. The conduits 774 provide a passageway for the lead wires (not shown) to connect to the heat trace section 754. The outer casings 756 also include hinge elements 776 that cooperate with the hinge elements 730 of the shell members 702 and 704, which are also shown in FIG. 49. As such, the hinge elements 776 preferably include pins 778 that are adapted for placement within holes 731 (FIG. 50) of the shell member hinge elements 730. Additionally, the conduits 774 extend through the hinge elements 776 as shown to provide egress for the lead wires that connect to the heat trace section 754. Preferably, the hinge elements 776 are disposed on an extension 779 as shown, wherein the extension 779 functions as a strain relief for the lead wires.

The outer casings 756 also preferably include standoffs 780 extending from their outer faces 782 as shown. These standoffs 780 function to center, or position, the fitting heater assembly 750 properly within the shell 700.

Figure 53:
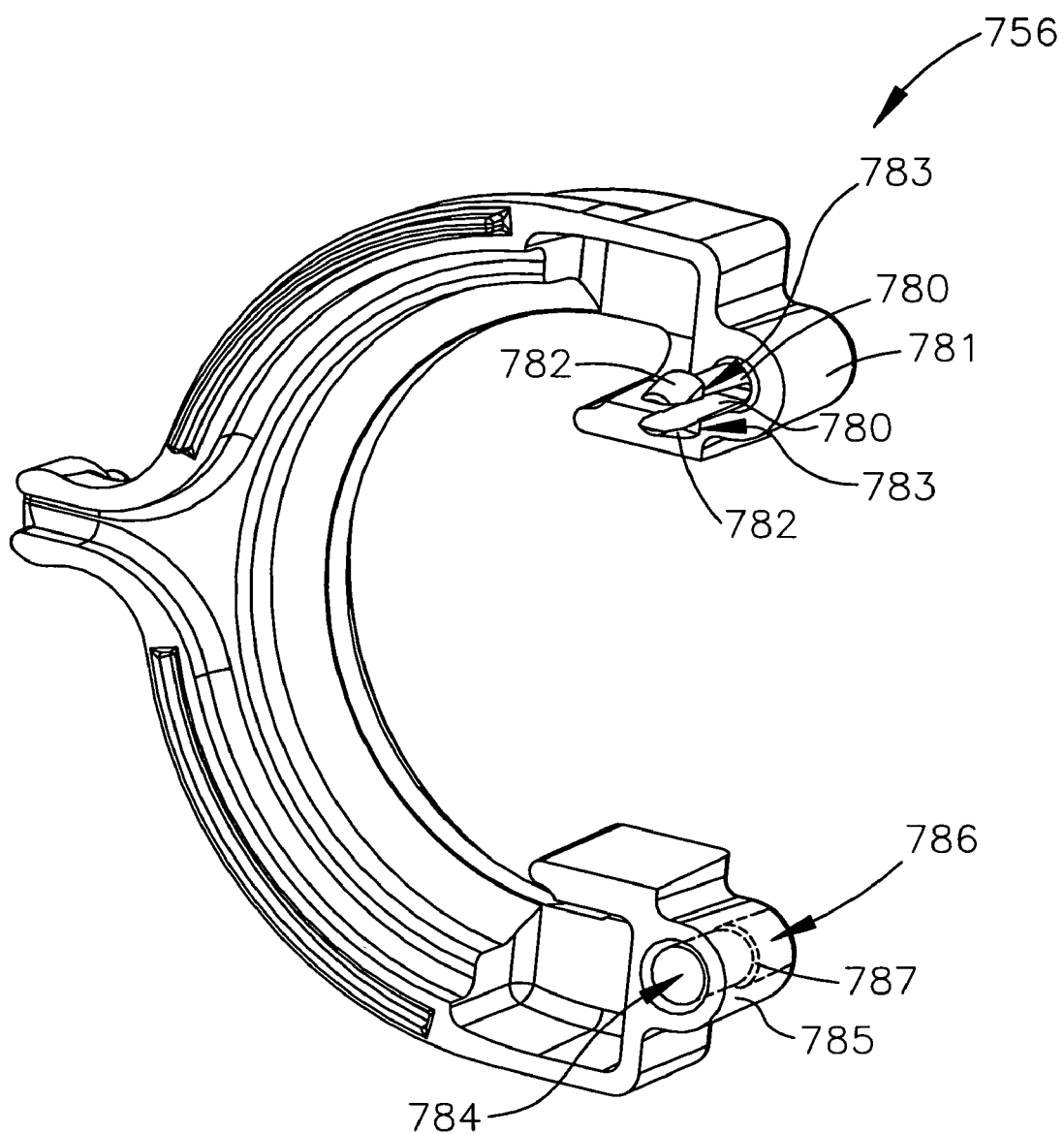
FIG. 53 is a perspective view of an alternate embodiment of an outer casing having a snap feature and constructed in accordance with the teachings of the present disclosure.
Figure 54:
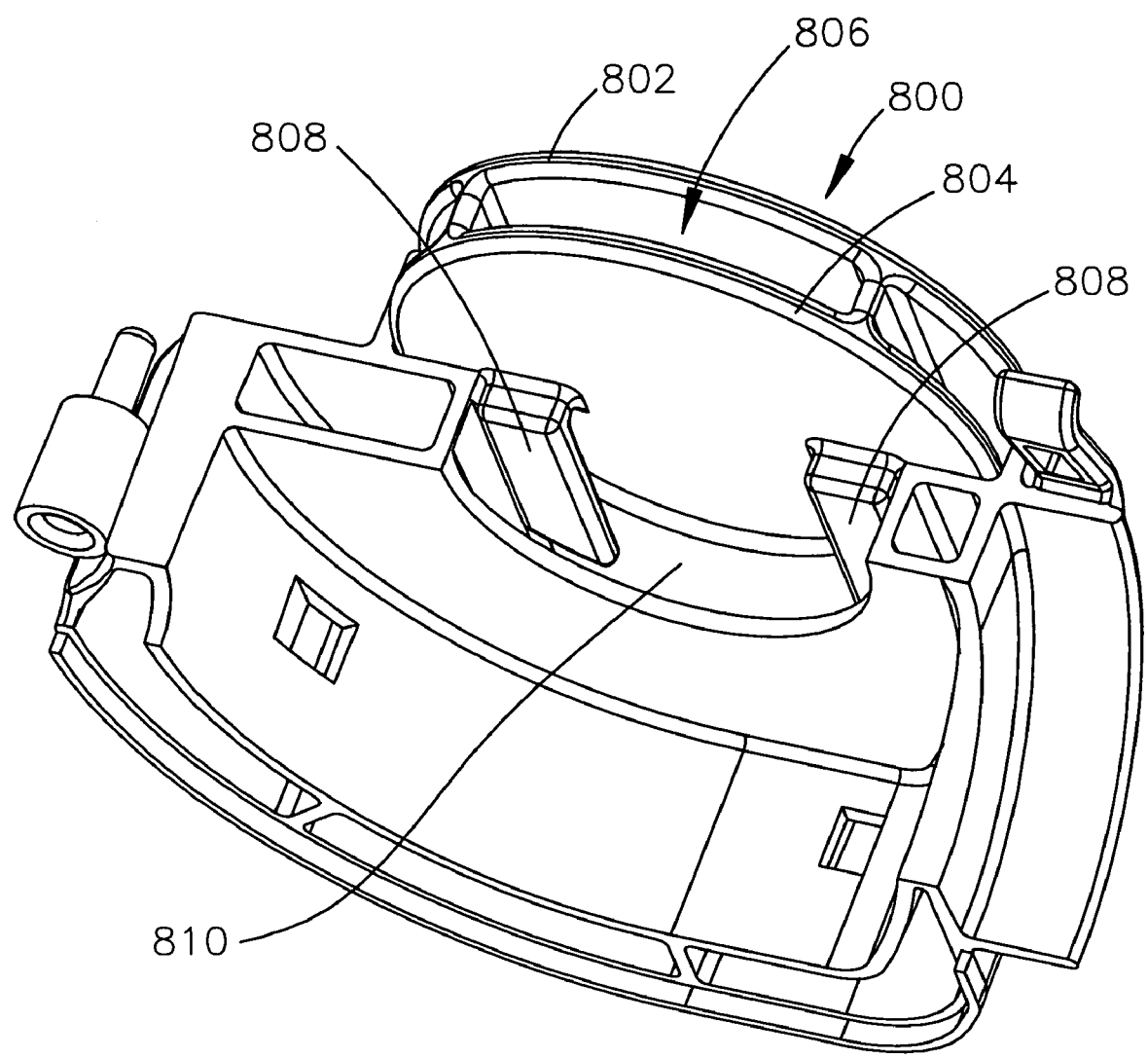
FIG. 54 is a perspective view of a cover engaged with a shell member and constructed in accordance with the teachings of the present disclosure.
Figure 55:
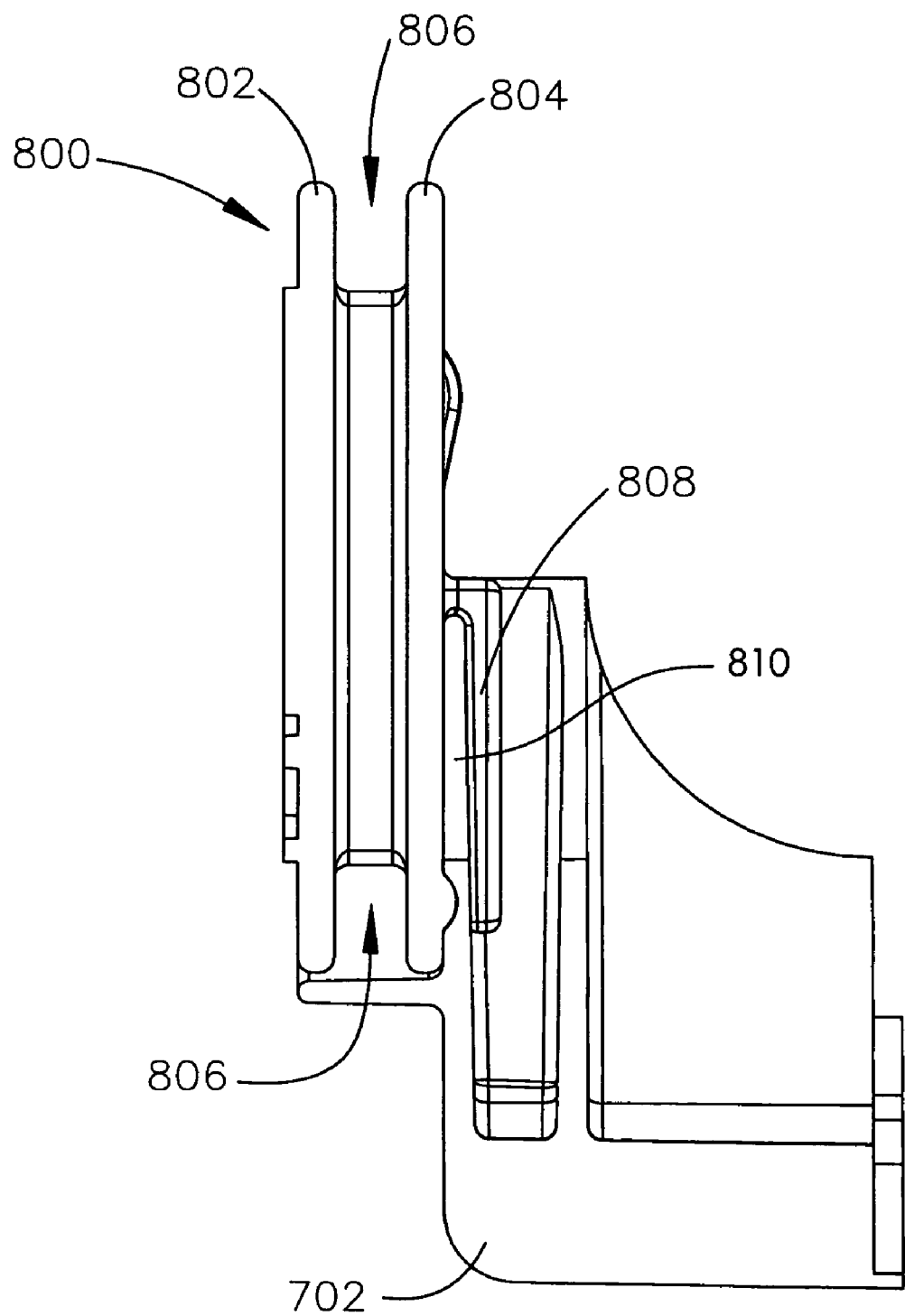
FIG. 55 is a side view of the cover engaged with the shell member in accordance with the teachings of the present disclosure.

In an alternate form of the outer casings 756, as illustrated in FIG. 53, a snap feature is employed to securely connect each of the two outer casings 756 to each other. (Only one outer casing 756 is shown for purposes of clarity). More specifically, the casing 756 comprises flexible latches 780 that extend from a boss 781, both of which are preferably integrally formed with the outer casing 756. The flexible latches 780 define tapered end portions 782 that include relatively flat transverse faces 783 as shown. As further shown, a bore 784 is formed through an opposing boss 785, which is also preferably integrally formed with the outer casing 756. A counterbore 786 (shown dashed) is also formed in the opposing boss 785, which defines an internal shoulder 787 (shown dashed). As the tapered end portions 782 engage the bore 784 of an opposing outer casing 756 (not shown), the flexible latches 780 deflect inwardly, towards each other such that the flexible latches 780 and the tapered end portions 782 can traverse the length of the bore 784. As the tapered end portions 782 enter the counterbore 786, the flexible latches 780 deflect back outwardly, and the transverse faces 783 engage the internal shoulder 787 to secure the outer casings 756 together. To separate the two outer casings 756, the flexible latches 780 are deflected inwardly through the counterbore 786 until the transverse faces 783 clear the internal shoulder 787, and the two outer casings 756 can then be pulled apart. It should be understood that this connecting device is exemplary only and thus other connecting devices for the outer casings 756 may also be employed while remaining within the scope of the present disclosure.

Referring now to FIGS. 49-50 and 54-55, the connector assembly 504 may also be provided with a cover 800 if the connection is in an elbow configuration as shown or in a T-configuration (not shown), wherein an adjacent heat trace assembly 502 is not disposed in one side of the connector assembly 504. Accordingly, the cover 800 provides additional dielectric separation between the fitting heater assembly 750 and the outside environment, while also providing for a touch-safe surface temperature and improved aesthetics. As shown more clearly in FIGS. 53 and 54, the cover 800 includes an outer wall 802 and an inner wall 804 that define gaps 806 therebetween for insulation purposes and the dielectric isolation. The cover 800 further comprises flexible clips 808 that are adapted for placement over an outer wall 810 of the shell member 702 to secure the cover 800 to the overall connector assembly 504.

It should be understood that the exemplary connector assembly 504 as illustrated and described herein is configured for an elbow-type connection within the target system and that the geometry and features of the connector assembly 504 and its various components will vary depending on the connection employed within the target system. For example, if the connector assembly 540 were adapted for placement over a T-junction or a cross-type junction, or even a separate component such as a pump, by way of example, the size and shape of the connector assembly 540 components would be adjusted accordingly. Therefore, the specific design of the connector assembly 540 as illustrated and described herein should not be construed as limiting the scope of the present disclosure.

In another form of the present disclosure, the heat trace assemblies 502 are "matched" with the connector assemblies 504 to achieve even temperatures across their interfaces. More specifically, different power densities may be required at the connector assemblies 504 versus the heat traces assemblies 502, and as such, different power densities are contemplated for each.

In yet another form, a reflective surface coating may be provided along the interior surfaces 513 of the insulation jacket 512 and/or the shell members 702 and 704 to reduce the power required and also to reduce the exterior surface temperatures of the modular heater system 500 components. Such a reflective surface coating preferably has low emissivity and may include, by way of example, an Aluminum foil or other low emissivity material applied by a vapor deposition process, by way of example. Similarly, a high emissivity material may be applied between the conduit 13 and the dielectric or insulator material 26, or cover, that surrounds the semiconductive polymer material 24, or conductive core, of the heat trace section 510. (See FIGS. 3 and 4 for basic construction of heat trace section and its terminology). As such, the high emissivity material would improve heat transfer between the heat trace section 510 and the conduit 13.

Figure 56:
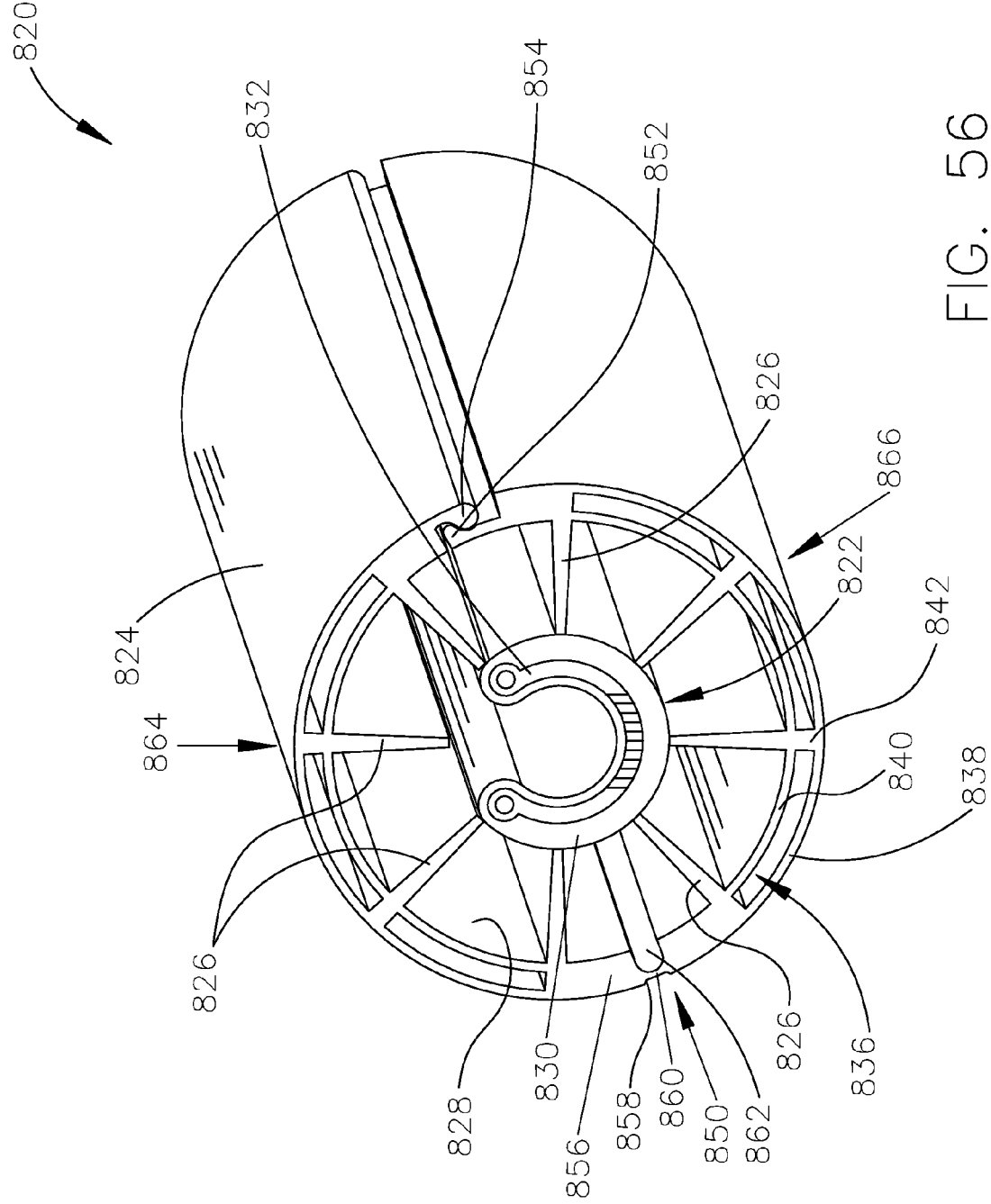
FIG. 56 is a perspective view of another form of a heat trace assembly constructed in accordance with the teachings of the present disclosure.
Figure 57:
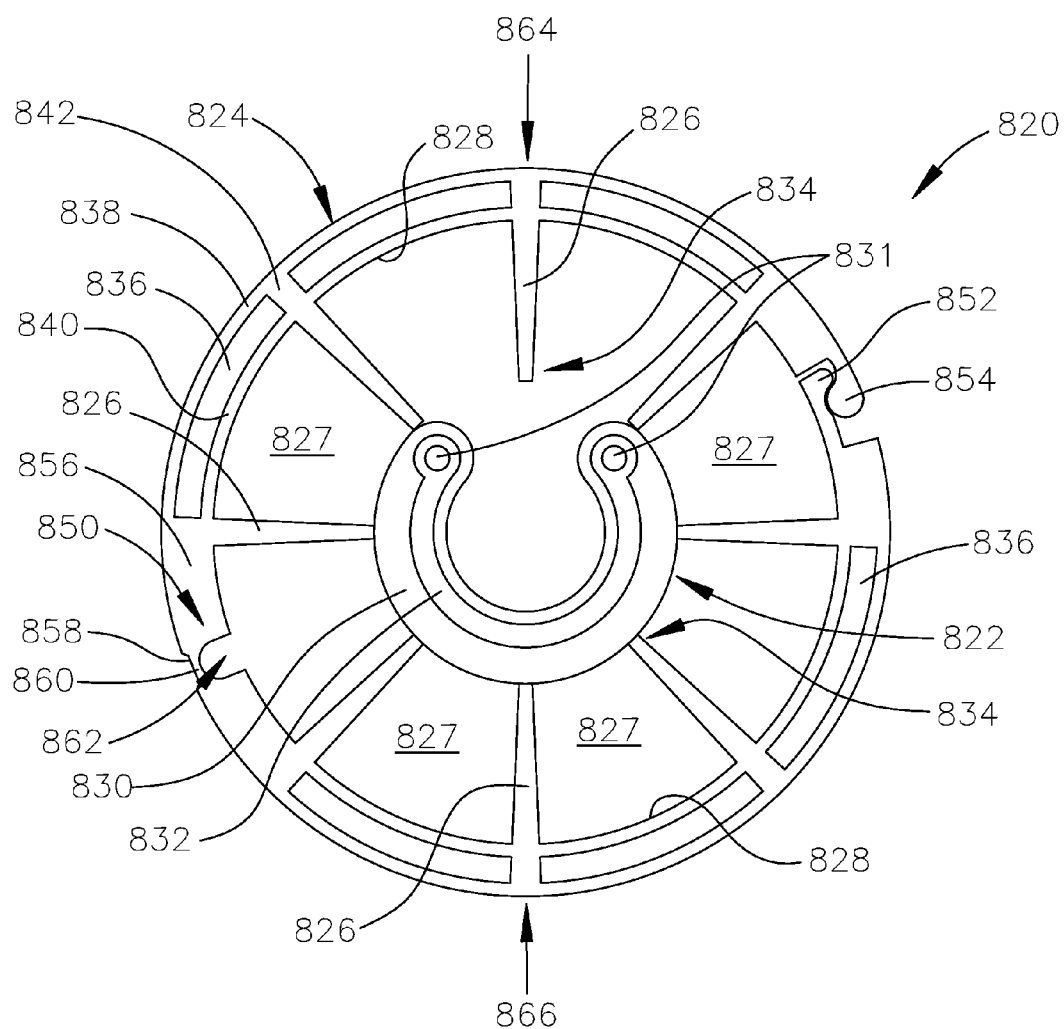
FIG. 57 is an end view of the heat trace assembly in accordance with the teachings of the present disclosure.
Figure 58:
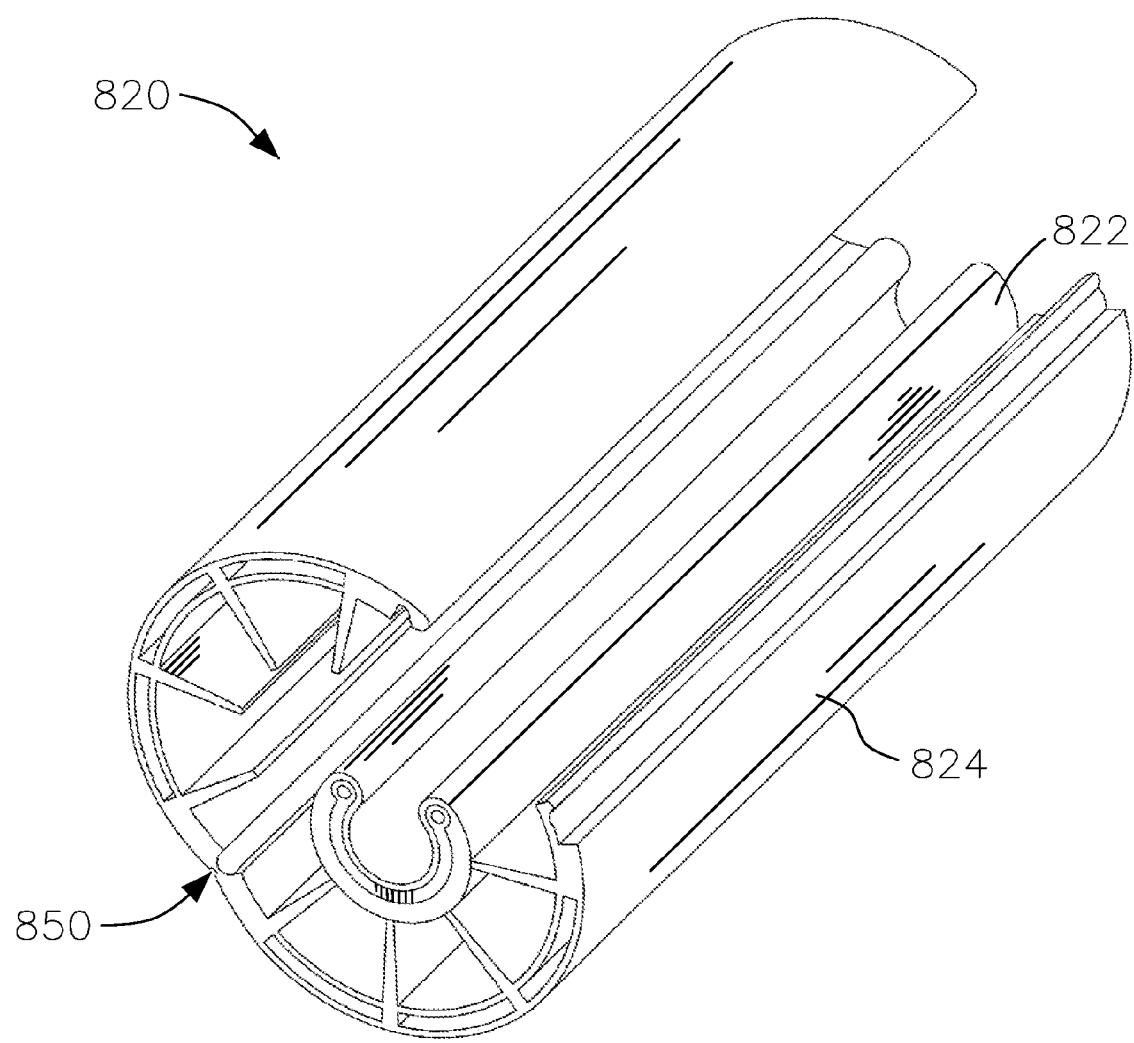
FIG. 58 is a perspective view of the heat trace assembly illustrating rotatable segments of an insulation jacket in accordance with the teachings of the present disclosure.

Referring now to FIGS. 56-58, another form of a heat trace assembly is illustrated and generally indicated by reference numeral 820. The heat trace assembly 820 generally includes a heat trace section 822 surrounded by an insulation jacket 824, along with the terminating members and connector assemblies as previously described, which are not shown for purposes of clarity. In this alternate form of the present disclosure, standoffs 826 are incorporated into the insulation jacket 824 rather than into the heat trace section 822 as previously illustrated and described. As shown, the standoffs 826 are preferably in the form of fins, however, it should be understood that other geometries and configurations may be employed while remaining within the scope of the present disclosure, examples of which are described in greater detail below. The standoffs 826 preferably extend radially from an inner surface 828 of the insulation jacket 824 to a location proximate the dielectric cover 830 that surrounds the semiconductive polymer core 832 of the heat trace section 822, thereby forming passageways 827 between the insulation jacket 824 and the heat trace section 822. Preferably, the distal end portion 834 of the standoffs 826 are in physical contact with the heat trace section 822 such that the standoffs 826 concentrically position the heat trace section 822 within the insulation jacket 824. As such, the position and shape of the distal end portions 834 of the standoffs 826 are compatible with the shape and/or size of the heat trace section 822, which may be other than circular as illustrated herein.

In addition to the standoffs 826, the insulation jacket 824 further comprises chambers 836 that extend longitudinally between an outer wall 838 and an inner wall 840, which are separated by supports 842. The supports 842 are formed conjointly with the standoffs 826 as shown, however, the supports 842 and standoffs 826 may be located in separate locations around the insulation jacket 824 while remaining within the scope of the present disclosure. As previously described, the chambers 836 provide insulation, in the form of air as shown, such that heat loss from the heat trace section 822 to the outside environment during operation is reduced. Additionally, the chambers 836 and/or the space between the heat trace section 822 and the insulation jacket 824, between the standoffs 826, may be filled with an insulating material such as a foam or alternately a low emissivity material as previously described.

Preferably, the insulation jacket 824 is formed as a single, unitary piece, yet remains flexible in order to be installed around the heat trace section 822. Accordingly, the insulation jacket 824 comprises a reduced area 850 that is formed opposite a lip 852 and a locking tab 854. The reduced area 850 is preferably formed through a thicker wall section 856 of the insulation jacket 824 and defines an outer recess 858, a web portion 860, and an inner recess 862. The reduced area 850 thus divides the insulation jacket 824 into a first segment 864 and a second segment 866. The insulation jacket 824 is preferably made from a semi-rigid polymeric material, such as polycarbonate as previously set forth, and as such the reduced area 850, and more specifically the web portion 860, provides a "living hinge" such that the first segment 864 and the second segment 866 are rotatable about the reduced area 850. As the first segment 864 and the second segment 866 are rotated towards one another, the locking tab 854 engages the lip 852 as shown in order to secure the insulation jacket 824 around the heat trace section 822. As a result, the insulation jacket 824 is advantageously provided as a single, unitary piece, rather than in multiple pieces as previously illustrated and described. Moreover, multiple reduced areas 850 may be employed around the insulation jacket 824 rather than the single reduced area 850 while remaining within the scope of the present disclosure.

Figure 59A:
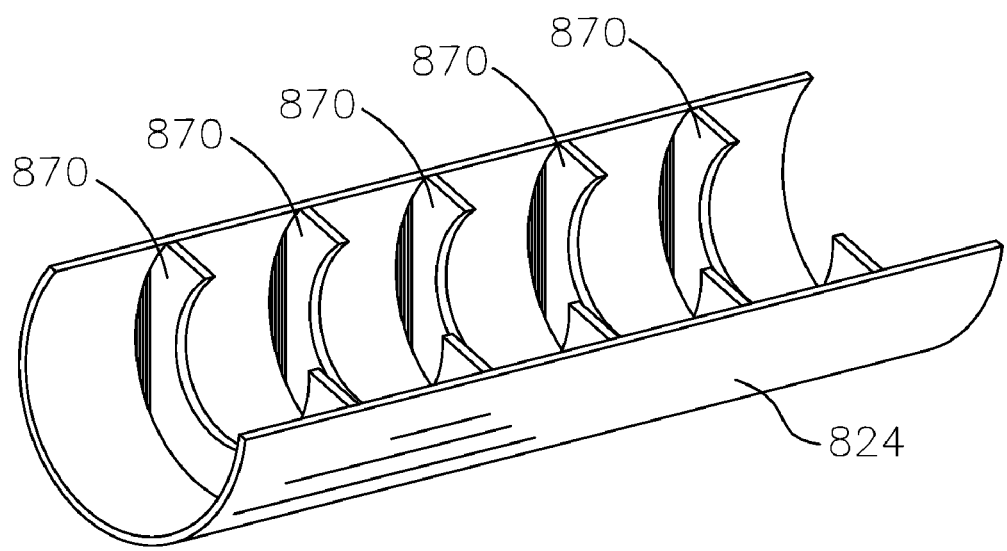
FIG. 59a is a perspective view of an alternate form of standoffs constructed in accordance with the teachings of the present disclosure.
Figure 59B:
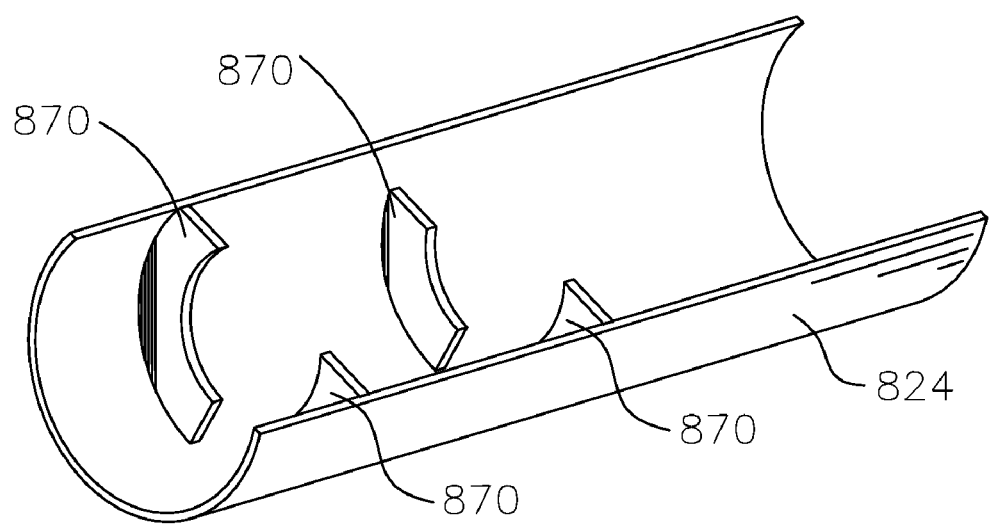
FIG. 59b is a perspective view of another alternate form of standoffs constructed in accordance with the teachings of the present disclosure.
Figure 59C:
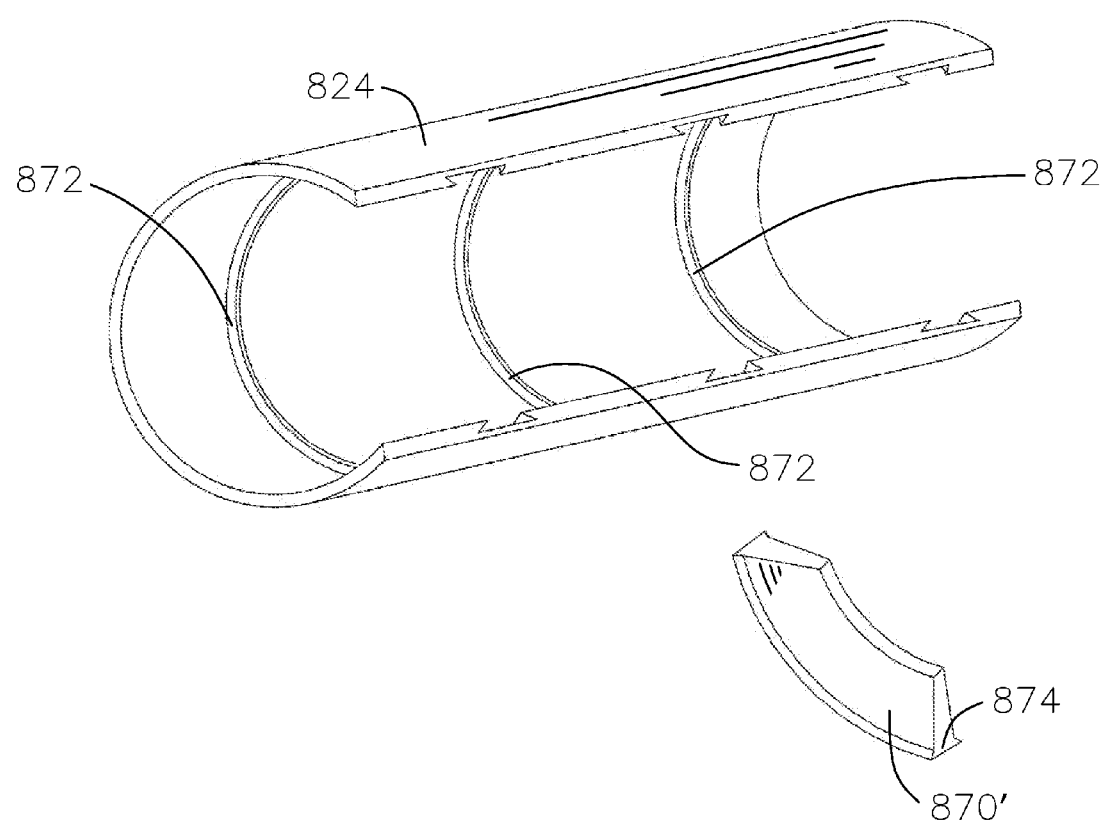
FIG. 59c is a perspective view of another alternate form of standoffs constructed in accordance with the teachings of the present disclosure.

Referring to FIGS. 59a and 59b, alternate forms of insulation standoffs are illustrated and generally indicated by reference numeral 870. As shown, the insulation standoffs 870 extend circumferentially around the insulation jacket 824 rather than longitudinally as previously illustrated and described, and as such, take the form of "rings" in this illustrative structure of the present disclosure. The standoffs 870 may be continuous and evenly spaced as shown in FIG. 59a, or discontinuous and alternately spaced as shown in FIG. 59b, by way of example, along the length of the insulation jacket 824. Additionally, the standoffs 870 may be of different lengths and geometric configurations, and still yet may be formed as a part of the heat trace section 822 (not shown) rather than as a part of the insulation jacket 824 as shown herein. Moreover, while the circumferential standoffs 870 are preferably formed as an integral part of the insulation jacket 824 (or the heat trace section 822), the standoffs 870 may be separate pieces that are assembled to the insulation jacket 824 or the heat trace section 822. For example, as shown in FIG. 59c, the insulation jacket 824 (or the heat trace section 822) may include a plurality of slots 872 that receive separate standoffs 870', which are then interchangeable and can be varied in number/spacing according to specific application requirements. As such, the standoffs 870' include protrusions 874 that are sized to fit and be secured within the slots 872 as shown. The protrusions 874 are then slidably engaged within the slots 872 to secure the standoffs 870' in the desired location(s).

Referring back to FIG. 57, the heat trace section 822 includes the dielectric cover 830 that surrounds the semiconductive polymer core 832, along with the pair of conductors 831 extending along the length of the heat trace section 822 for the application of power. In one form of the present disclosure, the dielectric cover 830 (in the plurality of geometric configurations as illustrated and described herein) is preferably co-extruded (either in one extrusion run or multiple extrusion runs) with the semiconductive polymer core 832. In another form, the dielectric cover 830 is separately formed and is slidably engaged around the semiconductive polymer core 832. In still another form, the dielectric cover 830 is applied to the semiconductive polymer core 832 by means of painting, spraying, dip coating, taping, heat shrinking, or other similar application methods rather than being a separate component that is slid onto the semiconductive polymer core 832. Still further yet, the dielectric cover 830 can alternately be applied by these means to the actual conduit 13 (see, e.g., FIGS. 5-8) rather than or in addition to being applied over the semiconductive polymer core 832. For applications that are relatively low temperature and thus may not require thermal insulation, the dielectric cover 830 can be eliminated altogether from the heat trace section 822 such that only the semiconductive polymer core 832 and the conductors 831 form the heat trace section 822. Accordingly, the heat trace section 822 may be formed without any dielectric cover 830 in certain applications. It should be understood that such variations are considered to be within the scope of the present disclosure.

Figure 60:
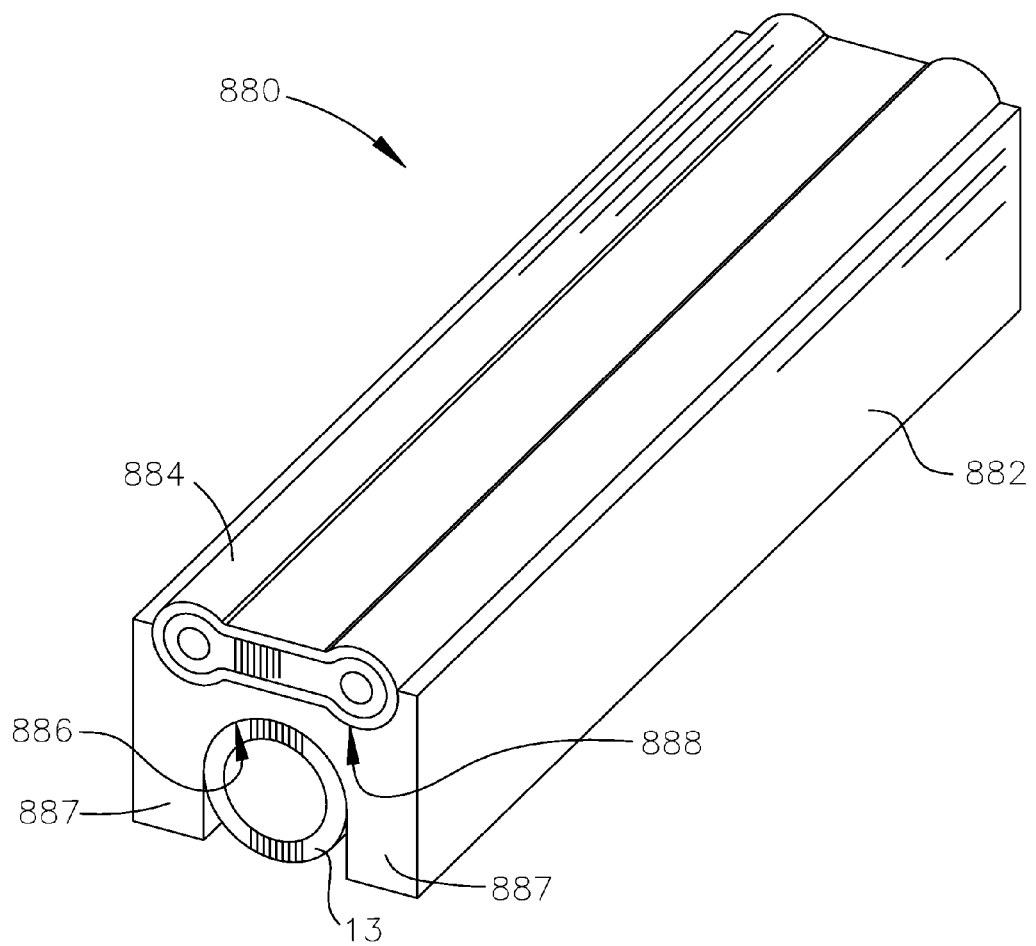
FIG. 60 is a perspective view of another form of a heat trace assembly utilizing a carrier and constructed in accordance with the teachings of the present disclosure.
Figure 61:
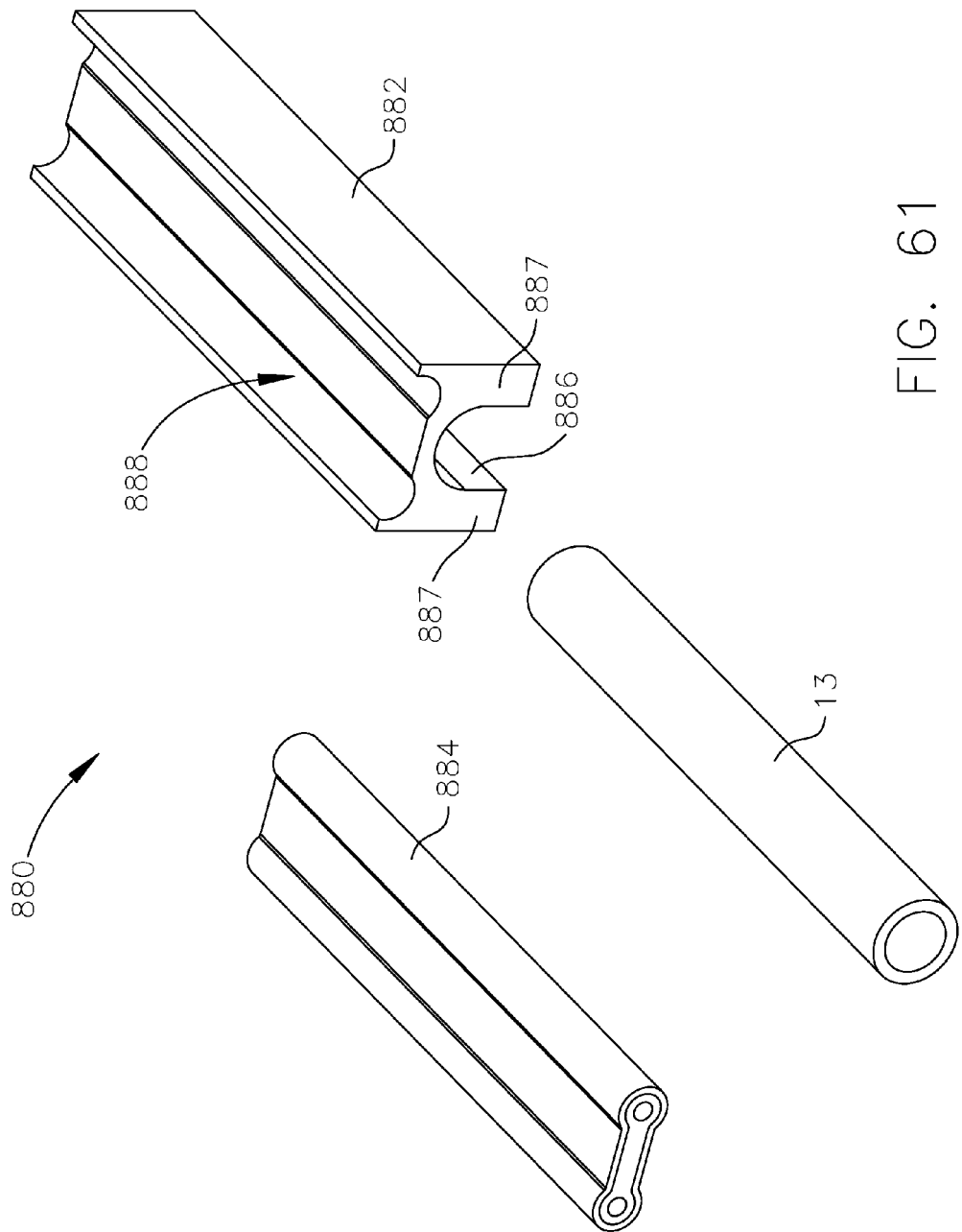
FIG. 61 is an exploded perspective view of the heat trace assembly with the carrier in accordance with the teachings of the present disclosure.

Referring now to FIGS. 60 and 61, another form of a heat trace assembly is illustrated and generally indicated by reference numeral 880. The heat trace assembly 880 comprises a carrier 882 that is adapted for placement around the conduit 13, and a heat trace section 884 secured to the carrier 882. In this embodiment, a standard/conventional heat trace section 884 can be employed without forming the heat trace section 884 to the shape of the conduit 13 as previously illustrated and described. Accordingly, the carrier 882 comprises an interior surface 886 that defines a shape complementary to the conduit 13, along with extensions 887 that extend around at least one half of the periphery of the conduit 13 as shown. The carrier 882 further comprises a recessed upper surface 888 that is sized to receive the heat trace section 884. The heat trace section 884 is then secured within this recessed upper surface 888 by any of a variety of means. For example, the heat trace section 884 may be press-fit or snapped into the recessed upper surface 888, the carrier 882 may include a feature to secure the heat trace section 884, an additional component (e.g. retaining clip) may be used to secure the heat trace section 884 to the carrier 882, or an adhesive may be used to secure the heat trace section 888 within the carrier 882, among other fastening or securing methods. Preferably, the carrier 882 is made of a material such as aluminum, brass, copper, or a conductive polymer so that the heat generated from the heat trace section 884 can be efficiently transferred to the conduit 13. It should be understood that the insulation jackets as previously illustrated and described herein may also be employed with this heat trace assembly 880 while remaining within the scope of the present disclosure, even though such insulation jackets are not explicitly illustrated and described with this embodiment.

Figure 62A:
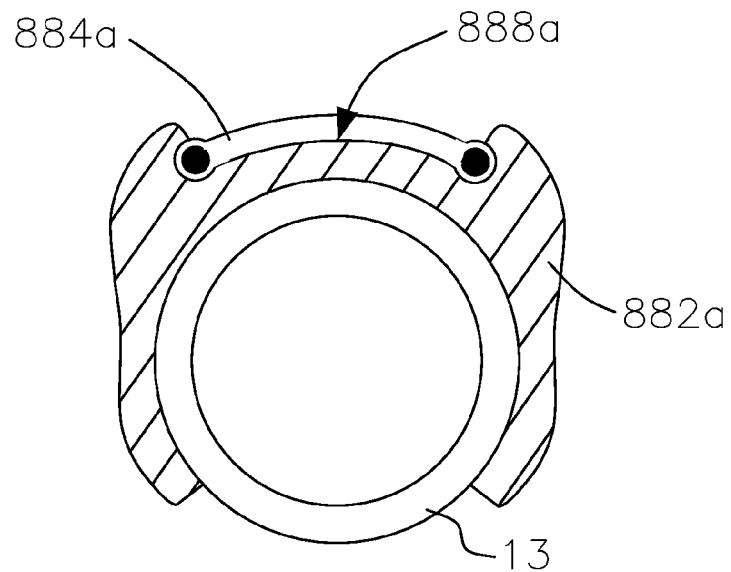
FIG. 62a is an end view of an alternate form of a carrier constructed in accordance with the teachings of the present disclosure.
Figure 62B:
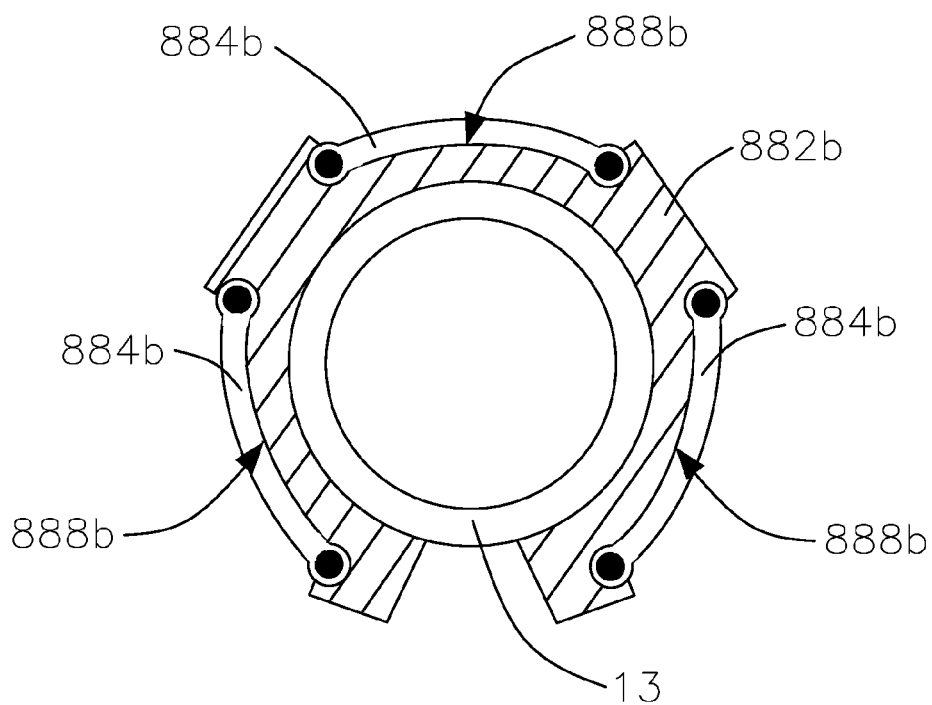
FIG. 62b is an end view of another alternate form of a carrier constructed in accordance with the teachings of the present disclosure.

Referring to FIGS. 62a and 62b, alternate forms of the carrier are illustrated and generally indicated by reference numerals 882a and 882b, respectively. As shown in FIG. 62a, the carrier 882a defines a recessed upper surface 888a that defines a curved geometry to accommodate a corresponding curved heat trace section 884a. The curved geometry thus provides for improved heat transfer from the heat trace section 884a to the conduit 13 since the heat trace section 884a generally follows the contour of the underlying conduit 13.

As shown in FIG. 62b, the carrier 882b defines multiple recessed upper surfaces 888b, which may be curved as shown or relatively straight or flat as previously illustrated in FIGS. 60 and 61. As such, the carrier 882b is preferably employed in applications where the conduit 13 has a relatively large size and requires multiple heat trace sections 884b to sufficiently surround the conduit 13.

In one form, the carrier 882 is preferably an aluminum extrusion, however, other materials that sufficiently transfer heat from the heat trace section 884 to the conduit 13 may also be employed while remaining within the scope of the present disclosure. For example, the carrier 882 may alternately be a polymer material. Additionally, alternate manufacturing methods other than extrusion, e.g., machining, may also be employed while remaining within the scope of the present disclosure.

Figure 63:
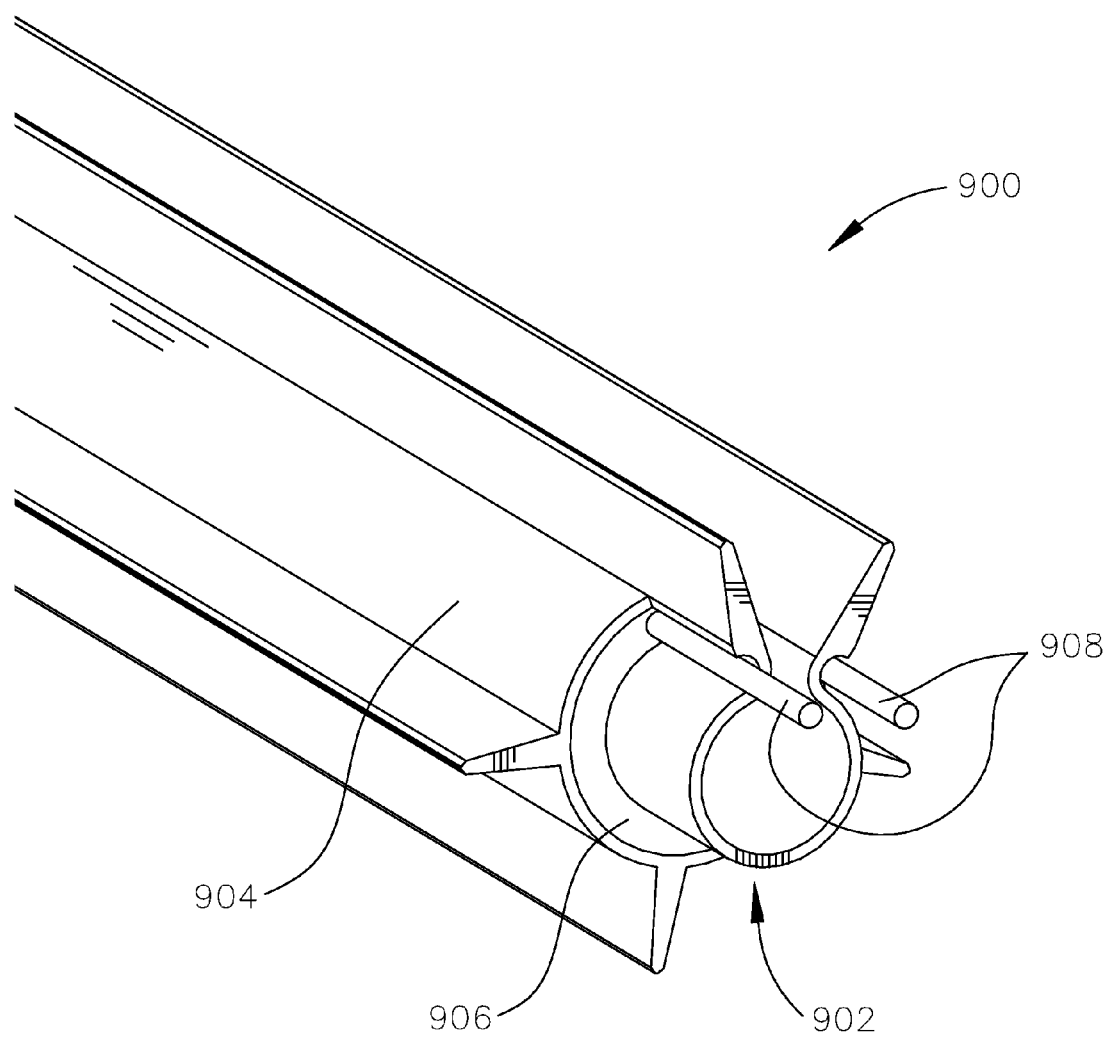
FIG. 63 is a perspective view of an alternate form of a heat trace section having a stripped end portion and constructed in accordance with the teachings of the present disclosure.
Figure 64:
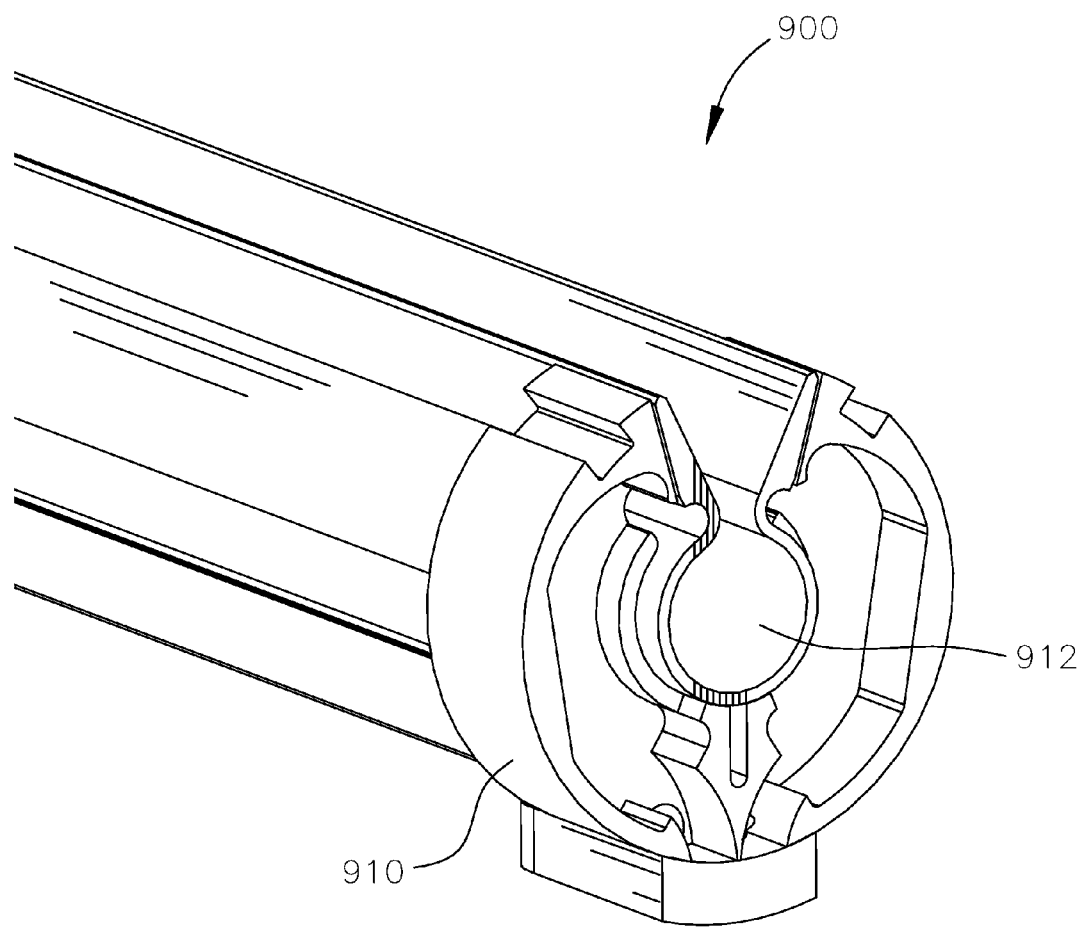
FIG. 64 is a perspective view of a terminating member secured to the stripped end portion of the heat trace section in accordance with the teachings of the present disclosure.
Figure 65:
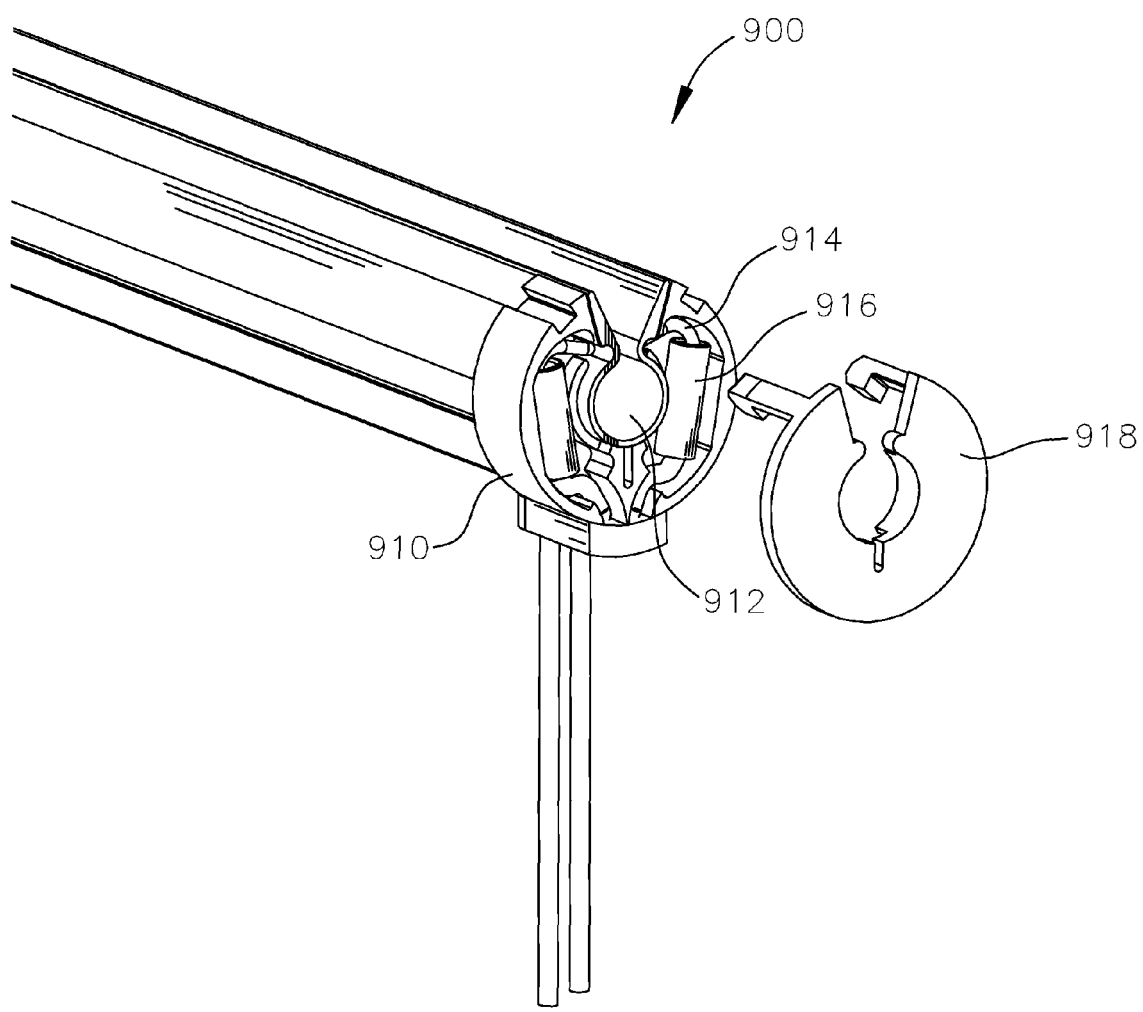
FIG. 65 is a perspective view of the terminating member secured to the stripped end portion of the heat trace section, illustrating electrical components therein, along with an end cap, in accordance with the teachings of the present disclosure.
Figure 66:
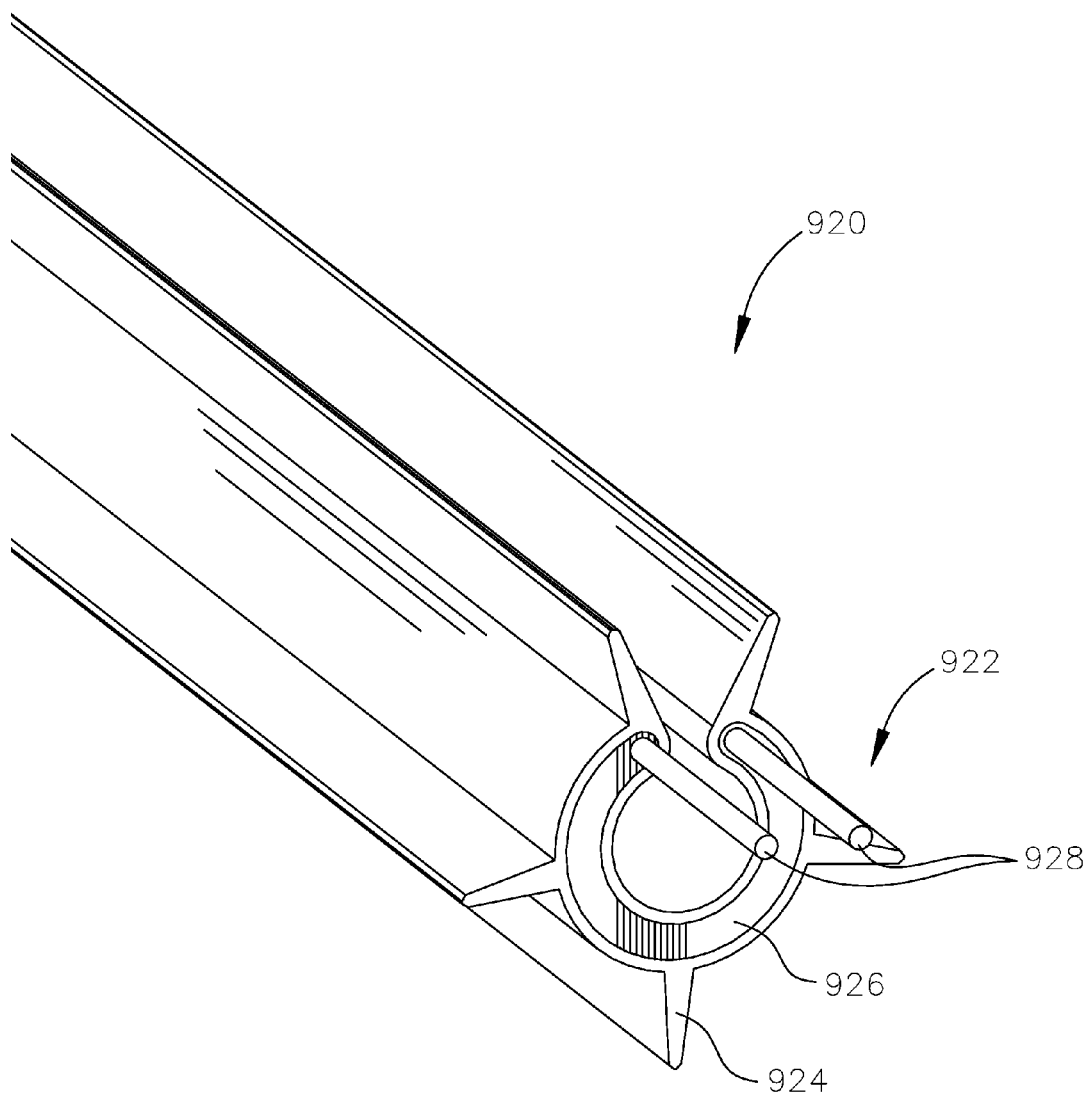
FIG. 66 is a perspective view of another alternate form of a heat trace section having a stripped end portion and constructed in accordance with the teachings of the present disclosure.
Figure 67:
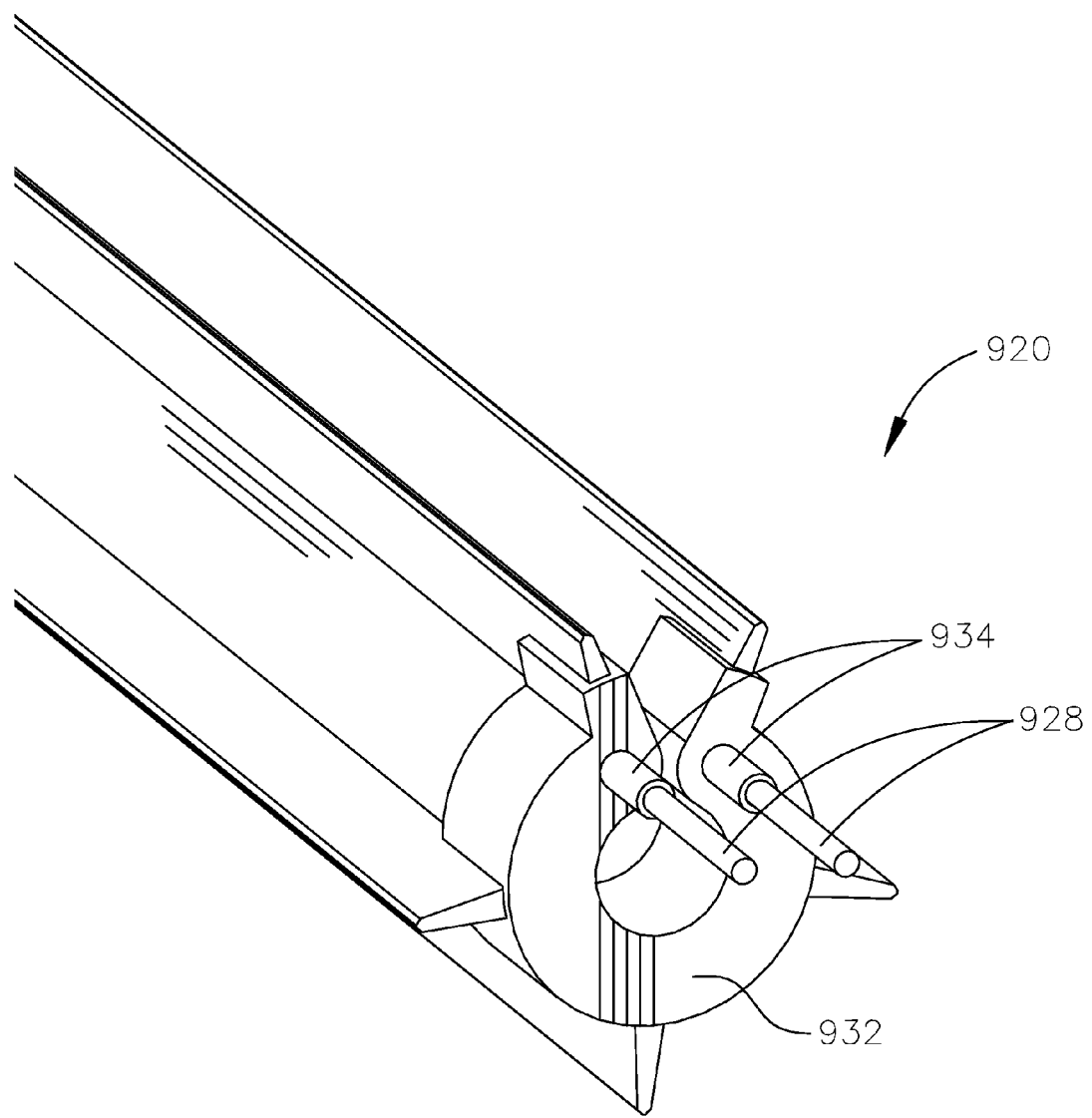
FIG. 67 is a perspective view of an end shield secured to the stripped end portion of the heat trace section in accordance with the teachings of the present disclosure.
Figure 68:
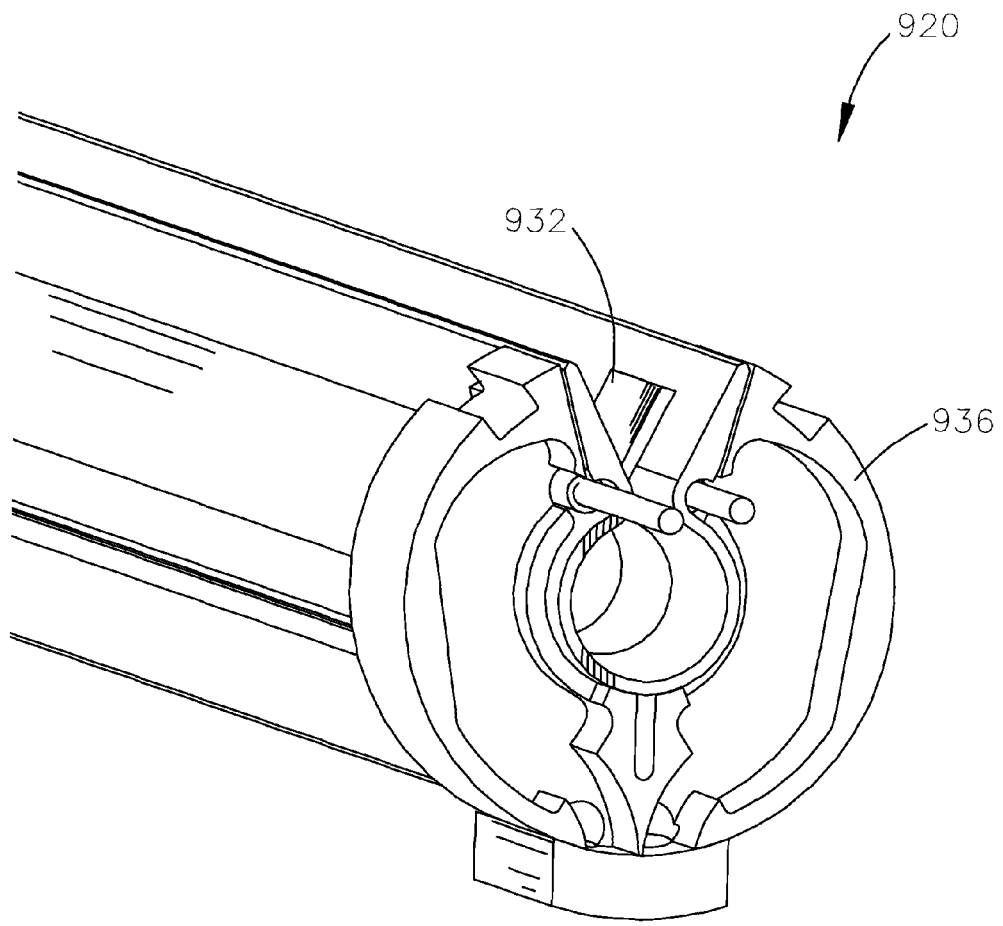
FIG. 68 is a perspective view of a terminating member secured against the end shield in accordance with the teachings of the present disclosure.
Figure 69:
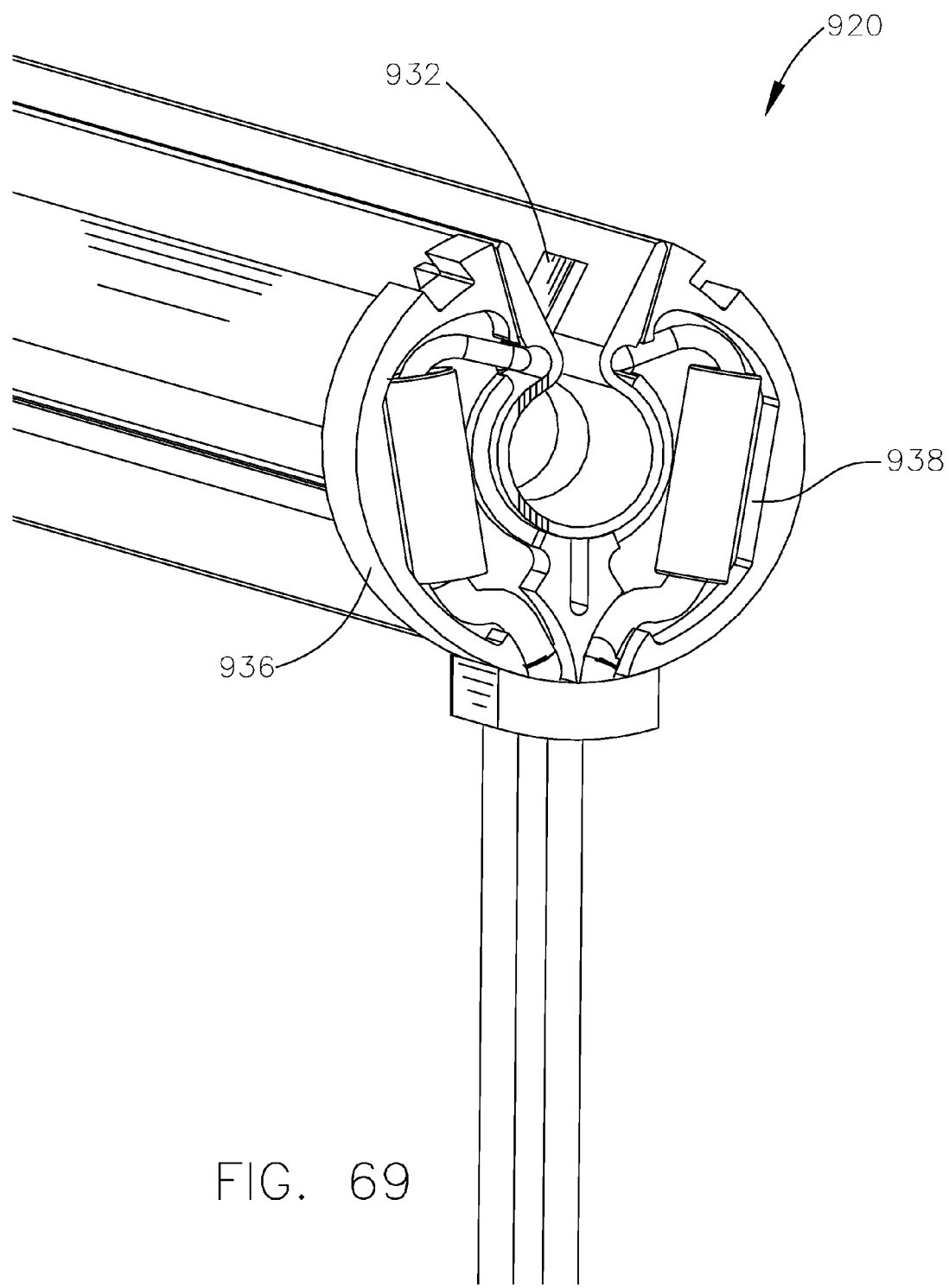
FIG. 69 is a perspective view of the terminating member secured to the stripped end portion of the heat trace section, illustrating electrical components therein, along with an end cap, in accordance with the teachings of the present disclosure.

Referring now to FIGS. 63 through 65, a form of a heat trace section having an alternate end termination is illustrated and generally indicated by reference numeral 900. The heat trace section 900 comprises a stripped end portion 902, wherein a portion of the dielectric cover 904 and the conductive core 906 have been stripped back such that the pair of conductors 908 and an inner wall 912 of the dielectric cover 904 are exposed as shown. The terminating member 910 is then slid onto the heat trace section 900 as shown, such that the inner wall 912 of the heat trace section 900 provides additional dielectric separation between the components housed within the terminating member 910, (e.g. lead wires 914, conductive core 906, and barrel-crimp connections 916), and the conduit 13, in addition to eliminating any line-of-sight to the electrical connections inside the terminating member 910. The terminating member 910 also includes features as shown such that the outer surfaces of the heat trace section 900 are covered or overlapped by such features to provide dielectric separation and to reduce any line-of-sight as previously described. Additionally, an end cap 918 is secured to the terminating member 910 as shown, similar to the end caps as previously illustrated and described.

In another end termination embodiment as shown in FIGS. 66 through 69, a heat trace section having an alternate end termination is illustrated and generally indicated by reference numeral 920. The heat trace section 920 comprises a stripped end portion 922, wherein a portion the dielectric cover 924 and the conductive core 926 have been stripped back such that only the pair of conductors 928 extend from the stripped end portion 922 of the heat trace section 920. As further shown, an end shield 932 is placed over the stripped end portion 922 of the heat trace section 920, wherein the pair of conductors 928 extend through guides 934 of the end shield 932. Generally, the end shield 932 is employed to provide additional dielectric and to reduce line-of-sight to the conduit 13. The terminating member 936 is then secured against the end shield 932 and accommodates the lead wires and electrical connections as previously described. Additionally, an end cap 938 is secured to the terminating member 936 as shown, similar to the end caps as previously illustrated and described.

Figure 70:
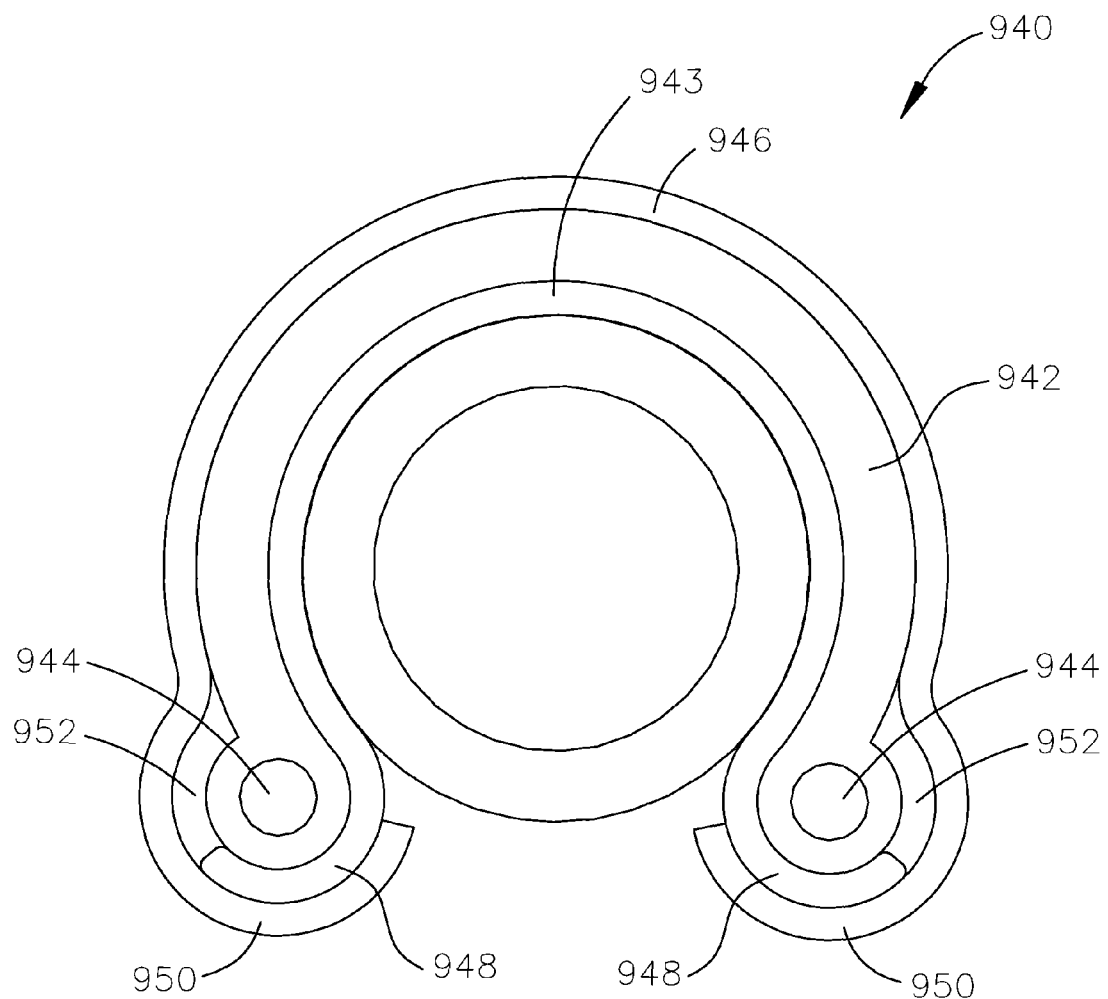
FIG. 70 is an end view of an alternate form of a heat trace section having multiple dielectric covers and constructed in accordance with the teachings of the present disclosure.
Figure 71:
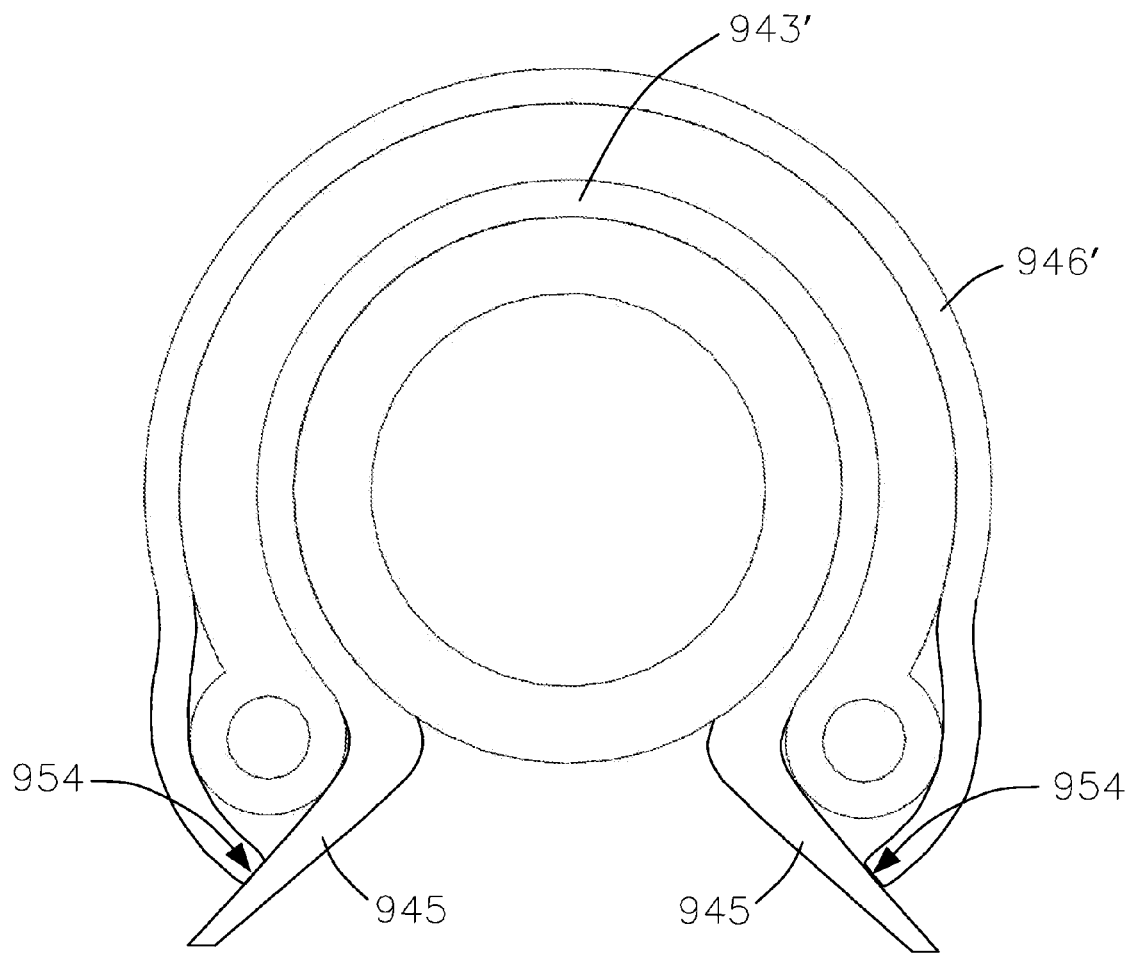
FIG. 71 is an end view of another alternate form of a heat trace section having multiple dielectric covers and constructed in accordance with the teachings of the present disclosure.

Turning now to FIG. 70, an alternate form of a heat trace assembly is illustrated and generally indicated by reference numeral 940. The heat trace assembly 940 comprises a conductive core 942 and a pair of conductors 944 disposed therein, similar to the constructions as previously described, however, a multi-pieced dielectric cover is employed around the conductive core 942 as shown. In this illustrative embodiment, the multi-pieced dielectric cover comprises an inner cover 943 and an outer cover 946, each of which comprise curved end portions 948 and 950, respectively. The curved end portions 948 and 950 overlap each other and extend around the conductors 944 and conductive core 942 as shown, in order to secure the multi-pieced dielectric cover to the conductive core 942. Both the inner cover 943 and the outer cover 946 are preferably separately formed from the conductive core 942 and its conductors 944, and are thus not co-extruded. Rather than the curved end portions 948 and 950, the covers may be heat sealed, welded, adhesively bonded, or secured to each other by any number of other known methods. For example, as shown in FIG. 71, an inner cover 943' includes standoffs 945, and an outer cover 946' is secured to the standoffs 945 by any of these methods along the interfaces 954.

Figure 72:
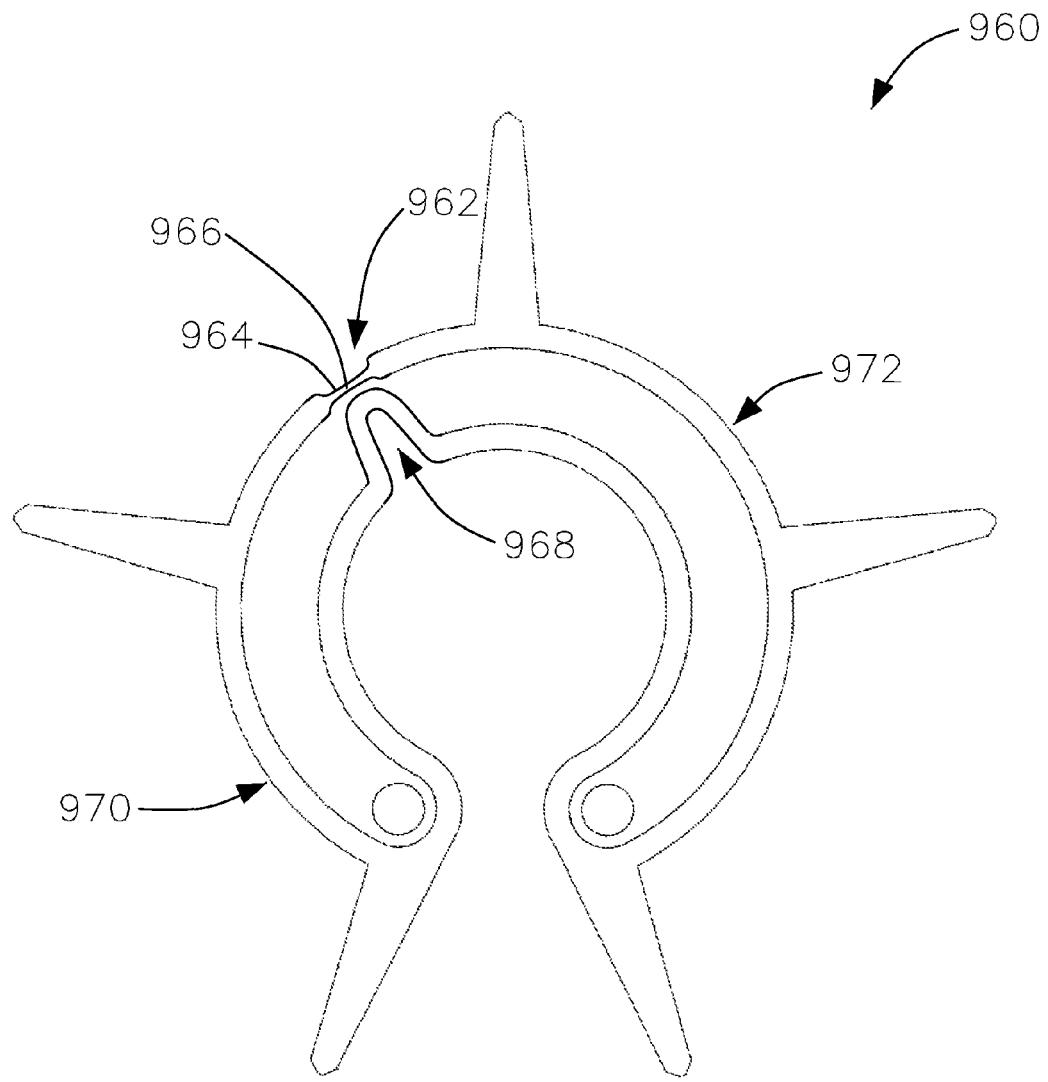
FIG. 72 is an end view of an alternate heat trace section having a reduced area and constructed in accordance with the teachings of the present disclosure.

As shown in FIG. 72, a heat trace section comprising a "living hinge" as previously set forth in relation to the insulation jacket is illustrated and generally indicated by reference numeral 960. The heat trace section 960 comprises a reduced area 962 as shown, which includes an outer recess 964, a web portion 966, and an inner recess 968. The reduced area 962 thus divides the heat trace section 960 into a first segment 970 and a second segment 972. Accordingly, the reduced area 962, and more specifically the web portion 966, provides a "living hinge" such that the first segment 970 and the second segment 972 are rotatable about the reduced area 962. As a result, the heat trace section 960 in this alternate form can be installed onto a conduit (not shown) more easily. Additionally, it should be understood that multiple reduced areas 962 may be employed around the heat trace section 960 rather than the single reduced area 962 while remaining within the scope of the present disclosure.

Figure 73:
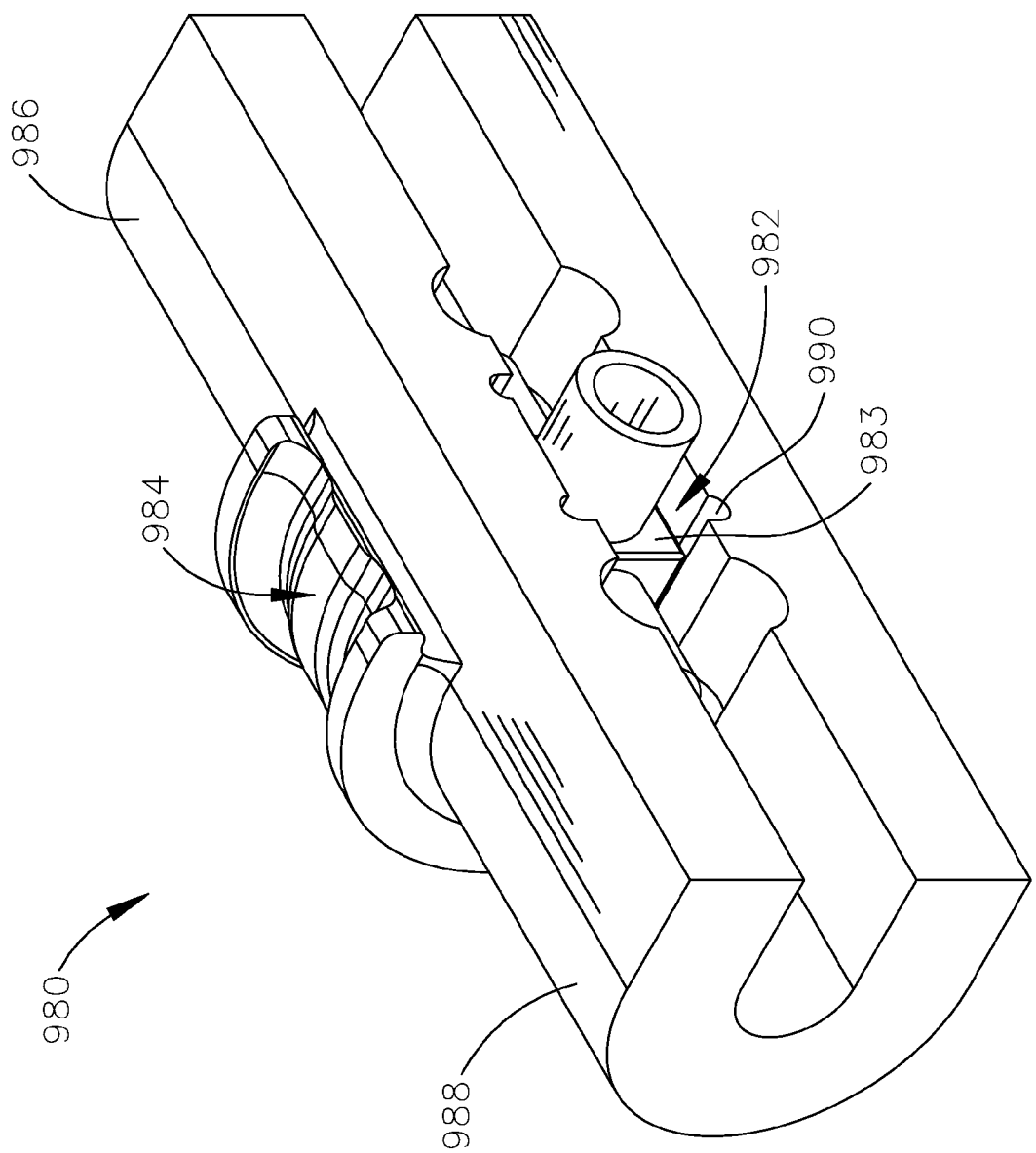
FIG. 73 is a perspective view of an alternate form of a fitting adapter constructed in accordance with the teachings of the present disclosure.
Figure 74:
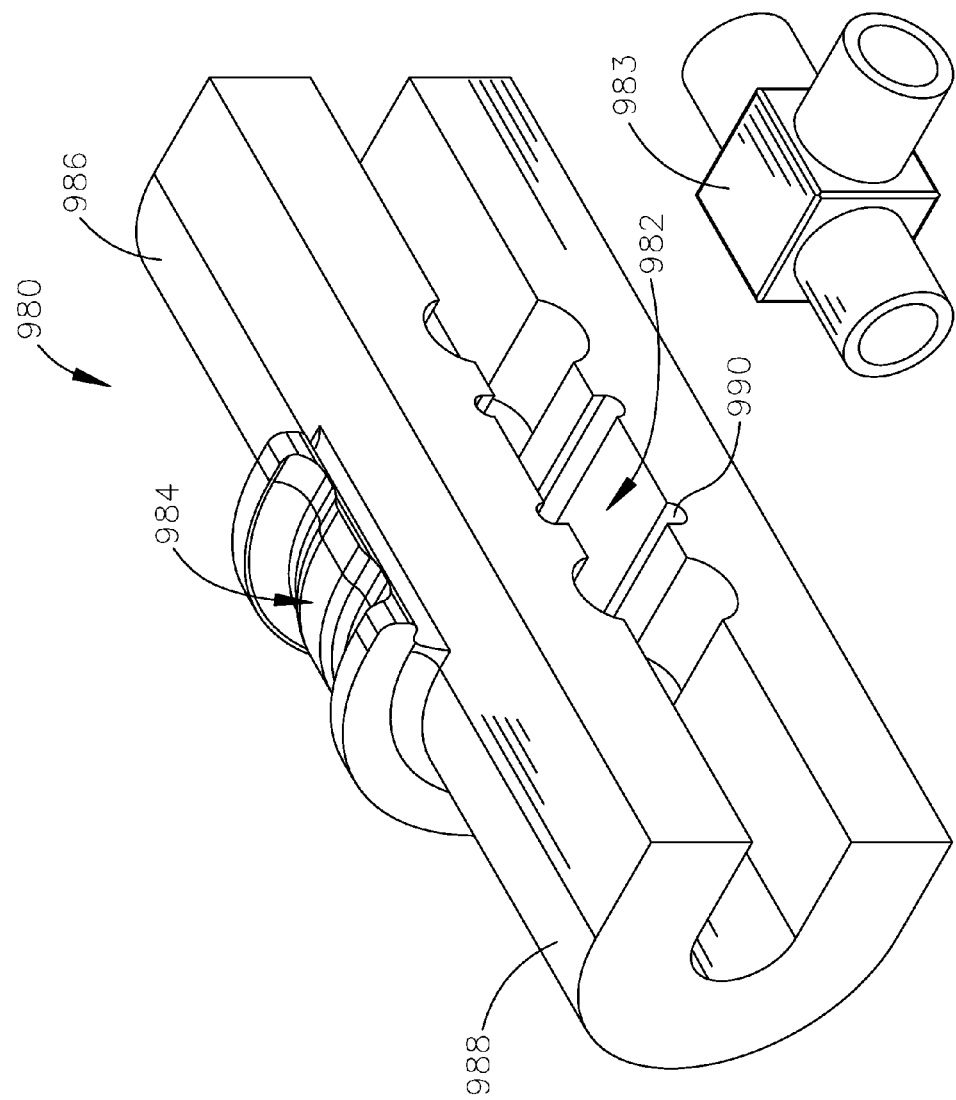
FIG. 74 is an exploded perspective view of the fitting adapter and an adjacent fitting in accordance with the teachings of the present disclosure.

Referring now to FIGS. 73 and 74, an alternate form of a fitting adapter (previously illustrated and described in an alternate form as reference numeral 52 in FIGS. 50-52) is illustrated and generally indicated by reference numeral 980. The fitting adapter 980 comprises an opening 982 that is sized to mate with an adjacent fitting 983 as shown, along with a recessed outer periphery 984 to accommodate the heat trace section 754 (not shown) as previously illustrated and described. The fitting adapter 980 comprises extensions 986 and 988, which extend along a portion of the conduit (not shown) that is secured to the adjacent fitting 983. Alternately, the extensions 986 and 988 are positioned along entire sections of conduit that may be relatively short and thus would be somewhat difficult to fit with a heat trace assembly as previously illustrated and described herein. As such, the extensions 986 and 988 of the fitting adapter 980 are capable of distributing heat to the underlying portions of conduit from the heat trace section 754 (not shown) that is disposed within the recessed outer periphery 984. Therefore, no separate heat generating element (i.e. heat trace assembly) is required in certain sections of the conduit with the use of the heat distributing extensions 986 and 988. It should be understood that more or less than two extensions 986 and 988 may be employed and that the extensions 986 and 988 may be of differing lengths and geometries while remaining within the scope of the present disclosure.

As further shown, the fitting adapter 980 comprises internal grooves 990, which are adapted to accommodate adjacent sections of heat trace assemblies as previously illustrated and described. Additionally, it should be understood that the shape of the opening 982 is altered according to the shape of the adjacent fitting being inserted therein, and thus the rectangular shape as illustrated and described herein should not be construed as limiting the scope of the present disclosure.

Figure 75:
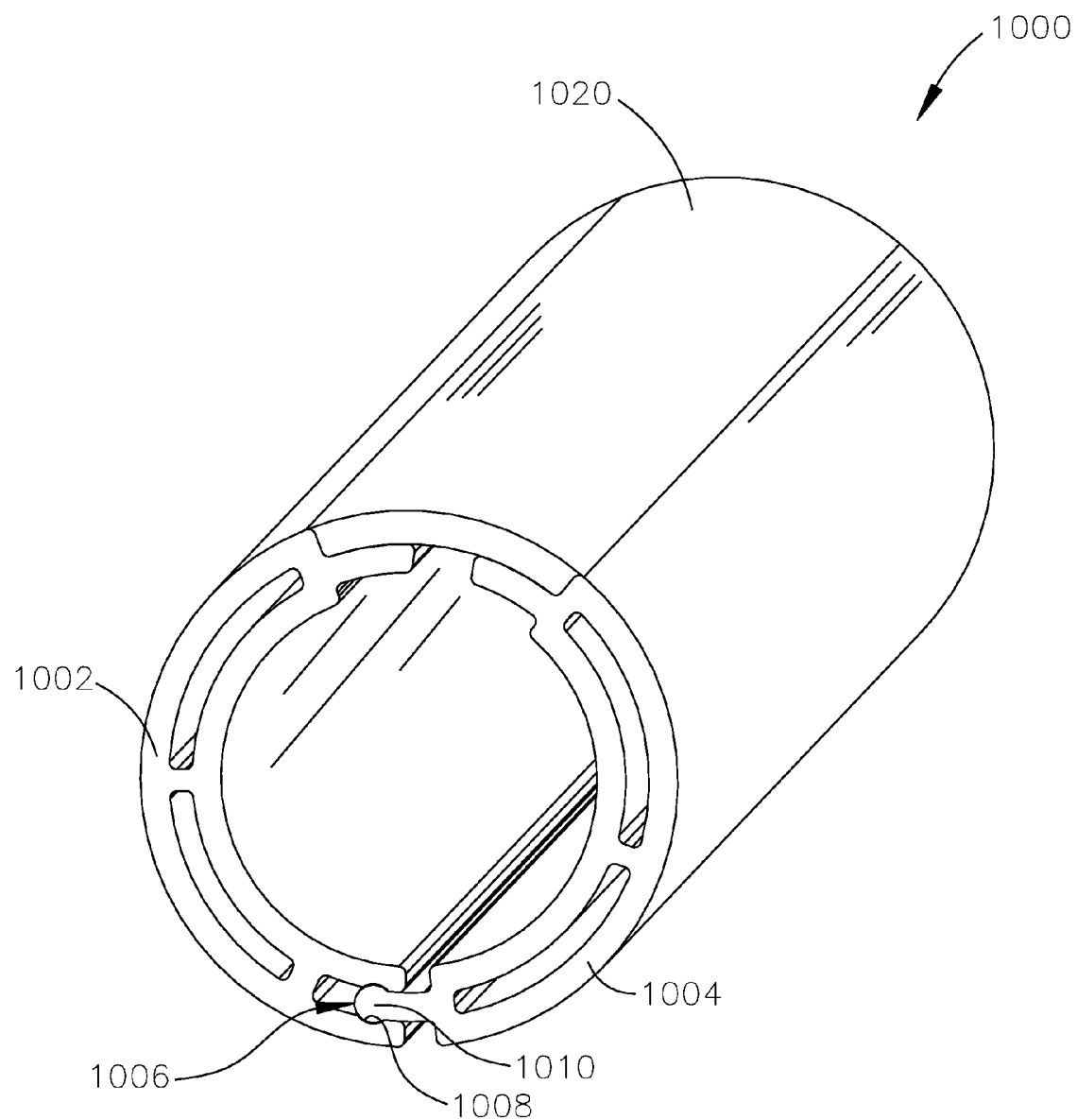
FIG. 75 is a perspective view of an alternate form of an insulation jacket constructed in accordance with the teachings of the present disclosure.
Figure 76:
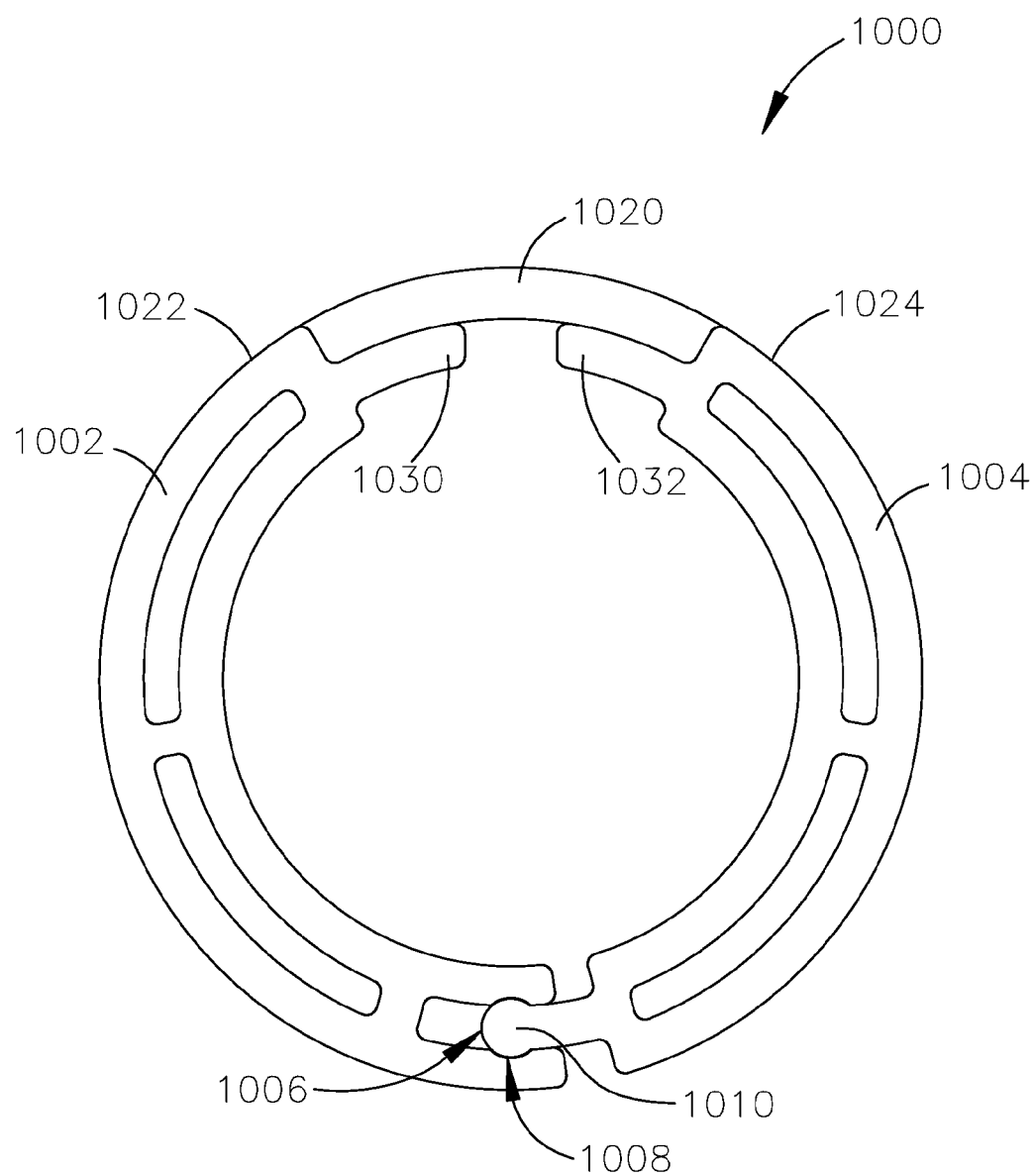
FIG. 76 is an end view of the insulation jacket in accordance with the teachings of the present disclosure.

Referring to FIGS. 75 and 76, yet another form of an insulation jacket is illustrated and generally indicated by reference numeral 1000. As shown, the insulation jacket 1000 comprises a first section 1002 and a second section 1004 positioned opposite the first section 1002, which are joined together by a hinge 1020. The hinge 1020 is preferably co-extruded with the first section 1002 and the section 1004, thus forming a single unitary body for the insulation jacket 1000.

The hinge 1020 is preferably flush with outer surfaces 1022 and 1024 of the first and second sections 1002 and 1004, respectively, and rests on first and second extensions 1030 and 1032 as shown. Accordingly, the hinge 1020 is formed of a resilient material such that the first and second sections 1002 and 1004, respectively, can be rotated relative to each other for installation and removal.

As further shown, the first section 1002 includes an open end portion 1006 defining a recess 1008, and the second section 1004 includes a detent 1010, which engages the recess 1008 of the first section 1002 as shown. The detent 1010 engages the recess 1008 to secure the first section 1002 to the second section 1004, thus securing the insulation jacket 1000 around the heat trace section (not shown) through a connection that can be readily engaged for installation and disengaged for removal.

In other forms of the present disclosure, various "indication" means are contemplated, wherein the state or condition of the heater system is indicated and can be monitored from the outside environment. For example, light emitting diodes (LEDs) may be placed along the heat trace assemblies at strategic locations to indicate whether or not the system is operational. The LEDs may be placed within individual sections of the heat trace assemblies or alternately in various electrical connections within the system. As another example, thermochromic coatings may be applied anywhere along exterior surfaces of the system, e.g., heat trace assemblies, connector assemblies, to indicate the temperature of the system at a certain location. Alternately, thermochromic additives may be employed within certain resin systems for use within, by way of example, the insulating jackets. Moreover, discrete temperature sensors may be employed within the system for temperature indications at desired locations, along with using the temperature sensors for temperature control. It should be understood that these various "indication" means are contemplated to be within the scope of the present disclosure.

The description of the disclosure is merely exemplary in nature and, thus, variations that do not depart from the gist of the disclosure are intended to be within the scope of the disclosure. For example, the conductive polymer material used for the heat trace sections may be a semi-conductive material in order to self-regulate temperature or a non-semiconductive material such that temperature is not regulated through the material but rather through a control system. Additionally, the thermal insulation jackets may be fitted with an external shell, e.g. rigid plastic, of any shape or geometry, in order to protect the thermal insulation jackets from damage from the outside environment. Such variations are not to be regarded as a departure from the spirit and scope of the disclosure.

What is claimed is:

1. A heat trace assembly comprising:
   a heat trace section comprising:
     a pair of bus-conductors;
     a semiconductive polymer material surrounding the bus-conductors and functioning as a heating element;
     a dielectric material surrounding the semiconductive polymer material; and
     an outer insulating jacket surrounding the dielectric material;
   an insulation jacket surrounding the heat trace section;
   a plurality of standoffs disposed between the heat trace section and the insulation jacket; and
   a corresponding plurality of passageways formed between the heat trace section and the insulation jacket and between the plurality of standoffs.

2. The heat trace assembly according to claim 1, wherein the standoffs are integrally formed with the insulation jacket.

3. The heat trace assembly according to claim 1, wherein the standoffs are integrally formed with the heat trace section.

4. The heat trace assembly according to claim 1, wherein the standoffs are separate pieces that are assembled to the insulation jacket.

5. The heat trace assembly according to claim 1, wherein the standoffs are separate pieces that are assembled to the heat trace section.

6. The heat trace assembly according to claim 1, wherein the standoffs are fins.

7. The heat trace assembly according to claim 1, wherein the standoffs are a part of the insulation jacket and define a distal end portion, and the distal end portion physically contacts the heat trace section to concentrically position the heat trace section within the insulation jacket.

8. The heat trace assembly according to claim 1, wherein the plurality of passageways are filled with a material selected from the group consisting of an insulating material and a low emissivity material.

9. The heat trace assembly according to claim 1, wherein the insulation jacket further comprises a plurality of chambers that extend longitudinally between an outer wall and an inner wall of the insulation jacket.

10. The heat trace assembly according to claim 9, wherein the plurality of chambers are filled with a material selected from the group consisting of an insulating material and a low emissivity material.

11. An insulation jacket for use in a heating system having at least one heat trace section, the heat trace section comprising a pair of bus-conductors, a semiconductive polymer material surrounding the bus-conductors and functioning as a heating element, a dielectric material surrounding the semiconductive polymer material, and an outer insulating jacket surrounding the dielectric material, the insulation jacket comprising a plurality of standoffs extending from an inner surface of the insulation jacket and inwardly towards the heat trace section, wherein a plurality of passageways are formed between the heat trace section and the insulation jacket and between the plurality of standoffs.

12. The insulation jacket according to claim 11, wherein the standoffs are integrally formed with the insulation jacket.

13. The insulation jacket according to claim 11, wherein the standoffs are separate pieces that are assembled to the insulation jacket.

14. The insulation jacket according to claim 11 further comprising a plurality of segments and at least one reduced area disposed between the segments, wherein the reduced area allows the segments to be rotatable about the reduced area.

15. The insulation jacket according to claim 14, wherein the segments and the reduced area are integrally formed with the insulation jacket such that the insulation jacket is a single, unitary piece.

16. The insulation jacket according to claim 11, wherein the standoffs extend longitudinally along the length of the insulation jacket.

17. The insulation jacket according to claim 11, wherein the standoffs extend circumferentially around the insulation jacket.

18. The insulation jacket according to claim 11, wherein the standoffs are discontinuous along the length of the insulation jacket.

\* \* \* \* \*